(12) United States Patent
Eryurek et al.

(10) Patent No.: US 7,346,404 B2
(45) Date of Patent: Mar. 18, 2008

(54) DATA SHARING IN A PROCESS PLANT

(75) Inventors: Evren Eryurek, Minneapolis, MN (US); Trevor D. Schleiss, Austin, TX (US); Stuart Harris, Minneapolis, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 365 days.

(21) Appl. No.: 10/087,308

(22) Filed: Mar. 1, 2002

(65) Prior Publication Data

US 2003/0028268 A1 Feb. 6, 2003

Related U.S. Application Data

(63) Continuation of application No. 09/953,811, filed on Sep. 17, 2001, now Pat. No. 7,206,646.

(60) Provisional application No. 60/273,164, filed on Mar. 1, 2001.

(51) Int. Cl.
*G05B 19/18* (2006.01)
(52) U.S. Cl. .............................. 700/65; 700/73; 700/52; 700/32
(58) Field of Classification Search .................. 700/79, 700/83, 108, 182, 30, 80, 65, 73, 52, 32; 702/182–184, 188; 709/203
See application file for complete search history.

(56) References Cited

U.S. PATENT DOCUMENTS 3,096,434 A 7/1963 King
3,404,264 A 10/1968 Kugler
3,701,280 A 10/1972 Stroman (Continued)

FOREIGN PATENT DOCUMENTS

CN 1007757 4/1990

(Continued)

OTHER PUBLICATIONS

U.S. 09/707,580, dated Nov. 17, 2000, "Integrated Alarm Display in a Process Control Network."

(Continued)

*Primary Examiner*—Jungwon Chang
(74) *Attorney, Agent, or Firm*—Marshall, Gerstein & Borun LLP

(57) ABSTRACT

A process plant uses an asset utilization expert to collect data or information pertaining to the assets of the process plant from various sources or functional areas of the plant including, for example, the process control functional areas, the maintenance functional areas and the business systems functional areas. This data and information is stored in a database and is sent to and manipulated in a coordinated manner by tools, such as optimization and modeling tools. This data is also redistributed to other areas or tools where it is used to perform overall better or more optimal control, maintenance and business activities. Information or data may be collected by maintenance functions pertaining to the health, variability, performance or utilization of a device, loop, unit, etc. and this information may then be sent to and displayed to a process operator or maintenance person to inform that person of a current or future problem.

54 Claims, 29 Drawing Sheets

U.S. PATENT DOCUMENTS

| | | | |
|---|---|---|---|
| 3,705,516 A | 12/1972 | Reis | |
| 3,981,836 A | 9/1976 | Pangle, Jr. et al. | |
| RE29,383 E | 9/1977 | Gallatin et al. | |
| 4,058,275 A | 11/1977 | Banks et al. | |
| 4,099,413 A | 7/1978 | Ohte et al. | |
| 4,322,976 A | 4/1982 | Sisson et al. | |
| 4,337,516 A | 6/1982 | Murphy et al. | |
| 4,408,285 A | 10/1983 | Sisson et al. | |
| 4,425,798 A | 1/1984 | Nagai et al. | |
| 4,435,770 A | 3/1984 | Shiohata et al. | |
| 4,493,042 A | 1/1985 | Shima et al. | |
| 4,517,468 A | 5/1985 | Kemper et al. | |
| 4,527,271 A | 7/1985 | Hallee et al. | 371/20 |
| 4,530,234 A | 7/1985 | Cullick et al. | |
| 4,607,325 A | 8/1986 | Horn | 364/151 |
| 4,635,214 A | 1/1987 | Kasai et al. | |
| 4,642,782 A | 2/1987 | Kemper et al. | |
| 4,644,478 A | 2/1987 | Stephens et al. | |
| 4,644,749 A | 2/1987 | Somes | |
| 4,649,515 A | 3/1987 | Thompson et al. | |
| 4,657,179 A | 4/1987 | Aggers et al. | 236/51 |
| 4,683,542 A | 7/1987 | Taniguti | |
| 4,707,796 A | 11/1987 | Calabro et al. | |
| 4,734,873 A | 3/1988 | Malloy et al. | 364/571 |
| 4,758,964 A | 7/1988 | Bittner et al. | |
| 4,763,243 A | 8/1988 | Barlow et al. | 364/200 |
| 4,764,862 A | 8/1988 | Barlow et al. | 364/200 |
| 4,777,585 A | 10/1988 | Kokawa et al. | |
| 4,819,233 A | 4/1989 | Delucia et al. | |
| 4,831,564 A | 5/1989 | Suga | |
| 4,843,557 A | 6/1989 | Ina et al. | |
| 4,873,655 A | 10/1989 | Kondraske | |
| 4,885,694 A | 12/1989 | Pray et al. | 364/464.01 |
| 4,885,707 A | 12/1989 | Nichol et al. | |
| 4,907,167 A | 3/1990 | Skeirik | 364/500 |
| 4,910,691 A | 3/1990 | Skeirik | 364/513 |
| 4,922,412 A | 5/1990 | Lane et al. | |
| 4,924,418 A | 5/1990 | Backman et al. | |
| 4,934,196 A | 6/1990 | Romano | |
| 4,942,514 A | 7/1990 | Miyagaki et al. | |
| 4,944,035 A | 7/1990 | Aagardl et al. | 364/556 |
| 4,956,793 A | 9/1990 | Bonne et al. | 364/558 |
| 4,964,125 A | 10/1990 | Kim | |
| 4,965,742 A | 10/1990 | Skeirik | 364/513 |
| 4,980,844 A | 12/1990 | Demjanenko et al. | |
| 4,992,965 A | 2/1991 | Holter et al. | |
| 5,005,142 A | 4/1991 | Lipchak et al. | |
| 5,006,992 A | 4/1991 | Skeirik | 364/513 |
| 5,008,810 A | 4/1991 | Kessel et al. | 364/200 |
| 5,015,934 A | 5/1991 | Holley et al. | 318/611 |
| 5,018,215 A | 5/1991 | Nasr et al. | 382/15 |
| 5,043,862 A | 8/1991 | Takahashi et al. | |
| 5,043,863 A | 8/1991 | Bristol et al. | 364/165 |
| 5,050,095 A | 9/1991 | Samad | 364/513 |
| 5,053,815 A | 10/1991 | Wendell | |
| 5,070,458 A | 12/1991 | Gilmore et al. | 364/424.06 |
| 5,081,598 A | 1/1992 | Bellows et al. | |
| 5,089,978 A | 2/1992 | Lipner et al. | |
| 5,089,984 A | 2/1992 | Struger et al. | |
| 5,094,107 A | 3/1992 | Schoch | |
| 5,098,197 A | 3/1992 | Shepard et al. | |
| 5,099,436 A | 3/1992 | McCown et al. | |
| 5,103,409 A | 4/1992 | Shimizu et al. | |
| 5,111,531 A | 5/1992 | Grayson et al. | |
| 5,121,467 A | 6/1992 | Skeirik | 395/11 |
| 5,122,976 A | 6/1992 | Bellows et al. | |
| 5,130,936 A | 7/1992 | Sheppard et al. | |
| 5,134,574 A | 7/1992 | Beaverstock et al. | 364/551.01 |
| 5,140,530 A | 8/1992 | Guha et al. | 395/13 |
| 5,142,612 A | 8/1992 | Skeirik | 395/11 |
| 5,148,378 A | 9/1992 | Shibayama et al. | |
| 5,161,013 A | 11/1992 | Rylander et al. | 358/160 |
| 5,167,009 A | 11/1992 | Skeirik | 395/27 |
| 5,175,678 A | 12/1992 | Frerichs et al. | |
| 5,187,674 A | 2/1993 | Bonne | 364/558 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | |
| 5,200,028 A | 4/1993 | Tatsumi | |
| 5,200,958 A | 4/1993 | Hamilton et al. | |
| 5,210,704 A | 5/1993 | Husseiny | |
| 5,212,765 A | 5/1993 | Skeirik | 395/11 |
| 5,214,582 A | 5/1993 | Gray | |
| 5,224,203 A | 6/1993 | Skeirik | 395/22 |
| 5,228,780 A | 7/1993 | Shepard et al. | |
| 5,235,527 A | 8/1993 | Ogawa et al. | |
| 5,251,151 A | 10/1993 | Demjanenko et al. | |
| 5,265,031 A | 11/1993 | Malczewski | |
| 5,265,222 A | 11/1993 | Nishiya et al. | |
| 5,274,572 A | 12/1993 | O'Neill et al. | |
| 5,282,131 A | 1/1994 | Rudd et al. | |
| 5,282,261 A | 1/1994 | Skeirik | 395/22 |
| 5,291,190 A | 3/1994 | Scarola et al. | 340/825.06 |
| 5,293,585 A | 3/1994 | Morita | |
| 5,301,101 A | 4/1994 | MacArthur et al. | 364/156 |
| 5,303,181 A | 4/1994 | Stockton | |
| 5,305,230 A | 4/1994 | Matsumoto et al. | |
| 5,311,421 A | 5/1994 | Nomura et al. | |
| 5,311,447 A | 5/1994 | Bonne | 364/509 |
| 5,311,562 A | 5/1994 | Palusamy et al. | 376/215 |
| 5,315,521 A | 5/1994 | Hanson et al. | |
| 5,317,520 A | 5/1994 | Castle | |
| 5,325,522 A | 6/1994 | Vaughn | 395/600 |
| 5,327,357 A | 7/1994 | Feinstein et al. | |
| 5,329,443 A | 7/1994 | Bonaquist et al. | |
| 5,333,240 A | 7/1994 | Matsumoto et al. | |
| 5,333,298 A | 7/1994 | Bland et al. | 395/500 |
| 5,347,449 A | 9/1994 | Meyer et al. | |
| 5,349,541 A | 9/1994 | Alexandro, Jr. et al. | |
| 5,351,184 A | 9/1994 | Lu et al. | 364/165 |
| 5,353,207 A | 10/1994 | Keeler et al. | 364/164 |
| 5,353,315 A | 10/1994 | Scarola et al. | |
| 5,361,612 A | 11/1994 | Voiculescu et al. | |
| 5,369,599 A | 11/1994 | Sadjadi et al. | 364/516 |
| 5,373,452 A | 12/1994 | Guha | 364/550 |
| 5,384,698 A | 1/1995 | Jelinek | 364/149 |
| 5,384,699 A | 1/1995 | Levy et al. | |
| 5,386,373 A | 1/1995 | Keeler et al. | |
| 5,390,287 A | 2/1995 | Obata | |
| 5,390,326 A | 2/1995 | Shah | 395/575 |
| 5,394,341 A | 2/1995 | Kepner | |
| 5,394,543 A | 2/1995 | Hill et al. | |
| 5,396,415 A | 3/1995 | Konar et al. | 364/162 |
| 5,398,303 A | 3/1995 | Tanaka | 395/51 |
| 5,400,246 A | 3/1995 | Wilson et al. | |
| 5,404,064 A | 4/1995 | Mermelstein et al. | |
| 5,408,406 A | 4/1995 | Mathur et al. | 364/163 |
| 5,408,586 A | 4/1995 | Skeirik | |
| 5,414,645 A | 5/1995 | Hirano | |
| 5,419,197 A | 5/1995 | Ogi et al. | |
| 5,430,642 A | 7/1995 | Nakajima et al. | |
| 5,440,478 A | 8/1995 | Fisher et al. | |
| 5,442,544 A | 8/1995 | Jelinek | 364/149 |
| 5,461,570 A | 10/1995 | Wang et al. | |
| 5,467,355 A | 11/1995 | Umeda et al. | |
| 5,469,735 A | 11/1995 | Watanabe | |
| 5,483,387 A | 1/1996 | Bauhahn et al. | |
| 5,485,753 A | 1/1996 | Burns et al. | |
| 5,486,920 A | 1/1996 | Killpatrick et al. | 356/350 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | |
| 5,499,188 A | 3/1996 | Kline, Jr. et al. | |
| 5,500,941 A | 3/1996 | Gil | |

| | | | |
|---|---|---|---|
| 5,511,004 A | 4/1996 | Dubost et al. | |
| 5,511,442 A | 4/1996 | Tame | |
| 5,521,814 A | 5/1996 | Teran et al. | |
| 5,528,510 A | 6/1996 | Kraft | |
| 5,533,413 A | 7/1996 | Kobayashi et al. | 737/865.9 |
| 5,537,310 A | 7/1996 | Tanake et al. | 364/151 |
| 5,541,833 A | 7/1996 | Bristol et al. | 364/165 |
| 5,546,301 A | 8/1996 | Agrawal et al. | 364/140 |
| 5,548,528 A | 8/1996 | Keeler et al. | |
| 5,559,690 A | 9/1996 | Keeler et al. | 364/164 |
| 5,561,599 A | 10/1996 | Lu | 364/164 |
| 5,566,065 A | 10/1996 | Hansen et al. | 364/164 |
| 5,570,282 A | 10/1996 | Hansen et al. | 364/148 |
| 5,570,300 A | 10/1996 | Henry et al. | |
| 5,572,420 A | 11/1996 | Lu | 364/153 |
| 5,574,638 A | 11/1996 | Lu | 364/165 |
| 5,586,066 A | 12/1996 | White et al. | |
| 5,596,704 A | 1/1997 | Geddes et al. | 395/326 |
| 5,598,521 A | 1/1997 | Kilgore et al. | |
| 5,600,148 A | 2/1997 | Cole et al. | |
| 5,602,757 A | 2/1997 | Haseley et al. | |
| 5,602,761 A | 2/1997 | Spoerre et al. | |
| 5,604,914 A | 2/1997 | Kabe | |
| 5,610,339 A | 3/1997 | Haseley et al. | |
| 5,623,598 A | 4/1997 | Voigt et al. | |
| 5,625,574 A | 4/1997 | Griffiths et al. | |
| 5,628,994 A | 5/1997 | Kaper et al. | |
| 5,631,825 A | 5/1997 | van Wheele et al. | |
| 5,640,491 A | 6/1997 | Bhat et al. | 395/22 |
| 5,640,493 A | 6/1997 | Skeirik | |
| 5,646,350 A | 7/1997 | Robinson et al. | |
| 5,666,297 A | 9/1997 | Britt et al. | 364/578 |
| 5,671,335 A | 9/1997 | Davis et al. | |
| 5,671,351 A | 9/1997 | Wild et al. | |
| 5,675,504 A | 10/1997 | Serodes et al. | |
| 5,680,409 A | 10/1997 | Qin et al. | |
| 5,682,309 A | 10/1997 | Bartusiak et al. | |
| 5,687,090 A | 11/1997 | Chen et al. | 364/496 |
| 5,691,895 A * | 11/1997 | Kurtzberg et al. | 700/29 |
| 5,692,158 A | 11/1997 | Degeneff et al. | 395/500 |
| 5,698,788 A | 12/1997 | Mol et al. | |
| 5,704,011 A | 12/1997 | Hansen et al. | 395/22 |
| 5,715,158 A | 2/1998 | Chen | 364/150 |
| 5,729,661 A | 3/1998 | Keeler et al. | 395/213 |
| 5,740,324 A | 4/1998 | Mathur et al. | 395/22 |
| 5,742,513 A | 4/1998 | Bouhenguel et al. | 364/492 |
| 5,754,451 A | 5/1998 | Williams | |
| 5,757,371 A | 5/1998 | Oran et al. | |
| 5,761,518 A | 6/1998 | Boehling et al. | 395/821 |
| 5,764,891 A | 6/1998 | Warrior | 395/200.2 |
| 5,768,119 A | 6/1998 | Havekost et al. | |
| 5,777,872 A | 7/1998 | He | 364/149 |
| 5,781,432 A | 7/1998 | Keeler et al. | 364/164 |
| 5,781,878 A | 7/1998 | Mizuguchi et al. | |
| 5,790,898 A | 8/1998 | Kishima et al. | 395/899 |
| 5,796,602 A | 8/1998 | Wellan et al. | |
| 5,796,606 A | 8/1998 | Spring | |
| 5,796,609 A | 8/1998 | Tao et al. | 364/164 |
| 5,798,939 A | 8/1998 | Ochoa et al. | 364/493 |
| 5,805,442 A | 9/1998 | Crater et al. | 364/138 |
| 5,809,490 A | 9/1998 | Guiver et al. | 706/16 |
| 5,819,050 A | 10/1998 | Boehling et al. | 395/284 |
| 5,819,232 A | 10/1998 | Shipman | 705/8 |
| 5,825,645 A | 10/1998 | Konar et al. | 364/148 |
| 5,826,249 A | 10/1998 | Skeirik | 706/25 |
| 5,838,561 A | 11/1998 | Owen | |
| 5,842,189 A | 11/1998 | Keeler et al. | 706/16 |
| 5,847,952 A | 12/1998 | Samad | 364/148 |
| 5,848,365 A | 12/1998 | Coverdill | |
| 5,855,791 A * | 1/1999 | Hays et al. | 210/696 |
| 5,859,773 A | 1/1999 | Keeler et al. | 364/164 |
| 5,859,885 A | 1/1999 | Rusnica et al. | |
| 5,859,964 A | 1/1999 | Wang et al. | 395/185.01 |
| 5,875,420 A | 2/1999 | Piety et al. | |
| 5,877,954 A | 3/1999 | Klimasauskas et al. | 364/149 |
| 5,880,716 A | 3/1999 | Kunugi | |
| 5,892,679 A | 4/1999 | He | 364/149 |
| 5,892,939 A | 4/1999 | Call et al. | 395/500 |
| 5,898,869 A | 4/1999 | Anderson | 395/652 |
| 5,901,058 A | 5/1999 | Steinman et al. | 364/130 |
| 5,905,989 A | 5/1999 | Biggs | |
| 5,906,214 A | 5/1999 | Gueret | |
| 5,907,701 A | 5/1999 | Hanson | 395/671 |
| 5,909,370 A | 6/1999 | Lynch | 364/148.05 |
| 5,909,541 A | 6/1999 | Sampson et al. | 395/182.04 |
| 5,909,586 A | 6/1999 | Anderson | 395/750.08 |
| 5,917,840 A | 6/1999 | Cheney et al. | 371/53 |
| 5,918,233 A | 6/1999 | La Chance et al. | 707/104 |
| 5,922,963 A | 7/1999 | Piety et al. | |
| 5,924,086 A | 7/1999 | Mathur et al. | 706/25 |
| 5,940,290 A | 8/1999 | Dixon | 364/138 |
| 5,948,101 A | 9/1999 | David et al. | 713/2 |
| 5,949,417 A | 9/1999 | Calder | 345/342 |
| 5,951,654 A | 9/1999 | Avsan et al. | |
| 5,960,214 A | 9/1999 | Sharpe, Jr. et al. | 395/835 |
| 5,960,441 A | 9/1999 | Bland et al. | 707/104 |
| 5,975,737 A | 11/1999 | Crater et al. | 364/138 |
| 5,984,502 A | 11/1999 | Calder | 364/188 |
| 5,988,847 A | 11/1999 | McLaughlin et al. | 364/138 |
| 5,995,916 A * | 11/1999 | Nixon et al. | 702/182 |
| 5,997,167 A | 12/1999 | Crater et al. | |
| 6,006,171 A | 12/1999 | Vines et al. | |
| 6,008,985 A | 12/1999 | Lake et al. | 361/686 |
| 6,014,612 A | 1/2000 | Larson et al. | |
| 6,017,143 A | 1/2000 | Eryurek et al. | 364/148.06 |
| 6,026,352 A | 2/2000 | Burns et al. | |
| 6,033,257 A | 3/2000 | Lake et al. | 439/502 |
| 6,035,339 A | 3/2000 | Agraharam et al. | |
| 6,038,486 A * | 3/2000 | Saitoh et al. | 700/96 |
| 6,041,263 A | 3/2000 | Boston et al. | 700/32 |
| 6,047,221 A | 4/2000 | Piche et al. | 700/44 |
| 6,055,483 A | 4/2000 | Lu | 702/31 |
| 6,061,603 A | 5/2000 | Papadopoulos et al. | 700/83 |
| 6,067,505 A | 5/2000 | Bonoyer et al. | 702/85 |
| 6,076,124 A | 6/2000 | Korowitz et al. | 710/102 |
| 6,078,843 A | 6/2000 | Shavit | 700/48 |
| 6,093,211 A | 7/2000 | Hamielec et al. | 703/12 |
| 6,106,785 A | 8/2000 | Havlena et al. | 422/109 |
| 6,108,616 A | 8/2000 | Borchers et al. | 702/183 |
| 6,110,214 A | 8/2000 | Klimasauskas | 703/2 |
| 6,122,555 A | 9/2000 | Lu | 700/9 |
| 6,128,279 A | 10/2000 | O'Neil et al. | 370/229 |
| 6,134,574 A | 10/2000 | Oberman et al. | |
| 6,144,952 A | 11/2000 | Keeler et al. | |
| 6,169,980 B1 | 1/2001 | Keeler et al. | |
| 6,185,470 B1 | 2/2001 | Pado et al. | |
| 6,197,480 B1 | 3/2001 | Iguchi et al. | |
| 6,246,972 B1 | 6/2001 | Klimasauskas | |
| 6,259,959 B1 | 7/2001 | Martin | |
| 6,266,726 B1 | 7/2001 | Nixon et al. | 710/105 |
| 6,298,377 B1 | 10/2001 | Hartikainen et al. | 709/223 |
| 6,298,454 B1 | 10/2001 | Schleiss et al. | 714/37 |
| 6,317,638 B1 | 11/2001 | Screder et al. | |
| 6,317,701 B1 | 11/2001 | Pyötsiä et al. | 702/188 |
| 6,332,110 B1 | 12/2001 | Wolfe | 702/22 |
| 6,389,331 B1 | 5/2002 | Jensen et al. | |
| 6,397,114 B1 | 5/2002 | Eryurek et al. | |
| 6,400,681 B1 | 6/2002 | Bertin et al. | |
| 6,418,465 B1 | 7/2002 | Hirosawa et al. | |
| 6,421,571 B1 * | 7/2002 | Spriggs et al. | 700/17 |
| 6,445,963 B1 | 9/2002 | Blevins et al. | |
| 6,507,797 B1 | 1/2003 | Kliman et al. | |
| 6,529,780 B1 | 3/2003 | Soergel et al. | |
| 6,535,769 B1 | 3/2003 | Konar | |
| 6,549,130 B1 | 4/2003 | Joao | |
| 6,567,718 B1 | 5/2003 | Campbell et al. | |

| | | | |
|---|---|---|---|
| 6,571,273 B1 | 5/2003 | Shirai et al. | |
| 6,591,260 B1 | 7/2003 | Schwarzhoff et al. | |
| 6,609,040 B1 | 8/2003 | Brunnemann | |
| 6,628,994 B1* | 9/2003 | Turicchi et al. | 700/32 |
| 6,633,782 B1* | 10/2003 | Schleiss et al. | 700/26 |
| 6,651,012 B1 | 11/2003 | Bechhoefer | |
| 6,654,697 B1 | 11/2003 | Eryurek et al. | |
| 6,665,635 B2* | 12/2003 | Shimizu et al. | 702/188 |
| 6,690,274 B1 | 2/2004 | Bristol | |
| 6,704,689 B1 | 3/2004 | Hogan et al. | |
| 6,717,513 B1 | 4/2004 | Sandelman et al. | |
| 6,721,609 B1 | 4/2004 | Wojsznis et al. | |
| 6,732,191 B1 | 5/2004 | Baker et al. | |
| 6,738,388 B1 | 5/2004 | Stevenson et al. | |
| 6,758,168 B2 | 7/2004 | Koskinen et al. | |
| 6,760,782 B1 | 7/2004 | Swales | |
| 6,774,786 B1 | 8/2004 | Havekost et al. | |
| 6,799,195 B1* | 9/2004 | Thibault et al. | 709/203 |
| 2002/0022894 A1 | 2/2002 | Eryurek et al. | |
| 2002/0029130 A1 | 3/2002 | Eryurek et al. | |
| 2002/0067370 A1* | 6/2002 | Forney et al. | 345/742 |
| 2002/0077711 A1 | 6/2002 | Schliess et al. | |
| 2002/0147511 A1 | 10/2002 | Eryurek et al. | |
| 2002/0156542 A1* | 10/2002 | Nandi | 700/30 |
| 2002/0161940 A1 | 10/2002 | Eryurek et al. | |
| 2002/0163427 A1 | 11/2002 | Eryurek et al. | |
| 2003/0002969 A1 | 1/2003 | Risser | |
| 2003/0009572 A1 | 1/2003 | Thurner | |
| 2003/0028268 A1 | 2/2003 | Eryurek et al. | |
| 2003/0195934 A1 | 10/2003 | Peterson et al. | |
| 2004/0075689 A1 | 4/2004 | Schliess et al. | |
| 2004/0181364 A1 | 9/2004 | Reeves et al. | |
| 2004/0249583 A1 | 12/2004 | Eryurek et al. | |
| 2005/0007249 A1 | 1/2005 | Eryurek et al. | |
| 2005/0240289 A1 | 10/2005 | Hoyte et al. | |

FOREIGN PATENT DOCUMENTS

| | | |
|---|---|---|
| CN | 1097804 | 1/1995 |
| CN | 1267373 | 9/2000 |
| DE | 35 40204 C1 | 9/1986 |
| DE | 40 08 560 A1 | 9/1990 |
| DE | 44 33 593 A1 | 6/1995 |
| DE | 195 02 499 A1 | 8/1996 |
| EP | 0 122 622 | 10/1984 |
| EP | 0 377 736 | 7/1990 |
| EP | 0 413 814 | 2/1991 |
| EP | 0 487 419 | 5/1992 |
| EP | 0 594 227 | 4/1994 |
| EP | 0 612 039 | 8/1994 |
| EP | 626 697 A1 | 11/1994 |
| EP | 0 644 470 | 3/1995 |
| EP | 0 723 4988 | 5/1995 |
| EP | 0 362 386 | 6/1995 |
| EP | 0 827 096 | 3/1998 |
| EP | 0 624 847 | 8/1999 |
| EP | 0 959 398 | 11/1999 |
| EP | 0 965 897 A1 | 12/1999 |
| EP | 961 184 A2 | 12/1999 |
| EP | 964 325 A1 | 12/1999 |
| EP | 965 897 A1 | 12/1999 |
| GB | 2 083 258 | 3/1982 |
| GB | 2 294 129 | 4/1996 |
| GB | 2 294 793 | 5/1996 |
| GB | 2347234 A | 8/2000 |
| GB | 2 380 833 | 4/2003 |
| JP | 0 624 2192 | 2/1994 |
| JP | 06-331507 | 12/1994 |
| JP | 08-261886 | 10/1996 |
| JP | 10-039728 | 2/1998 |
| JP | 10-320039 | 12/1998 |
| JP | 11/231924 | 8/1999 |
| JP | 2000-003113 | 1/2000 |
| JP | 2000-305620 | 11/2000 |
| JP | 2001-016662 | 1/2001 |
| WO | WO 98/38585 | 9/1998 |
| WO | WO 99/13418 | 3/1999 |
| WO | WO 00/50851 | 8/2000 |
| WO | WO 02/23405 | 3/2002 |
| WO | WO 02/095633 | 11/2002 |
| WO | WO 03/075206 | 9/2003 |

OTHER PUBLICATIONS

U.S. Appl. No. 09/257,896, dated Feb. 25, 1999.
U.S. Appl. No. 09/953,811, dated Sep. 17, 2001, "Fusion of Process Performance Monitoring with Process Equipment Moitoring and Control."
U.S. Appl. 09/593,327, dated Jun. 14, 2001, "Integrated Optimal Model Predictive Control in a Process Control System."
Wernwe Kalkhoff, "Agent-Oriented Robot Task Transformation", Proceedings of the International Symposium on Intelligent Control, IEEE, pp. 242-247 (Aug. 27, 1995).
International Search Report issued in PCT/US02/06577 dated Nov. 13, 2002.
English Translation of Notice of Rejection for Application No. 2002-570030, dated Jun. 19, 2007.
U.S. Appl. 09/499,445 entitled "Diagnostic Expert in a Process Control System", which was filed on Feb. 7, 2000.
GE Industrial Systems PREDICTOR™ Services information found at www.GEindustrial.com, Jul. 2002.
"Components of GE Predictor™ Services," GE Industrial Systems, available at http://www.geindustrial.com/cwc/services?id=74 on Jul. 18, 2002.
"Customer Benefits," GE Industrial Systems, available at http://www.geindustrial.com/cwc/services?id=75 on Jul. 18, 2002.
"Customer Impact," GE Industrial Systems, available at http://www.geindustrial.com/cwc/services?id=73 on Jul. 18, 2002.
dotnet.za.net, "Web Services—A Guide for Business and IT Managers (Sep. 23, 2001)", (Copyright 2001), www.dotnet.za.net.
"Electrical Equipment Coverage," GE Industrial Systems, available at http://www.geindustrial.com/cwc/services?id=72 on Jul. 18, 2002.
"GE PREDICTOR™ Services: GE Predictor Services Overview," GE Industrial Systems, available at http://www.geindustrial.com/cwc/services?id=71 on Jul. 18, 2002.
"Status Signals of Field Instruments," NAMUR Recommendation, NA 64, Feb. 1, 2001, pp. 1-8.
European Examination Report, EP 02723319.6, dated Jul. 1, 2004.
European Examination Report, EP 02717514.0, dated Jun. 29, 2004.
Examination Report under Section 18(3) issued in GB 0308687.9 by the United Kingdom Patent Office on Mar. 11, 2005.
First Office Action issued in Chinese Application No. 02805854.2 on Nov. 11, 2005.
First Office Action issued in Chinese Application No. 02122060.3 on Feb. 4, 2005.
First Office Action issued in Chinese Application No. 02805785.6 on Nov. 11, 2005.
Great Britain Examination Report under Section 18(3) issued Dec. 17, 2003 in Application No. GB 0126490.2.
Great Britain Examination Report under Section 18(3) issued on Sep. 16, 2004 in Application No. GB 0212610.0.
Great Britain Search Report under Section 17 performed on Dec. 11, 2002 in Application No. GB 0212610.0.
International Search Report for PCT/US04/004939, mailed Sep. 29, 2004.
International Search Report for PCT/US02/05874, mailed Nov. 13, 2002.
International Search Report for PCT/US02/15901, mailed Jun. 17, 2003.
International Search Report for PCT/US02/16033, mailed Jun. 17, 2003.
International Preliminary Examination Report of PCT/US02/05874, mailed Feb. 3, 2003.
International Preliminary Examination Report for PCT/US02/15901, mailed Sep. 10, 2003.

International Preliminary Examination Report for PCT/US02/16033, mailed Sep. 16, 2003.

Lighthammer Illuminator™ Manufacturing Intelligence Brochure "Now you can see all your manufacturing information from a single interface—in real-time, from anywhere.", no publish date available.

Lighthammer Software Development, "Illuminator™ The 1st 'Plant Information Portal'™" (Copyright 1999).

Mazaeda et al., "Supervision and Optimised Process Control in Sugar Beet Factories," Centre of Sugar Technology, Spain from www.univ-reims.fr/externes/avh10mazaeda.pdf, no publish data available.

Search Report under Section 17 issued by Great Britain Patent Office, dated Jun. 11, 2002 in Application No. GB 0126490.2 (UK 2083258).

Search Report under Section 17 issued in GB 0308687.9 by the United Kingdom Patent Office on Aug. 28, 2003.

Search Report under Section 17(5) issued in GB 0416908.2 application by the United Kingdom Patent Office, dated Oct. 13, 2004.

Systinet, "Introduction to Web Services", (Copyright 2001, 2002), www.systinet.com.

U.S. Appl. No. 60/273,164, filed Mar. 1, 2001, "Asset Utilization Expert in a Process Control Plant."

Web Services Architect, "What are Web Services", www.webservicesarchitect.com, May 2nd.

Written Opinion for PCT/US04/004939, mailed Sep. 29, 2004.

Written Opinion of PCT/US02/05874, mailed Nov. 13, 2002.

Written Opinion for PCT/US02/15901, mailed Jul. 16, 2003.

Written Opinion for PCT/US02/16033, mailed Jul. 21, 2003.

Zolera Systems, "A Brief Guide to Web Services Protocols" (Copyright 2001), www.zolera.com.

* cited by examiner

|  | PI | VI | HI | UI |
|---|---|---|---|---|
| Unit | x |  | x | x |
| Sub Unit | x |  | x | x |
| Loop |  | x | x | x |
| Device |  | x | x |  |

FIG. 9

PERFORMANCE FOR FCCU: 83.2

| Loop Name | Index | Weight |
|---|---|---|
| FIC-101 | 88 | 3 |
| TIC-111 | 89 | 3 |
| LIC-111 | 88 | 3 |
| FIC-111 | 60 | 3 |
| FIC-112 | 80 | 1 |
| TCI-222 | 87 | 1 |
| FIC-101 | 88 | 3 |
| TIC-111 | 89 | 3 |
| LIC-111 | 88 | 3 |
| FIC-111 | 60 | 3 |
| FIC-112 | 80 | 1 |
| TIC-222 | 87 | 1 |
| PIC-111 | 87 | 1 |
|  |  |  |

FCCU Health: 97.5

| Device Name | Index | Description | Weight |
|---|---|---|---|
| FV-111 | 100 | Leaking | 3 |
| TI-111 | 98 | Sticktion | 3 |
| LI-111 | 90 | 40 | 3 |
| MC-101 | 95 | Will burn up in 2 weeks | 3 |
| FV-111 | 96 | 0 | 1 |

FIG. 11

FCCU Variability: 12.1

| Device Name | Index | Weight |
|---|---|---|
| FV-101 | 0 | 3 |
| TI-111 | 2 | 3 |
| LI-111 | 40 | 3 |
| FV-111 | 0 | 3 |
| FV-112 | 0 | 1 |
| TI-222 | 2 | 1 |
| FI-101 | 7 | 3 |
| TI-111 | 6 | 3 |
| LI-111 | 7 | 3 |
| FI-111 | 7 | 3 |
| FI-112 | 7 | 1 |
| TI-222 | 7 | 1 |
| Sub unit: Reboiler RB101 | 15 | 2 |
|  |  |  |

DATA SHARING IN A PROCESS PLANT

RELATED APPLICATIONS

This document claims priority from U.S. Provisional Application Ser. No. 60/273,164 which was filed on Mar. 1, 2001. This document is also a continuation of U.S. patent application Ser. No. 09/953,811, now U.S. Pat. No. 7,206,646, which was filed on Sep. 17, 2001 and is entitled "Fusion of Process Performance Monitoring with Process Equipment Monitoring and Control" which is hereby expressly incorporated by reference herein.

FIELD OF TECHNOLOGY

This disclosure relates generally to process control and maintenance systems within process plants and, more particularly, to the use of a coordinated expert system that collects and redistributes data from multiple data sources within a process plant.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

While a typical process control system has many process control and instrumentation devices, such as valves, transmitters, sensors, etc. connected to one or more process controllers which execute software that controls these devices during the operation of the process, there are many other supporting devices which are also necessary for or related to process operation. These additional devices include, for example, power supply equipment, power generation and distribution equipment, rotating equipment such as turbines, etc., which are located at numerous places in a typical plant. While this additional equipment does not necessarily create or use process variables and, in many instances, is not controlled or even coupled to a process controller for the purpose of affecting the process operation, this equipment is nevertheless important to and ultimately necessary for proper operation of the process. In the past however, process controllers were not necessarily aware of these other devices or the process controllers simply assumed that these devices were operating properly when performing process control.

Still further, many process plants have other computers associated therewith which execute applications related to business functions or maintenance functions. For example, some plants include computers which execute applications associated with ordering raw materials, replacement parts or devices for the plant, applications related to forecasting sales and production needs, etc. Likewise, many process plants, and especially those which use smart field devices, include applications which are used to help monitor and maintain the devices within the plant regardless of whether these devices are process control and instrumentation devices or are other types of devices. For example, the Asset Management Solutions (AMS) application sold by Fisher-Rosemount Systems, Inc. enables communication with and stores data pertaining to field devices to ascertain and track the operating state of the field devices. An example of such a system is disclosed in U.S. Pat. No. 5,960,214 entitled "Integrated Communication Network for use in a Field Device Management System." In some instances, the AMS application may be used to communicate with devices to change parameters within the device, to cause the device to run applications on itself, such as self calibration routines or self diagnostic routines, to obtain information about the status or health of the device, etc. This information may be stored and used by a maintenance person to monitor and maintain these devices. Likewise, there are other types of applications which are used to monitor other types of devices, such as rotating equipment and power generation and supply devices. These other applications are typically available to the maintenance persons and are used to monitor and maintain the devices within a process plant. In many cases, however, outside service organizations may perform services related to monitoring process performance and equipment. In these cases, the outside service organizations acquire the data they need, run typically proprietary applications to analyze the data and merely provide results and recommendations to the process plant personnel. While helpful, the plant personnel have little or no ability to view the raw data measured or to use the analysis data in any other manner.

However, in the typical plant or process, the functions associated with the process control activities, the device and equipment maintenance and monitoring activities, and the business activities are separated, both in the location in which these activities take place and in the personnel who typically perform these activities. Furthermore, the different people involved in these different functions generally use different tools, such as different applications run on different computers to perform the different functions. In many instances, these different tools collect or use different types of data associated with or collected from the different devices within the process and are set up differently to collect the data they need. For example, process control operators who generally oversee the day to day operation of the process and who are primarily responsible for assuring the quality and continuity of the process operation typically affect the process by setting and changing set points within the process, tuning loops of the process, scheduling process operations such as batch operations, etc. These process control operators may use available tools for diagnosing and correcting process control problems within a process control system, including, for example, auto-tuners, loop analyzers, neural network systems, etc. Process control operators also receive process variable information from the process via one or more process controllers which provide information to the operators about the operation of the process, including alarms generated within the process. This information may be provided to the process control operator via a standard user interface.

Still further, it is currently known to provide an expert engine that uses process control variables and limited information about the operating condition of the control routines or function blocks or modules associated with process control routines to detect poorly operating loops and to provide information to an operator about suggested courses of action to correct the problem. Such an expert engine is disclosed in U.S. patent application Ser. No. 09/256,585 entitled "Diagnostics in a Process Control System," which was filed on Feb. 22, 1999 and in U.S. patent application Ser. No. 09/499,445 entitled "Diagnostic Expert in a Process Control System," which was filed on Feb. 7, 2000, both of which are hereby expressly incorporated by reference herein. Likewise, it is known to run control optimizers, such as real time optimizers, within a plant to optimize the control activities of the process plant. Such optimizers typically use complex models of the plant to predict how inputs may be changed to optimize operation of the plant with respect to some desired optimization variable such as, for example, profit.

On the other hand, maintenance personnel who are primarily responsible for assuring that the actual equipment within the process is operating efficiently and for repairing and replacing malfunctioning equipment, use tools such as maintenance interfaces, the AMS application discussed above, as well and many other diagnostic tools which provide information about operating states of the devices within the process. Maintenance persons also schedule maintenance activities which may require shut down of portions of the plant. For many newer types of process devices and equipment, generally called smart field devices, the devices themselves may include detection and diagnostic tools which automatically sense problems with the operation of the device and automatically report these problems to a maintenance person via a standard maintenance interface. For example, the AMS software reports device status and diagnostic information to the maintenance person and provides communication and other tools that enable the maintenance person to determine what is happening in devices and to access device information provided by devices. Typically, maintenance interfaces and maintenance personnel are located apart from process control operators, although this is not always the case. For example, in some process plants, process control operators may perform the duties of maintenance persons or vice versa, or the different people responsible for these functions may use the same interface.

Still further, persons responsible and applications used for business applications, such as ordering parts, supplies, raw materials, etc., making strategic business decisions such as choosing which products to manufacture, what variables to optimize within the plant, etc. are typically located in offices of the plant that are remote from both the process control interfaces and the maintenance interfaces. Likewise, managers or other persons may want to have access to certain information within the process plant from remote locations or from other computer systems associated with the process plant for use in overseeing the plant operation and in making long term strategic decisions.

Still further, in many cases, some of the tasks, such as monitoring equipment, testing the operation of devices, determining if the plant is running in an optimal manner, etc. are performed by outside consultants or service companies who measure the data needed, perform an analysis and then provide only the results of the analysis back to the plant personnel. In these cases, the data is typically collected and stored in a proprietary manner and is rarely made available to the plant personnel for other reasons.

Because, for the most part, very different applications used to perform the different functions within a plant, e.g., process control operations, maintenance operations and business operations are separated, the different applications used for these different tasks are not integrated and, thus, do not share data or information. In fact, many plants only include some, but not all, of these different types of applications. Furthermore, even if all of the applications are located within a plant, because different personnel use these different applications and analysis tools and because these tools are generally located at different hardware locations within the plant, there is little if any flow of information from one functional area of the plant to another, even when this information may be useful to other functions within the plant. For example, a tool, such as a rotating equipment data analysis tool, may be used by a maintenance person to detect a poorly functioning power generator or piece of rotating equipment (based on non-process variable type data). This tool may detect a problem and alert the maintenance person that the device needs to be calibrated, repaired or replaced. However, the process control operator (either a human or a software expert) does not have the benefit of this information, even though the poorly operating device may be causing a problem that is affecting a loop or some other component which is being monitored by the process control operation. Likewise, the business person is not aware of this fact, even though the malfunctioning device may be critical to and may be preventing optimization of the plant in a manner that the business person may desire. Because the process control expert is unaware of a device problem which may be ultimately causing poor performance of a loop or unit in the process control system and because the process control operator or expert assumes that this equipment is operating perfectly, the process control expert may misdiagnose the problem it detects within the process control loop or may try to apply a tool, such as a loop tuner, which could never actually correct the problem. Likewise, the business person may make a business decision to run the plant in a manner that will not achieve the desired business effects (such as optimizing profits) because of the malfunctioning device.

Due to the abundance of data analysis and other detection and diagnostic tools available in the process control environment, there is a lot of information about the health and performance of devices available to the maintenance person which could be helpful to the process operator and the business persons. Similarly, there is a lot of information available to the process operator about the current operational status of the process control loops and other routines which may be helpful to the maintenance person or to the business person. Likewise, there is information generated by or used in the course of performing the business functions which could be helpful to the maintenance person or the process control operator in optimizing the operation of the process. However, in the past, because these functions were separated, the information generated or collected in one functional area was not used at all, or not used very well in other functional areas which led to an overall sub-optimal use of the assets within process plants.

SUMMARY

A process plant uses an asset utilization expert to collect data or information pertaining to the assets of the process plant from various sources or functional areas of the plant including, for example, the process control functional areas, the maintenance functional areas and the business systems functional areas. This data and information is then sent to and manipulated in a coordinated manner by tools, such as optimization and modeling tools and is redistributed to other areas or tools where it is used to perform better or more optimal control, maintenance and business activities. For example, information or data may be collected by maintenance functions pertaining to the health, variability, performance or utilization of a device, loop, unit, etc. This information may then be sent to and displayed to a process operator or maintenance person to inform that person of a current or future problem. This same information may be used by the process operator to correct a current problem within a loop or to change the control strategy of the system to account for and to correct for a sub-optimally operating device.

In one embodiment, a data communication system within a process plant includes a database adapted to store a plurality of different types of data and a plurality of applications communicatively coupled to the database via different communication networks, wherein the plurality of applications includes two or more of a process control application, a process performance monitoring application, such as an optimization application, a process device monitoring application and a business application. In this case, each of the plurality of applications is adapted to send data to the database to be stored in the database and at least one of the plurality of applications is adapted to access data from the database that was sent to the database via another one of the applications. If desired one or more of the plurality of applications may be an application provided by or implemented by a service provider associated with the process plant.

BRIEF DESCRIPTION OF THE DRAWINGS

FIG. 9 is an exemplary table that illustrates one manner in which indexes may be generated for different levels of a system hierarchy;

FIG. 11 is an exemplary table that illustrates one manner in which index values may be used to calculate a new index value as a weighted average of the index values;

FIG. 12 is an exemplary table that illustrates one manner in which a variability index may be calculated for a unit;

FIG. 27 is still another exemplary depiction of a display that may be provided by a graphical user interface to enable a user to track or generate work orders;

DETAILED DESCRIPTION

Figure 1:
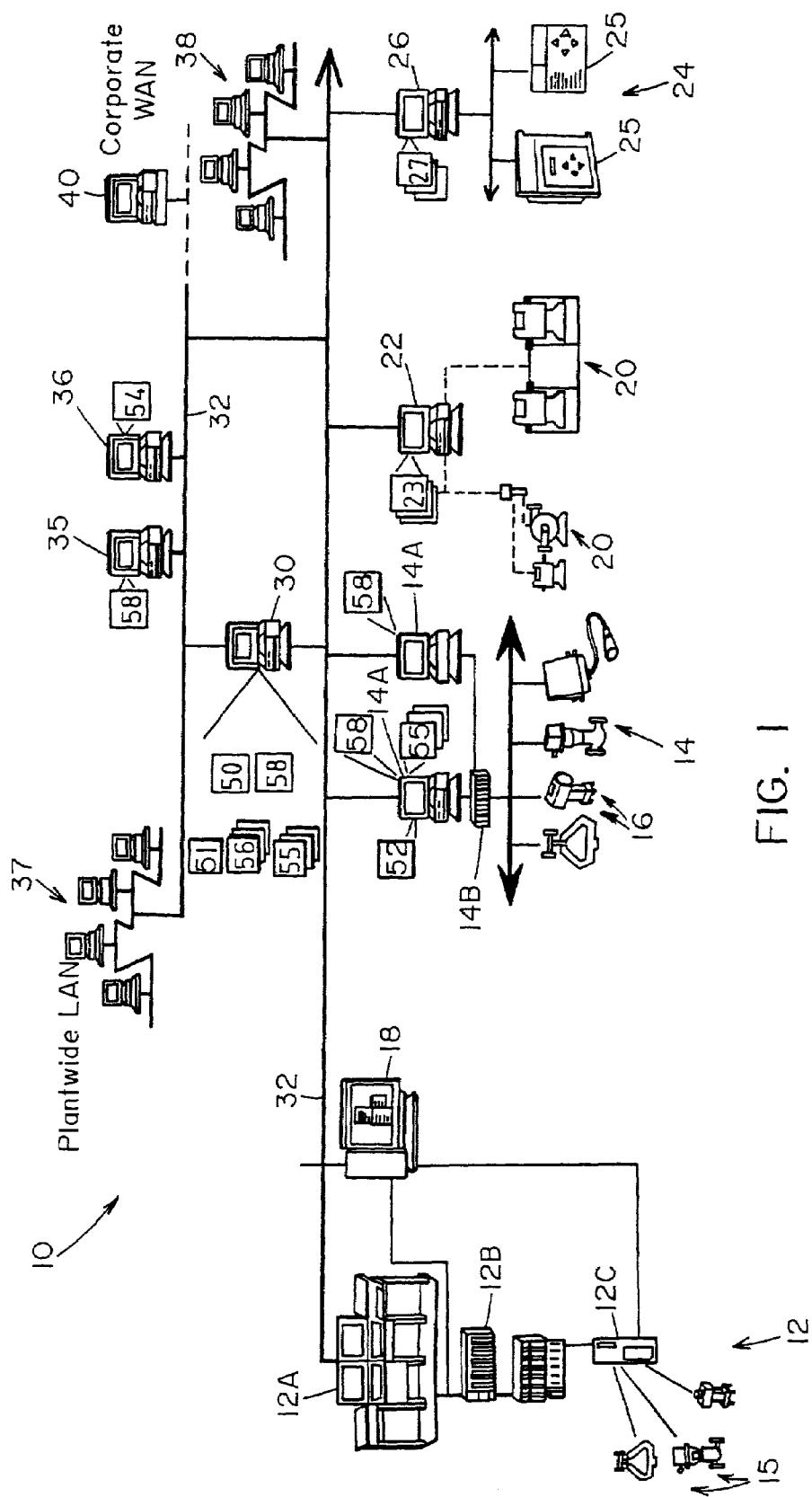
FIG. 1 is a block diagram of a process plant having an asset utilization expert configured to receive and coordinate data transfer between many functional areas of the plant.

Referring now to FIG. 1, a process plant 10 includes a number of business and other computer systems interconnected with a number of control and maintenance systems by one or more communication networks. The process plant 10 includes one or more process control systems 12 and 14. The process control system 12 may be a traditional process control system such as a PROVOX or RS3 system or any other DCS which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, Delta V™ controllers sold by Fisher-Rosemount Systems, Inc. of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSi Systems or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporary acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25. Again, in many cases, outside consultants or service organizations may use service applications that temporary acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

In the past, the various process control systems 12 and 14 and the power generating and maintenance systems 22 and 26 have not been interconnected with each other in a manner that enables them to share data generated in or collected by each of these systems in a useful manner. As a result, each of the different functions such as the process control functions, power generation functions and rotating equipment functions have operated on the assumption that the other equipment within the plant which may be affected by or have an affect on that particular function is operating perfectly which, of course, is almost never the case. However, because the functions are so different and the equipment and personnel used to oversee these functions are different, there has been little or no meaningful data sharing between the different functional systems within the plant 10.

To overcome this problem, a computer system 30 is provided which is communicatively connected to the computers or interfaces associated with the various functional systems within the plant 10, including the process control functions 12 and 14, the maintenance functions such as those implemented in the computers 18, 14A, 22 and 26 and the business functions. In particular, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a bus 32. The bus 32 may use any desired or appropriate local area network (LAN) or wide area network (WAN) protocol to provide communications.

As illustrated in FIG. 1, the computer 30 is also connected via the same or a different network bus 32 to business system computers and maintenance planning computers 35 and 36, which may execute, for example, enterprise resource planning (ERP), material resource planning (MRP), accounting, production and customer ordering systems, maintenance planning systems or any other desired business applications such as parts, supplies and raw materials ordering applications, production scheduling applications, etc. The computer 30 may also be connected via, for example, the bus 32, to a plantwide LAN 37, a corporate WAN 38 as well as to a computer system 40 that enables remote monitoring of or communication with the plant 10 from remote locations.

In one embodiment, the communications over the bus 32 occur using the XML protocol. Here, data from each of the computers 12A, 18, 14A, 22, 26, 35, 36, etc. is wrapped in an XML wrapper and is sent to an XML data server which may be located in, for example, the computer 30. Because XML is a descriptive language, the server can process any type of data. At the server, if necessary, the data is encapsulated with to a new XML wrapper, i.e., this data is mapped from one XML schema to one or more other XML schemas which are created for each of the receiving applications. Thus, each data originator can wrap its data using a schema understood or convenient for that device or application, and each receiving application can receive the data in a different schema used for or understood by the receiving application. The server is configured to map one schema to another schema depending on the source and destination(s) of the data. If desired, the server may also perform certain data processing functions or other functions based on the receipt of data. The mapping and processing function rules are set up and stored in the server prior to operation of the system described herein. In this manner, data may be sent from any one application to one or more other applications.

Generally speaking, the computer 30 stores and executes an asset utilization expert 50 that collects data and other information generated by the process control systems 12 and 14, the maintenance systems 18, 22 and 26 and the business systems 35 and 36 as well as information generated by data analysis tools executed in each of these systems. The asset utilization expert 50 may be based on, for example, the OZ expert system currently provided by NEXUS. However, the asset utilization expert 50 may be any other desired type of expert system including, for example, any type of data mining system. Importantly, the asset utilization expert 50 operates as a data and information clearinghouse in the process plant 10 and is able to coordinate the distribution of data or information from one functional area, such as the maintenance area, to other functional areas, such as the process control or the business functional areas. The asset utilization expert 50 may also use the collected data to generate new information or data which can be distributed to one or more of the computer systems associated with the different functions within the plant 10. Still further, the asset utilization expert 50 may execute or oversee the execution of other applications that use the collected data to generate new types of data to be used within the process plant 10.

In particular, the asset utilization expert 50 may include or execute index generation software 51 that creates indexes associated with devices, like process control and instrumentation devices, power generation devices, rotating equipment, units, areas, etc, or that are associated with process control entities, like loops, etc. within the plant 10. These indexes can then be provided to the process control applications to help optimize process control and can be provided to the business software or business applications to provide the business persons more complete or understandable information associated with the operation of the plant 10. The asset utilization expert 50 can also provide maintenance data (such as device status information) and business data (such as data associated with scheduled orders, timeframes, etc.) to a control expert 52 associated with, for example, the process control system 14 to help an operator perform control activities such as optimizing control. The control expert 52 may be located in, for example, the user interface 14A or any other computer associated with the control system 14 or within the computer 30 if desired.

In one embodiment, the control expert 52 may be, for example, the control expert described in U.S. patent application Ser. Nos. 09/256,585 and 09/499,445 identified above. However, these control experts may additionally incorporate and use data related to the status of devices or other hardware within the process plant 10 in the decision making performed by these control experts. In particular, in the past, the software control experts generally only used process variable data and some limited device status data to make decisions or recommendations to the process operator. With the communication provided by the asset utilization expert 50, especially that related to device status information such as that provided by the computer systems 18, 14A, 22 and 26 and the data analysis tools implemented thereon, the control expert 52 can receive and incorporate device status information such as health, performance, utilization and variability information into its decision making along with process variable information.

Additionally, the asset utilization expert 50 can provide information pertaining to states of devices and the operation of the control activities within the plant 10 to the business systems 35 and 36 where, for example, a work order generation application or program 54 can automatically generate work orders and order parts based on detected problems within the plant 10 or where supplies can be ordered based on work being performed. Similarly, changes in the control system detected by the asset utilization expert 50 may cause the business systems 35 or 36 to run applications that perform scheduling and supply orders using, for example, the program 54. In the same manner, changes in customer orders etc. can be entered into the business systems 35 or 36 and this data can be sent to the asset utilization expert 50 and sent to the control routines or control expert 52 to cause changes in the control to, for example, begin making the newly ordered products or to implement the changes made in the business systems 35 and 36. Of course, if desired, each computer system connected to the bus 32 may have an application therein that functions to obtain the appropriate data from the other applications within the computer and to sending this data to, for example, the asset utilization expert 50.

Additionally, the asset utilization expert 50 can send information to one or more optimizers 55 within the plant 10. For example, a control optimizer 55 can be located in the computer 14A and can run one or more control optimization routines 55A, 55B, etc. Additionally or alternatively, optimizer routines 55 could be stored in and executed by the computer 30 or any other computer, and the data necessary therefore could be sent by the asset utilization expert 50. If desired, the plant 10 may also include models 56 that model certain aspects of the plant 10 and these models 56 can be executed by the asset utilization expert 50 or a control or other expert such as the control expert 52 to perform modeling functions, the purpose of which will be described in more detail herein. Generally speaking, however, the models 56 can be used to determine device, area, unit, loop, etc. parameters, to detect faulty sensors or other faulty equipment, as part of optimizer routines 55, to generate indexes such as performance and utilization indexes for use in the plant 10, to perform performance or condition monitoring, as well as for many other uses. The models 56 may be models such as those created by and sold by MDC Technology located in Teeside, England or may be any other desired types of models. There are, of course, many other applications that can be provided within the plant 10 and that can use the data from the asset utilization expert 50 and the system described herein is not limited to the applications specifically mentioned herein. Overall, however, the asset utilization expert 50 helps to optimize the use of all of the assets within the plant 10 by enabling the sharing of data and coordination of assets between all of the functional areas of the plant 10.

Also, generally speaking, one or more user interface routines 58 can be stored in and executed by one or more of the computers within the plant 10. For example, the computer 30, the user interface 14A, the business system computer 35 or any other computer may run a user interface routine 58. Each user interface routine 58 can receive or subscribe to information from the asset utilization expert 50 and either the same or different sets of data may be sent to each of the user interface routines 58. Any one of the user interface routines 58 can provide different types of information using different screens to different users. For example, one of the user interface routines 58 may provide a screen or set of screens to a control operator or to a business person to enable that person to set constraints or to choose optimization variables for use in a standard control routine or in a control optimizer routine. The user interface routine 58 may provide a control guidance tool that enables a user to view the indexes created by the index generation software 51 in some coordinated manner. This operator guidance tool may also enable the operator or any other person to obtain information about the states of devices, control loops, units, etc. and to easily see the information related to the problems with these entities, as that information has been detected by other software within the process plant 10. The user interface routine 58 may also provide performance monitoring screens using performance monitoring data provided by or generated by the tools 23 and 27, the maintenance programs such as the AMS application or any other maintenance programs, or as generated by the models in conjunction with the asset utilization expert 50. Of course, the user interface routine 58 may provide any user access to and enable the user to change preferences or other variables used in any or all functional areas of the plant 10.

Figure 2:
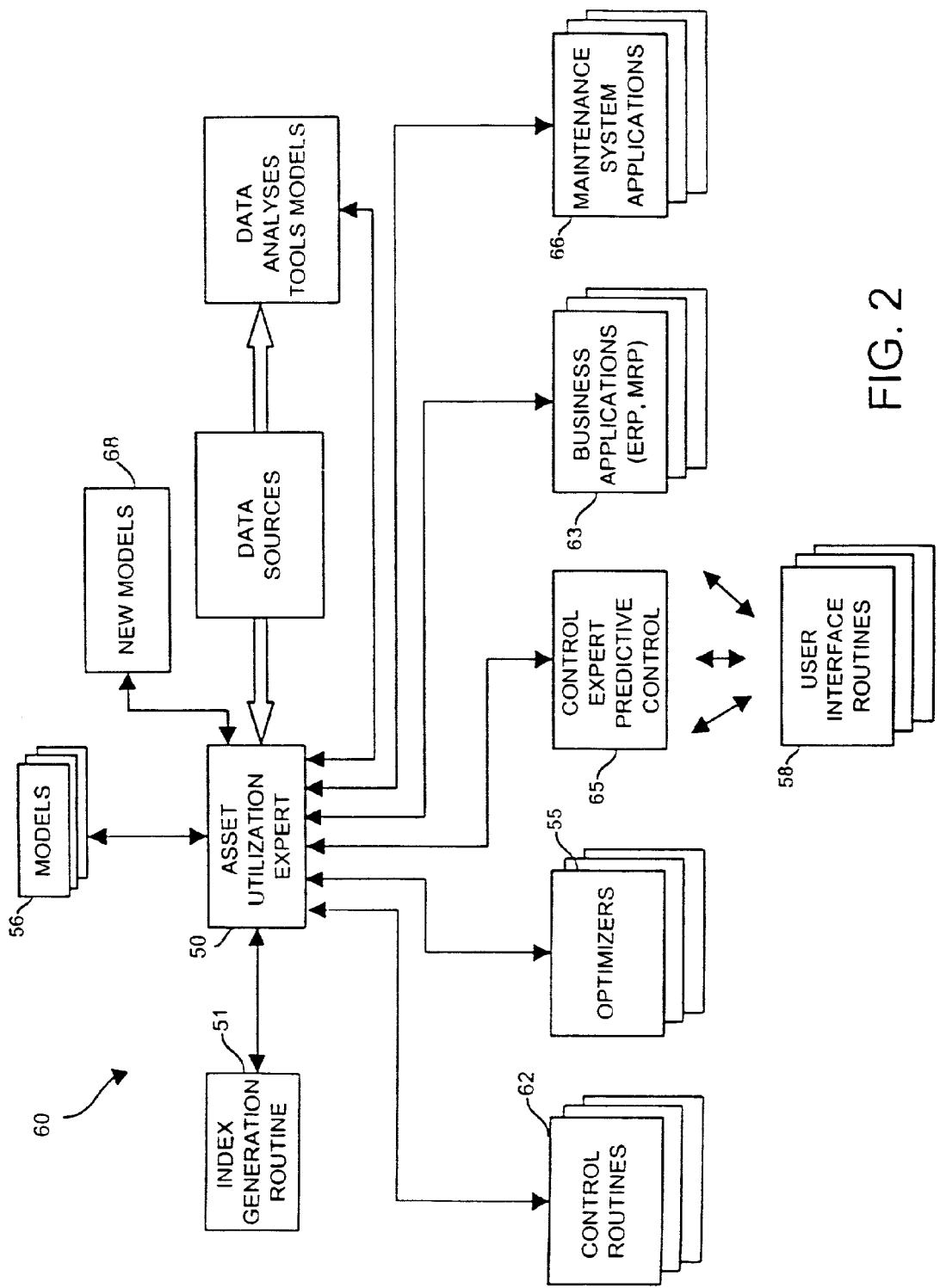
FIG. 2 is a data and information flow diagram with respect to the asset utilization expert within the plant of FIG. 1.

Referring now to FIG. 2, a data flow diagram illustrating some of the data flow between the asset utilization expert 50 and other computer tools or applications within the process plant 10 is provided. In particular, the asset utilization expert 50 may receive information from numerous data collectors or data sources such as multiplexers, transmitters, sensors, hand held devices, control systems, radio frequency (RF) transceivers, on-line control systems, web servers, historians, control modules or other control applications within the process plant 10, interfaces such as user interfaces and I/O interfaces as well as data servers such as buses (e.g., Fieldbus, HART and Ethernet buses), valves, transceivers, sensors, servers and controllers and other plant assets such as process instrumentation, rotating equipment, electrical equipment, power generation equipment, etc. This data can take on any desired form based on how the data is generated or used by other functional systems. Still further, this data may be sent to the asset utilization expert 50 using any desired or appropriate data communication protocol and communication hardware such as the XML protocol discussed above. Generally speaking, however, the plant 10 will be configured so that the asset utilization expert 50 automatically receives specific kinds of data from one or more of the data sources and so that the asset utilization expert 50 can take predetermined actions with respect to that data.

Also, the asset utilization expert 50 receives information from (and may actually execute) data analysis tools such as typical maintenance data analysis tools which are currently provided today, performance tracking tools, such as those associated with devices, as well as performance tracking tools for process control systems like that described in U.S. patent application Ser. No. 09/256,585 and 09/499,445 identified above. The data analysis tools may also include, for example, a root cause diagnostics application which detects root causes of certain types of problems, event detection such as that described in U.S. Pat. No. 6,017,143, regulatory loop diagnostics such as that disclosed in U.S. patent application Ser. No. 09/303,869 (filed May 3, 1999), which is hereby expressly incorporated by reference herein, impulse lines plugging detection applications, such as that described in U.S. patent application Ser. No. 09/257,896 (filed Feb. 25, 1999), which is hereby expressly incorporated by reference herein, other plugged line detection applications, device status applications, device configuration applications and maintenance applications, device storage, historian and information display tools, such as AMS, Explorer applications and audit trail applications. Still further, the expert 50 can receive data and any information from process control data analysis tools such as the advanced control expert 52, model predictive control process routines such as those described in U.S. patent application Ser. Nos. 09/593,327 (filed Jun. 14, 2000) and 09/412,078 (filed Oct. 4, 1999), which are hereby expressly incorporated by reference herein, tuning routines, fuzzy logic control routines and neural network control routines, as well as from virtual sensors such as that described in U.S. Pat. No. 5,680,409, which may be provided within the process control system 10. Still further, the asset utilization expert 50 may receive information from data analysis tools related to rotating equipment such as on-line vibration, RF wireless sensors and hand-held data collection units, oil analysis associated with rotating equipment, thermography, ultra-sonic systems and laser alignment and balancing systems, all of which may be related to detecting problems or the status of rotating equipment within the process plant 10. These tools are currently known in the art and so will not be described further herein. Still further, the asset utilization expert 50 may receive data related to power management and power equipment and supplies such as the applications 23 and 27 of FIG. 1, which may include any desired power management and power equipment monitoring and analysis tools.

In one embodiment, the asset utilization expert 50 executes or oversees the execution of mathematical software models 56 of some or all of the equipment within the plant 10, such as device models, loops models, unit models, area models, etc., which are run by, for example, the computer 30 or any other desired computer within process plant 10. The asset utilization expert 50 may use the data developed by or associated with these models for a number of reasons. Some of this data (or the models themselves) may be used to provide virtual sensors within the plant 10. Some of this data, or the models themselves, may be used to implement predictive control or real time optimal control within the plant 10. Some of the data generated by the models 56 may be used by the index generation routine 51 to generate indexes which are used in other applications, such as business and process control applications. The use of the models 56 for these and other purposes will be described in more detail below.

The asset utilization expert 50 receives data as it is generated or at certain periodic times over, for example, the bus 32 or other any communication network within the process plant 10. Thereafter, periodically or as needed, the asset utilization expert 50 redistributes the data to other applications or uses that data to generate and provide other information useful in different aspects of the control or operation of the process plant 10 to other function systems within the plant 10. In particular, the asset utilization expert 50 may supply data to cause the index generation routine 51 to create a series of composite indexes such as a performance index, a utilization index, a health index and a variability index associated with one or more of the devices, units, loops, areas, or other entities within the process plant 10. The generation and use of these indexes will also be discussed in more detail herein.

The asset utilization expert 50 may also provide data to and receive data from control routines 62 which may be located in process controllers or interfaces associated with those controllers, optimizers 55, business applications 63, maintenance applications 66, etc.

Furthermore, a control expert 65 (which may include a predictive process controller), which in the past simply assumed that the devices it was controlling either worked properly or not at all, can receive information from the asset utilization expert 50 related to the status or health of the devices it is controlling, such as the utilization, variability, health or performance indexes mentioned above or other information related to the operating status of devices, loops, etc. which can be taken into account when trying to control a process. The predictive controller 65, as well as the optimizers 55 may provide additional information and data to user interface routines 58. The predictive controller 65 or optimizer 55 may use the status information pertaining to actual current status of the devices in the network, as well as take into account goals and future needs such as those identified by business solution software provided from the asset utilization expert 50 as defined by, for example, business applications 63, to optimize control based on predictions within the control system.

Still further, the asset utilization expert 50 may provide data to and receive data from enterprise resource planning tools such as those typically used in business solutions or business computers 35 and 36. These applications may include production planning tools which control production planning, material resource planning, the work order generation tool 54 which automatically generates part orders, work orders, or supply orders for use in the business applications, etc. Of course, the part order, work order and supply order generation may be completed automatically based on information from the asset utilization expert 50, which decreases the time required to recognize that an asset needs to be fixed as well as the time is takes to receive the parts necessary to provide corrective action with respect to maintenance issues.

The asset utilization expert 50 may also provide information to the maintenance system applications 66, which not only alert maintenance people to problems immediately, but also take corrective measures such as ordering parts, etc. which will be needed to correct a problem. Still further, new models 68 may be generated using types of information that are available to the asset utilization expert 50 but that were previously unavailable to any single system. Of course, it will be understood from FIG. 2 that the asset utilization expert 50 not only receives information or data from the data models and the analysis tools but, also receives information from enterprise resource tools, maintenance tools and process control tools.

Moreover, one or more coordinated user interface routines 58 may communicate with the asset utilization expert 50 as well as any other applications within the plant 10 to provide help and visualization to operators, maintenance persons, business persons, etc. The operators and other users may use the coordinated user interface routines 58 to perform or to implement predictive control, change settings of the plant 10, view help within the plant 10, or perform any other activities related to the information provided by the asset utilization expert 50. As discussed above, the user interface routines 58 may include an operator guidance tool that receives information from the predictive controller 65 as well as information related to the indexes, which can be used by an operator or other user to help perform many functions such as viewing the status of a process or devices within the process, to guide the predictive controller 65 or to perform predictive or optimized control. Still further, the user interface routines 58 may be used to view data or to obtain data from any of the tools in the other parts of the process plant 10 via, for example, the asset utilization expert 50. For example, managers may want to know what is happening in the process or may need high level information related to the process plant 10 to make strategic plans.

As will be understood, therefore, once data is received at a central database and is converted to, for example, a common format, the data is stored in the database in some accessible manner and is made available to applications or users within the asset management suite 50. For example, applications related to process control, alarming, device maintenance, fault diagnostics, predictive maintenance, financial planning, optimization, etc. may use, combine and integrate the data from one or more of the different data sources to operate better than these applications have been able to operate in the past without data from vastly different or previously unaccessible data sources. The applications illustrated in FIG. 2 as being part of the asset utilization suite 50 may be any of the applications described in FIG. 1 or can be any other types of applications if so desired. Of course, both the data sources and the applications which use the collected data illustrated in FIG. 2 are exemplary in nature and more, less or different data sources and applications may be used. Likewise, the data sources themselves may be configured to receive data collected by the data collection and distributions system or the database. In this manner, different vendors or service providers, who may have proprietary applications, may collect certain data that they had not or were incapable of previously acquiring from the process plant which may enhance the products or services being offered by these service providers.

In one embodiment, it is expected that traditional process control service providers, who in the past have collected and generated data apart from the process control network using typically proprietary applications, will now provide the collected or generated data to system 50 which will then make that data available to other applications. These other applications can be applications executed within computers communicatively connected to the process control environment, such as applications within host devices, user interfaces, controllers, etc. Additionally, these other applications may be applications provided by or used by the traditional service organizations. In this manner, any application can now be designed to use any data generated within the process plant in any manner, whether by applications owned by the process system owners or applications owned and managed by service providers. As a result, there are many, many instances in which applications can be enhanced because they can use data that was previously unavailable to them. For example, a corrosion analysis service provider may be able to use data collected by a proprietary process control system or proprietary equipment monitoring application to enhance the reliability or predictability of the corrosion analysis. Such cross pollenation of data from vastly different types of service providers and applications was previously unavailable.

As mentioned above, the asset utilization expert 50 can execute or oversee the execution of one or more mathematical or software models 56 that model the operation of a particular plant or entities within the plant, such as devices, units, loops, areas, etc. These models may be hardware models or they may be process control models. In one embodiment, to generate these models, a modeling expert divides the plant into component hardware and/or process control parts and provides a model for the different component parts at any desired level of abstraction. For example, the model for a plant is implemented in software and is made up of or may include a set of hierarchically related, interconnected models for the different areas of the plant. Similarly, the model for any plant area may be made up of individual models for the different units within the plant with interconnections between the inputs and outputs of these units. Likewise, units may be made up of interconnected device models, and so on. Of course, area models may have device models interconnected with unit models, loop models, etc. In this example model hierarchy, the inputs and outputs of models for the lower level entities, such as devices, may be interconnected to produce models for higher level entities, such as units, the inputs and outputs of which may be interconnected to create still higher level models, such as area models, and so on. The way in which the different models are combined or interconnected will, of course depend on the plant being modeled. While a single, complete mathematical model for the whole plant could be used, it is believed that providing different and independent component models for different portions of or entities within the plant, such as areas, units, loops, devices, etc. and interconnecting these different models to form larger models is useful for a number of reasons. Furthermore, it is desirable to use component models that can be run independently of one another as well as together with other component models as part of a larger model.

While highly mathematically accurate or theoretical models (such as third or fourth order models) may be used for the entire plant or for any or all of the component models, the individual models need not necessarily be as mathematically accurate as possible and could be, for example, first or second order models or other types of models. These simpler models can generally be executed more quickly in software and can be made more accurate by matching the inputs and outputs of the models with actual measurements of inputs and outputs made within the plant in a manner described herein. In other words, the individual models may be tuned or tweaked to accurately model the plant or the entities within the plant based on actual feedback from the plant.

Figure 3:
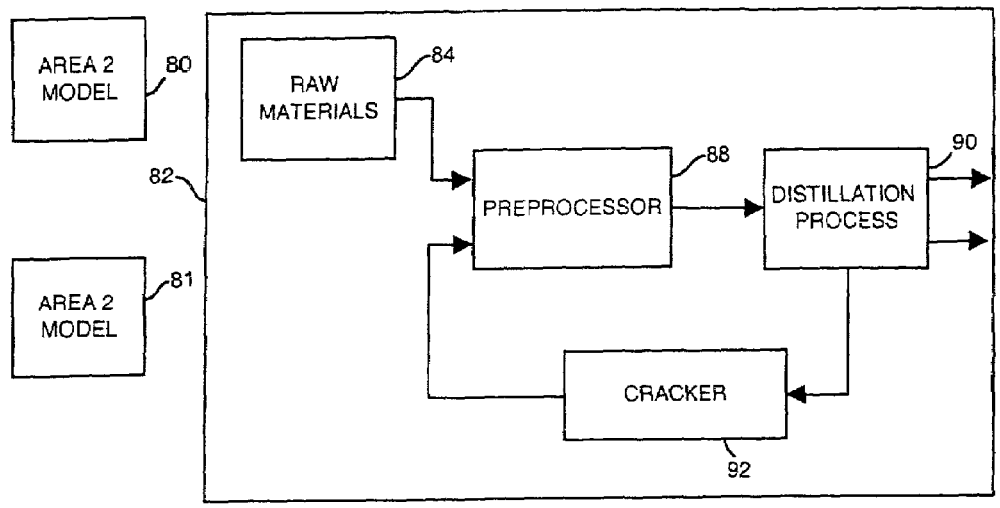
FIG. 3 is a block diagram of a model used to simulate the operation of an area within a plant.

The use of hierarchical software models will now be described with respect to FIGS. 3 and 4. FIG. 3 illustrates models for multiple areas 80, 81 and 82 within a refining plant. As illustrated in FIG. 3, the area model 82 includes a component model of a raw material source 84 which feeds raw material such as crude oil to a pre-processor model 88. The pre-processor 88 provides some refining to the raw material and provides an output, typically crude oil to a distillation process 90 for further refining. The distillation process 90 outputs $C_2H_4$, usually a desired product, and $C_2H_6$ which, generally speaking, is a waste product. The $C_2H_6$ is fed back to a $C_2$ cracker 92 which provides its output to the pre-processor 88 for further processing. The feedback from the distillation process 90 through the $C_2$ cracker 92 is a recycling process. Thus, the model for the area 82 may include separate models for the raw material source 84, the pre-processor 88, the distillation process 90 and the $C_2$ cracker 92 having inputs and outputs interconnected as illustrated in FIG. 3. That is, each component model may be tied to the inputs and outputs of other component models in the manner illustrated in FIG. 3 to form the model for the area 82. Of course, the models for the other areas 80 and 81 could have other component models having interconnected inputs and outputs.

Figure 4:
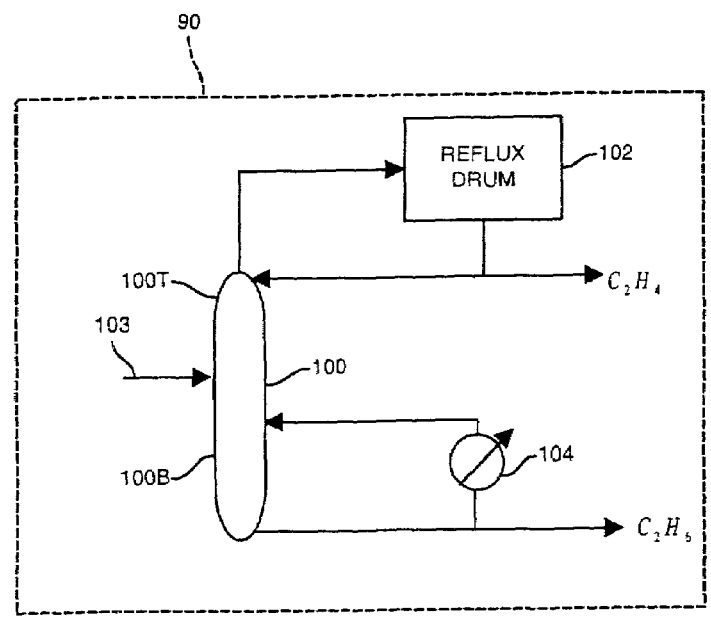
FIG. 4 is a block diagram of a model used to simulate the operation of a unit within the area model of FIG. 3.

Referring now to FIG. 4, the component model for the distillation process 90 is illustrated in more detail and includes a distillation column 100 having a top portion 100T and a bottom portion 100B. The input 103 to the distillation column 100 is an indication of pressure and temperature which may be tied to the output of the model for the pre-processor 88 shown in FIG. 3. However, this input could be set by an operator or be set based on actual measured inputs or variables within the plant 10. Generally speaking, the distillation column 100 includes a number of plates disposed therein and fluid moves between the plates during the distillation process. $C_2H_4$ is produced out of the top 100T of the column 100 and a reflux drum 102 feeds back some of this material to the top 100T of the column 100. $C_2H_6$ generally comes out of the bottom of the column 100 and a reboiler 104 pumps polypropylene into the bottom 100B of the column 100 to aid in the distillation process. Of course, if desired, the model for the distillation process 90 may be made up of component models for the distillation column 100, the reflux drum 102 and the reboiler 104, etc. having the inputs and outputs of these models connected as illustrated in FIG. 4 to form the component model for the distillation process 90.

As noted above, the component model for the distillation process 90 may be executed as part of a model for the area 82 or may be executed separately and apart from any other models. In particular, the input 103 to the distillation column 100 and/or the outputs $C_2H_4$ and $C_2H_6$ can actually be measured and these measurements may be used within the model of the distillation process 90 in a number of ways as described below. In one embodiment, the inputs and outputs of the model of the distillation process 90 may be measured and used to determine other factors or parameters associated with the model of the distillation process 90 (such as the distillation column efficiency, etc.) to force the model of the distillation process 90 to more accurately match the operation of the actual distillation column within the plant 10. The model of the distillation process 90 may then be used with the calculated parameters, as part of a larger model, such as an area or plant model. Alternatively or additionally, the model of the distillation process 90 with the calculated parameters may be used to determine virtual sensor measurements or to determine if actual sensor measurements within the plant 10 are in error. The model of the distillation process 90 with the determined parameters may also be used to perform control or asset utilization optimization studies, etc. Still further, component models may be used to detect and isolate developing problems in the plant 10 or to see how changes to the plant 10 might affect the selection of optimization parameters for the plant 10.

If desired, any particular model or component model may be executed to determine the values of the parameters associated with that model. Some or all of these parameters such as efficiency parameters may mean something to an engineer within the context of the model but are generally unmeasurable within the plant 10. More particularly, a component model may be generally mathematically described by the equation $Y=F(X, P)$, wherein the outputs Y of the model are a function of the inputs X and a set of model parameters P. In the example of the distillation column model of the distillation process 90 of FIG. 4, an expert system may periodically collect data (e.g., every hour, every ten minutes, every minute, etc. from the actual plant indicative of the actual inputs X to and the outputs Y from the entity to which the model pertains. Then, every so often, a regression analysis, such as a maximum likelihood, least squares or any other regression analysis may be performed using the model and multiple sets of the measured inputs and outputs to determine a best fit for the unknown model parameters P based on the multiple sets of measured data. In this manner, the model parameters P for any particular model may be determined using actual or measured inputs and outputs to reconcile the model with the entity being modeled. Of course, this process can be performed for any and all component models used within the plant 10 and can be performed using any appropriate number of measured inputs and outputs. Preferably, the asset utilization expert 50 collects the data associated with the appropriate inputs and outputs for a model over a period of time from the process control network and stores this data for use by the models 56. Then, at the desired times, such as every minute, hour, day, etc., the asset utilization expert 50 may execute the regression analysis using the most recently collected sets of data to determine the best fit for the model parameters using the collected data. The sets of measured input and output data that are used in the regression analysis may be independent of or may overlap with the sets of data used in a previous regression analysis for that model. Thus, for example, a regression analysis for a particular model may be run every hour but may use input and output data collected every minute for the last two hours. As a result, half of the data used in any particular regression analysis may overlap with the data, i.e., is the same as data that was used in a previous regression analysis. This overlapping of data used in the regression analysis provides for more continuity or consistency in the calculation of the model parameters.

Similarly, a regression analysis can be performed to determine if sensors making measurements within the process 10 are drifting or have some other error associated therewith. Here, the same data or potentially different data pertaining to the measured inputs and outputs of the entity being modeled are collected and stored by, for example, the asset utilization expert 50. In this case, the model can be generally mathematically expressed as $Y+dY=F(X+dX, P)$, wherein dY are the errors associated with the measurements of the outputs Y, and dX are the errors associated with measurements of the inputs X. Of course, these errors could be any types of errors, such as bias, drift, or non-linear errors and the model may recognize that the inputs X and outputs Y may have different kinds of errors associated therewith, with the different kinds of possible errors having different mathematical relationships to the actual measured values. In any event, a regression analysis, such as a maximum likelihood, least squares or any other regression analysis may be performed using the model with the measured inputs and outputs to determine a best fit for the unknown sensor errors dY and dX. Here, the model parameters P may be based on the parameters P calculated using a previous regression analysis for the model, or may be treated as further unknowns and may be determined in conjunction with this regression analysis. Of course, as the number of unknowns used within regression analysis increases, the amount of data required increases and the longer it takes to run the regression analysis. Furthermore, if desired, the regression analysis for determining the model parameters and the regression analysis for determining the sensor errors may be run independently and, if desired, at different periodic rates. This different periodicity may be beneficial when, for example, the time frame over which measurable sensor errors are likely to occur is much different, either greater than or less than, the time frame over which changes in the model parameters are likely to occur.

In any event, using these component models, the asset utilization expert 50 can perform asset performance monitoring by plotting the values of the determined model parameter(s) (and/or model inputs and outputs) versus time. Still further, the asset utilization expert 50 can detect potentially faulty sensors by comparing the determined sensor errors dY and dX to thresholds. If one or more of the sensors appears to have a high or an otherwise unacceptable error associated therewith, the asset utilization expert 50 can notify a maintenance person and/or a process control operator of the faulty sensor.

It will be understood from this discussion that the component models may be executed independently for different purposes at different times and, in many cases, may be executed periodically to perform the above described performance monitoring activities. Of course, the asset utilization expert 50 can control the execution of the appropriate models for the appropriate purposes and use the results of these models for asset performance monitoring and optimization. It will be understood that the same model may be run by the asset utilization expert 50 for different purposes and for calculating different parameters or variables associated with the model.

Figure 5:
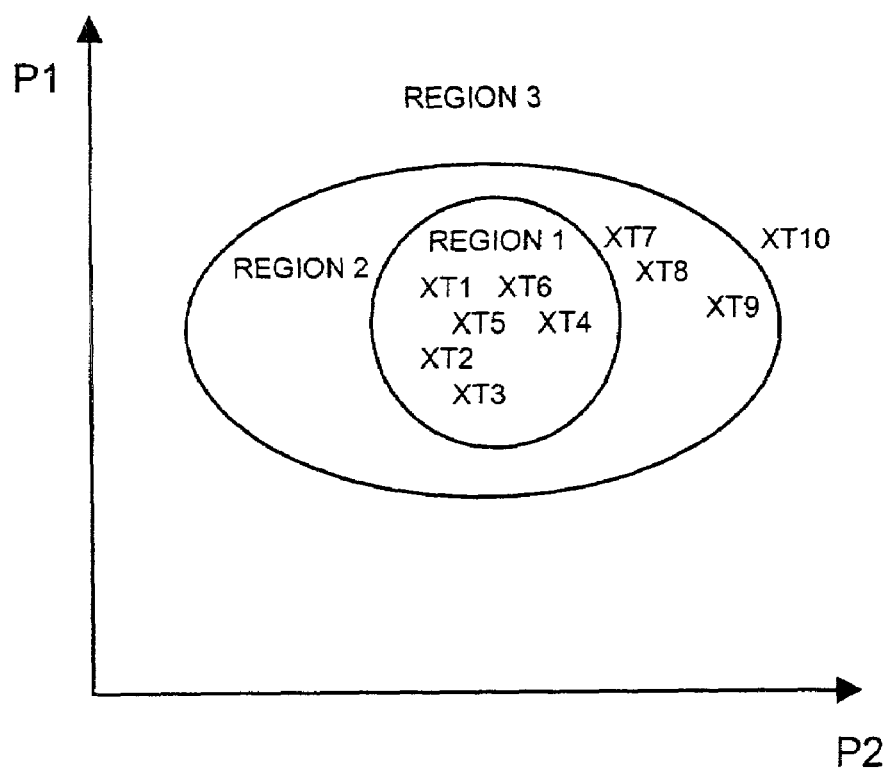
FIG. 5 is a two-dimensional performance monitoring diagram.

As noted above, the parameters, inputs, outputs or other variables associated with any particular model may be stored and tracked to provide performance monitoring for a device, a unit, a loop, an area or any other entity of a process or a plant. If desired, two or more of these variables may be tracked or monitored together to provide a multi-dimensional plot or measure of the performance of the entity. As part of this performance modeling, the location of the parameters or other variables within this multi-dimensional plot may be compared to thresholds to see if the entity, as defined by the coordinated parameters being monitored, is within a desired or acceptable region or is, instead, outside of that region. In this manner, the performance of an entity may be based on one or more parameters or other variables associated with that entity. FIG. 5 illustrates a two-dimensional plot of the operating region of an entity, such as the distillation column of FIG. 4, as defined by the values of the parameters P1 and P2 for this entity. Here, the parameters P1 and P2 (which may be determined using the model regression analysis described above or in any other desired manner) are plotted in a two-dimensional manner and the points on the plot (each being defined by a value for P1 and a value for P2) are determined for different times illustrated as T1-T10. Thus the point XT1 represents the point defined by the values for the parameters P1 and P2 at time T1. The points XT1 to XT10 on the plot of FIG. 5 illustrate that the entity was operating within a desired region (region 1) between the times T1 and T6, entered a less desirable but acceptable region (region 2) at time T7 and entered an unacceptable or failing region (region 3) at time T10. Of course, the boundaries of these different regions are determined beforehand by, for example, an expert and are stored in the computer 30 for access by the asset utilization expert 50 at any desired time. While FIG. 5 illustrates a two-dimensional parameter performance monitoring technique, this same technique could be applied in one dimension or in three or more dimensions to effect performance monitoring. Furthermore, the regions or other information about the location of the entity in the n-dimensional plot may be used by, for example, the index generation routine 51, to generate a performance index.

It will be understood that the asset utilization expert 50 can monitor one or more entities using the monitoring technique described above based on model parameters or other model variables and can report the operating states or performance measures of these entities to any other desired persons, functions or applications within the process plant 10, such as to a process control expert system, a maintenance person, a business application, a user interface routine 58, etc. Of course, it will also be understood that the asset utilization expert 50 may perform performance or condition monitoring on any desired entity, based on one, two, three or any other desired number of parameters or variables for each entity. The identity and number of variables or parameters to be used in this performance monitoring will generally be determined by an expert familiar with the process and will be based on the type of entity being monitored.

If desired, the asset utilization expert 50 may also define a performance index or plot by comparing one or more of the parameters determined by the models as described above with the same parameter determined by the model run in accordance with the design parameters of the entity being modeled. In particular, the asset utilization expert 50 may execute a model using the design parameters of the entity within the plant 10 to which the model pertains to determine what the designed performance of the entity would be if it was operating according to the current state of the process and using the actual inputs to the entity as measured within the plant 10. This design performance can then be compared to the actual performance of the entity as determined by the component model for that entity or as determined by the measured inputs and outputs of the entity to generate a measure of the performance of the entity.

Thus, for example, the efficiency of an entity may be determined using the component model which estimates the parameters of the entity (one of which may be efficiency) based on the regression analysis described above. At the same time, a model of the entity may be run using the parameters that would result according to the design criteria of the entity, but based on the actual inputs to and/or outputs from the entity. Thus, for example, if a different raw material was being input to the entity, the design model would be run using the efficiency that would result from the change in raw materials. The performance of the entity in both cases may be compared to determine a performance index which indicates how far from the possible or designed operation the actual entity is operating. This performance index can then be reported to and used by other applications or users of the system, such as a process control, a maintenance or a business person or application.

The component models 56 may also be used to perform process optimization. In particular, the asset utilization expert 50 may use one or more of the optimization routines 55 which execute the individual component models to optimize the operation of the plant in terms of some optimization criteria provided by, for example, a process control operator or a business person via a business application. The optimizer 55 can be a real time optimizer which operates in real time to optimize the plant 10 based on the actual state of the plant 10 at that time. Alternatively or additionally, an optimizer 55 may determine changes to be made to the plant 10, such as bringing certain devices or units back on line, that will provide the greatest optimization of the plant 10. Of course, other types of optimization routines 55 may be executed instead of or in addition to those mentioned here.

In one embodiment, the RTO+ real time optimization routine, which is provided by MDC Inc., may be used as a real time optimizer and may be executed at various or periodic times during operation of the plant 10, such as every 3-5 minutes, every 10-15 minutes, every hour, etc. Of course, other known or later developed optimizer routines which perform optimization less frequently, such as every 3 or 4 hours or every 3 to 4 days could be used instead.

The RTO+ optimizer implements three general phases each time it is executed to perform real time optimization. The RTO+ optimization routine first executes an input phase during which the routine checks to determine whether the variables that were previously indicated at the design of the optimizer as being variables which could be manipulated by the optimizer to perform optimization, such as set points or other inputs of various devices, units, etc., can actually be manipulated at the current time. This information may be available to the optimizer from the asset utilization expert 50 which obtains this information from the process control system and stores this information within any desired database. Thus, during the input phase, the optimizer actually determines, based on the data provided to it from the asset utilization expert 50, whether each of the possible manipulated inputs is still available to be changed because, in many instances, one or more of the potential manipulated inputs may not be available for change due to the fact that, for example, a device which provides that input is not operating or has been taken off-line or the device is being run in a mode other than the designed mode which prevents the controller from changing inputs to the device.

As part of the input phase, the real time optimizer may also determine if the variables that were supposed to change during the last run of the optimizer were actually changed to and reached the suggested or calculated values from the last run of the optimizer, i.e., the values to which they were supposed to be changed. If, for whatever reason, a variable that was supposed to change to a particular value did not reach that value, the optimizer recognizes that there is a problem that is preventing the change from occurring and, effectively, removes the option of changing this variable to that value during the next run of the optimizer. Detecting a failure of a variable to reach a value which it should have theoretically reached may also cause the optimizer to indicate to an operator that there may be a problem within the system that needs to be addressed.

Next, during the input phase, the optimizer performs a quick execution of each of the individual component models that make up the entire model using, for example, the actual inputs and outputs measured from the plant 10. The calculated outputs of each component model are then reviewed to see if there is any problem with any particular component model that will prevent the entire model from running accurately. Here, the optimizer may use the actual measured inputs for each entity (which have previously stored) to see if the individual component parts of the model work for these actual inputs to produce realistic outputs.

Assuming that each of the component models can be executed, the optimizer may look for discrepancies in the models which may effect the ability of the optimizer to optimize. For example, the optimizer may determine if a measurement made by a real device is the same as predicted by the component model using the actual inputs to the device. If the model (using the most recently calculated model parameters) predicts an output that deviates from the actual measurement of the output, such as if the model predicts a flow rate of 18 and a flow rate meter reads 20, then the optimizer may reset a constraint associated with the flow rate at two below the previously defined constraint. Thus, if the constraint associated with that flow rate was originally set at 25, the optimizer may use a constraint of 23 because the optimizer recognizes that its model is in error by two with respect to this variable. Of course, the optimizer may look for other inconsistencies or deviations between models and the actual measurements of the plant to reset, update or tweak constraints or other variables within the optimization routine.

In the next phase, known generally as the optimization phase, the optimizer runs the individual models in a predetermined order using the outputs from one component model as inputs to one or more of the other component models making up the entire model. Using the entire model, the constraints provided by the user and the new constraints determined by the input phase, as well as the optimization criteria, the optimizer determines the changes to be made to the input or manipulated variables which have been detected as currently being capable of manipulation which will optimize the plant over the time window in which the optimizer runs. This time window may be 3-4 minutes, 3-4 hours, etc., and is generally the periodic rate at which the optimizer runs. The use of optimization software is well known and any desired optimization software for this purpose could be used. Thus, in one example, a refining plant may be optimized to operate a $C_2$ cracker to make as much profit as possible based on the possible output products that can be produced by the $C_2$ cracker as determined by the current prices and lots of production associated with each of those possible outputs. A constraint, however, may be that the $C_2$ cracker has to produce a certain amount of one product because there is a business contract to provide that amount of that product which must be fulfilled no matter what the current price of that product happens to be. In another example, an optimization criteria may be to maximize the use of one particular raw material because the cost of keeping excess amounts of that raw material at the plant overshadows other costs or price concerns, such as products that have the highest current price.

It will be seen that the determination of the optimization criteria, which is typically performed by a business person or a business application, is very critical to the operation of the optimizer and thus, ultimately, to the operation of the plant 10. As a result, the asset utilization expert 50 may provide the business person, via the user interface routines 58, a systematic set of choices of what the optimization criteria will be at any particular time and provides the choices made by the operator or any other user to the optimization routine. In fact, there are many optimization variables that can be selected and the choice of these different criteria may be provided to the operator or business person via the user interface to allow the operator or business person to choose different optimization criteria in any desired manner.

Next, the optimization routine enters an output phase in which implementation of the results of the optimizer may be accomplished. In particular, after computing the suggested changes to the manipulated variables, the optimizer may determine if the manipulated variables or inputs to be changed are still available because one or more of the devices which were available at the time the optimizer began the optimization phase may have gone off-line or may have otherwise become unavailable, which will prevent the suggested changes in the input variables from being implemented. However, if all of the manipulated variables to be changed can still be changed, the suggested changes may be provided to an operator via, for example, a user interface (e.g., a graphical user interface). The operator may be able to simply press a button and have the changes to the manipulated variables initiated or downloaded to the process control routine automatically, such as changing set points, etc. in a matter determined by the optimizer. In another embodiment or in later stages of operation, for example, when the process is running properly, the optimizer may automatically implement the suggested changes if the operator does not prevent the instantiation of the these changes within a particular time window. Thus, the output of the optimizer may be used every time the optimizer executes unless the operator intervenes to prevent the changes from the optimizer from being used. As part of this operation, one or more of the user interface routines 58 may provide a screen to the operator indicating the suggested changes to be made and a button or bar which the operator uses to install the changes or to prevent the changes from being installed. If, in one embodiment, the user pushes a button to install the changes, all of the changes are sent to the appropriate controllers where they are checked for limits and then implemented.

The real time optimizer, such as that described above, may be executed relatively frequently compared to most optimizers for a number of reasons. First, the real time optimizer uses fitness for purpose component models which typically run much faster than the highly theoretical models that are typically used to design a plant. These component models are accurate, however, because one or more parameters of the models are being tweaked or altered (using the regression analysis described above) based on actual inputs and outputs of the plant 10. That is, the real time optimizer uses the model parameters provided by the last run of the regression analysis on the model to reconcile the model with the actual operation of the plant 10. Still further, the optimizer described above is faster than conventional optimizers because it uses restricted optimization steps. That is, the optimizer only tries to optimize over the time period between individual runs of the optimizer, which reduces the amount of processing performed by the optimization routine. Still further, the real time optimizer may be configured to recognize the occurrence of one or more significant events, which may trigger the real time optimizer to restart as these events may make previous recommendations unfeasible or undesirable.

While the use of a closed loop, real time optimizer has been discussed above, other types of optimizers 55 which use the same or different component models could also be executed by the asset utilization expert 50 in conjunction with or separately from the real time optimizer. These other optimizers could be executed less frequently and for other reasons. For example, a wideband optimizer may be used to look at or determine where the final optimal operating point of a process may ultimately be, even though the real time optimizer may not be able to drive the plant 10 to that point for some time. This wideband optimizer may enable the business person to make long term predictions about the plant 10 or may enable the operator to determine if the operation of the plant 10 is headed toward a desirable region. If the wideband optimizer determines that the ultimately achievable optimization point is still not acceptable, the operator may decide to change the configuration or other operating parameters of the plant 10.

Other optimizers, such as selection optimizers, may determine whether changes in the process configuration that need to be performed by the operator or maintenance person could better optimize the process. For example, in some cases, a selection optimizer may recognize that certain units or other manipulated inputs that are supposed to be available to the real time optimizer are no longer available for some reason, e.g., the devices associated with these inputs are down or are off-line. The selection optimizer runs one or more optimization tests assuming that one or more of these devices, units, etc. are available, to determine how much better the plant 10 would operate (i.e., how much more optimal the plant 10 could be with respect to some optimization criteria) if these entities were put back into operation. This optimizer may, for example, tell the operator or business person how much more money the plant 10 could make by getting certain units or devices online, or could tell the operator or business person which devices or units to focus on getting back into operation first. Such a selection optimizer may also try to optimize by turning particular pumps or valves on or off, by replacing other devices that are running in sub-optimal modes, etc. to determine which critical changes to the process or to the assets thereof could be made to make the process more profitable or optimal. The selection optimizer might use inputs from the operator or business person and/or might use other branch and bound techniques which are common in data processing or data mining routines to select the way in which to adjust the optimization variables. Other selection techniques could also be used, such as providing the selection optimizer with a series of rules to apply in a particular order to determine how to change the process or to determine which changes to the process, if implemented, would provide improvements or the most improvement to the plant 10.

As a result of the above discussion, it can be seen that the use of models provides many new types of data or information for the business applications, process control applications and asset maintenance and monitoring applications. In particular, the models can be used to perform performance monitoring and to produce a performance index which indicates the relative performance of a device, unit, area, etc. within a plant. This performance index may be a measure of the performance of an entity with respect to the possible performance of that entity. Furthermore, while device and unit models have been discussed above, similar models could be made and executed for process control entities, such as loops, units, etc. to provide performance measures and optimization criteria for these types of entities as well. Also, as indicated above, models may, in some cases, be used to measure or indicate the health of certain devices or other entities and to provide a health index indicative of these entities. For example, the error measurements of certain input and output sensors as determined by the regression analysis used on certain models may be used as or converted into an indication of the health of those devices. Also, other information not otherwise available to the process controller, such as model parameters and virtual sensor measurements based on the models could be provided to the process controllers or to the business persons for use in numerous manners.

Besides performance and health indexes, the asset utilization expert 50 can assist the index generation routine 51 in creating other types of indexes such as a utilization index and a variability index. A variability index indicates how much some signal into or out of, or some other parameter associated with a device, loop, unit, etc. varies as compared to how much this signal or parameter is expected to vary. The data needed to create this variability index may be collected by the asset utilization expert 50 and provided to the index generation routine 51 at any desired or convenient times. Of course, the normal amount of variation of a signal or parameter may be set by a manufacturer, engineer, operator or maintenance person familiar with the entity or may be based on a statistical measure (such as an average, standard deviation, etc.) associated with that or other similar entities within the plant and this normal or expected variation may be stored by or updated within the index generation routine 51.

The utilization index, in one form or another, tracks or reflects the utilization of individual devices, units, loops, or other entities and may provide some indication as to whether these entities are being over utilized or under utilized based on previously determined bench marks or operational goals. A utilization index can be generated based on measured uses of the actual device. For example, a device may be measured as to how often it is being used within a process or is being left idle and this index may be compared to a desired utilization for that entity to determine if the entity is being over or under utilized. The utilization index might identify devices, units, loops, etc. which are not being utilized as often as they could be or should be or, on the other hand, which are being utilized too much and, thus, are being over used.

In some instances, a utilization index might be determined based on the business decisions made regarding the appropriate or desired use of a particular device. For example, many processing or refinery plants use furnaces which are subject to the problem of coking and, as a result, must be periodically cleaned. Generally speaking, coking occurs in furnaces that are used in petroleum industries where it is desirable to rapidly heat a petroleum based fluid in a short amount of time. Such a furnace might have an input tube which travels through the interior of the furnace so that fluid traveling within the tube is rapidly heated to a high temperature, such as 1400° F. In some cases, to get the fluid at the center of the tube to such a high temperature, it may be necessary to heat the outside of the tube to about 1700° F. However, because the fluid traveling through the tube is petroleum based, some of the material forms into carbon or other kinds of viscous or particulate material which is deposited on the inside surfaces of the tubes which, in turn, reduces the heat transfer efficiency of the furnace over time. The deposit of this material is generally called coking. The more fluid through the tube, the more coking that occurs and, thus, the lower the efficiency of the furnace. At some point, the efficiency of the furnace becomes so low that the furnace must be taken off-line and cleaned. This cleaning process is time consuming and requires a great deal of manpower and resources, including steam cleaning equipment. As a result, the cleaning of these furnaces must generally be scheduled in advance to assure that the manpower and necessary equipment is available.

A business person or process control operator, knowing the fact that particular furnaces within the plant 10 will experience coking, may attempt to obtain the most efficient use of those furnaces by specifying how coking is to occur within each furnace over time. Thus, for example, a business person might decide to operate a particular furnace for a period of 15 days and wants to get the most use out of that furnace in that time period by running the furnace to its maximum coking level at the end of the 15 day period. If the furnace reaches its maximum coking level too soon, i.e., before the end of the 15 day period, the furnace must be taken off-line but still cannot be cleaned until the end of the 15 day period because that is when the cleaning manpower and machinery becomes available (i.e., has been scheduled). This early removal of the furnace may adversely affect the process operation. However, if the furnace does not reach its maximum allowable coking level by the end of the 15 day period, the furnace must still be taken off-line and cleaned because, again, that is the only time that the manpower and machinery is available. However, the furnace has been underused which means that an opportunity has been lost, because it effectively costs just as much to clean an underutilized furnace as it does to clean a fully utilized furnace. Presumably, other furnaces were being overused and subject to more coking than necessary based on the under use of this furnace.

Figure 6:
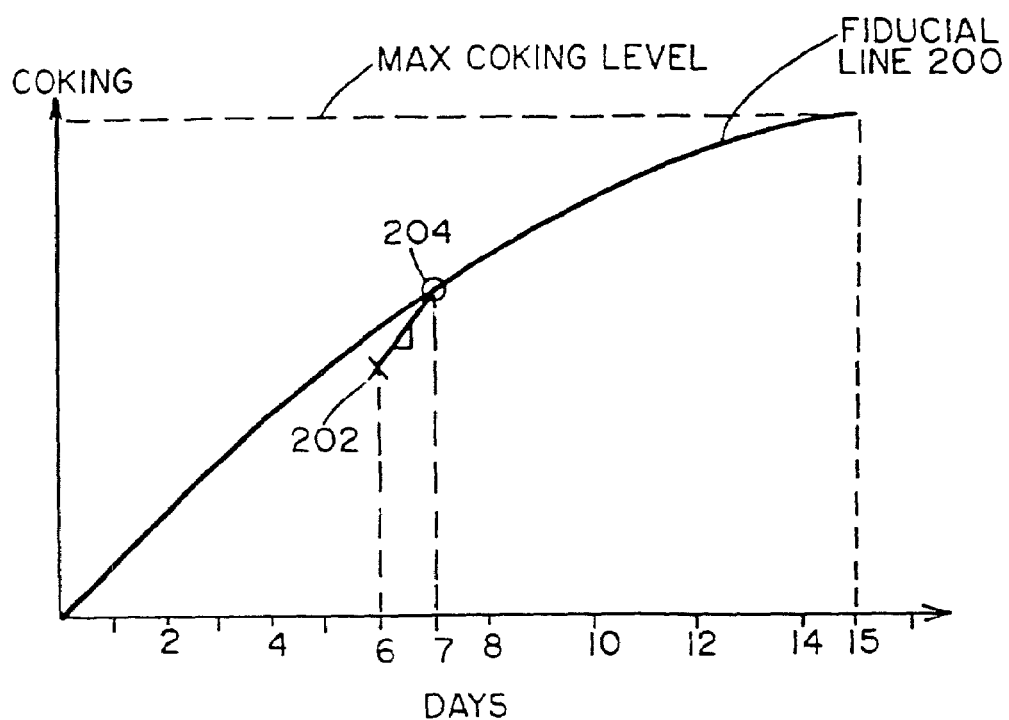
FIG. 6 is a graph illustrating an exemplary fiducial line chosen for use in a furnace and a coking rate based on this fiducial line.

To plan the best utilization of the furnace over a given time period, such as the 15 day period discussed above, the operator or business person may draw a fiducial line which defines the desired amount of coking for the furnace over time. An exemplary fiducial line 200 in a plot of coking of a furnace versus time is illustrated in FIG. 6. The fiducial line 200 specifies how the business person or operator desires to use the furnace with respect to coking over a period of 15 days (after which time this furnace will be cleaned). The coking of the furnace is directly related to the heat transfer efficiency of the furnace. As can be see from FIG. 6, at the end of the 15 day period, if the use of the furnace follows the fiducial line 200, the furnace will reach its maximum coking level (which corresponds to the minimum allowable heat transfer efficiency of the furnace). Of course, it will be understood that the fiducial line 200 of FIG. 6 is but one of many possible fiducial lines which could be selected.

Unfortunately, it is impossible, due to the high temperatures within the furnace, to measure the coking in the furnace at any particular time. However, a measure of coking within the furnace may be made, instead, with the use of one or more models for the furnace constructed according to the principles discussed above. Here, coking may be a parameter of the model which is determined from other variables within the model, inputs to and outputs from the model or using a regression analysis as described above. The asset utilization expert 50 may then run this model periodically to obtain, as a virtual senor measurement or as a model parameter, the amount of coking in the furnace. The equations for this determination are well known in the art and will not be discussed herein. Furthermore, if desired, an optimizer may use the coking value defined by the fiducial line 200 of FIG. 6 (or the coking rate defined by the slope of this line at any point) as an optimization criteria and set the manipulated variables of the plant in an attempt operate the furnace so that the coking within the furnace, as measured by the model for this furnace, follows the fiducial line 200 of FIG. 6.

Now, in the example of FIG. 6, it is assumed that the asset utilization expert 50, running the models for the furnace, determines that, at day 6, the coking of the furnace is at point 202, which is substantially below the desired coking amount as defined by fiducial line 200 at day 6. The fact that the coking estimate for the furnace at day 6 is below that defined by the fiducial line 200 means that the furnace is being under utilized according to the fiducial line 200. As a result, the asset utilization expert 50 may make this fact known to, for example, an operator or business person, such as by providing a utilization index for the furnace which identifies, in some desired or convenient manner, that the furnace is being underutilized according to previously defined utilization criteria.

Based on this utilization index, the business person or operator may recognize that there is an opportunity being missed to use the furnace more because, after the period of 15 days, the furnace will be shut down anyway whether or not the maximum amount of coking has occurred within the furnace. To get the coking parameter back on to the fiducial line 200 within a certain period of time such as, for example, by day 7 (which is marked as point 204 in FIG. 6), and to get the best utilization out of the furnace, the operator or the asset utilization expert 50 may define a line between the points 202 and 204. The slope of this line defines a rate of coking which is greater than the rate of coking allowed by the fiducial line 200 between days 6 and 7. The operator or optimization routine may then run the furnace more to obtain the rate of coking defined by the slope of the line between the points 202 and 204. This higher rate of coking may, for example, be used as a constraint, or even as an optimization parameter, within an optimization routine which controls the operation of the plant 10 or of the furnace. For example, and as is known, the amount or rate of coking can be adjusted by adjusting any of a number of parameters associated with the furnace, such as the speed that material is provided through the furnace (the faster the speed, the less coking that takes place), the exit temperature of the material out of the furnace (the higher the exit temperature, the more coking that takes place) and the amount of steam injected into the fluid sent through the furnace (typically, the more steam that is used, the less coking that takes place). The optimizer may use the desired rate of coking to adjust one or more of these parameters to obtain the new coking rate. In any event, the measurement of the utilization of the furnace based on the actual coking of the furnace compared to the desired coking of the furnace indicates, in this example, that the furnace is being under utilized and that greater optimization of the plant 10 can occur if the furnace is used more.

Figure 7:
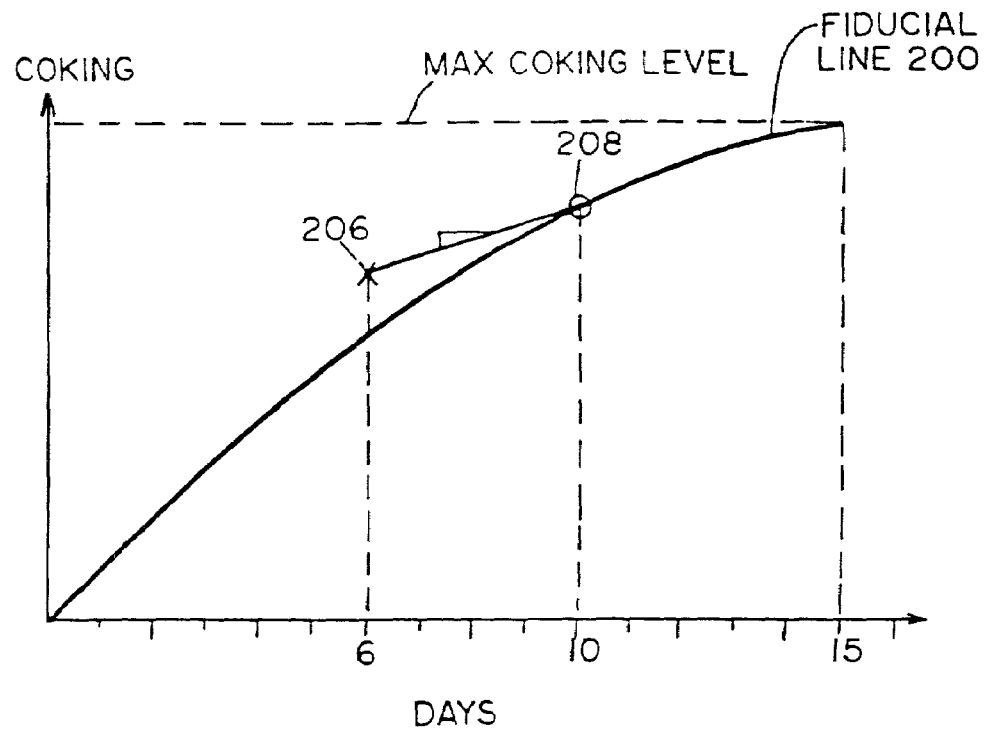
FIG. 7 is a graph illustrating the development of a new coking rate based on the fiducial line of FIG. 6.

Referring now to FIG. 7, if on the other hand, the coking of the furnace at day 6 was measured or determined by the models for the furnace to be above the fiducial line 200, such as at the point 206, then the furnace is being over utilized and the rate of use of the furnace should be reduced to enable the furnace to last 15 days. In this case, there may be another furnace that could be brought online or that is already online which could be used to compensate for the reduction in use of the furnace. Similar to the example of FIG. 6, an operator or business person may be informed of the over utilization of the furnace using, for example, a utilization index reflecting, for example, some indication of the difference between the actual coking and the desired coking amount. Thereafter, the operator or business person may determine that it is desirable to get the coking parameter of the furnace back onto the fiducial line by day 10, as the coking value of the furnace may already be greater than the value allowed for day 7 or 8. A line can be drawn between the point 206 and the point 208 which is the point on the fiducial line at day 10 and the slope of this newly drawn line may define the rate of coking that is allowed or desired for use between days 7 and 10. Of course, the operator or an optimizer or other control routine can implement control strategies to force the coking rate of the furnace to be the rate defined by the slope of the line between the points 206 and 208.

Other business decisions can come into play in terms of changing the utilization index of the furnace. For example, at day 6, even though the furnace may be running at or around the fiducial line in terms of the coking parameter, a business person may decide that it is necessary to get five more days use out of the furnace and thereby increase the life of the furnace to 20 days before it is cleaned. This may be done because the cleaning equipment will not be available until 20 days anyway. In this case, the fiducial line between day 6 and day 20 may be redrawn and the control routine or optimizer may then attempt to follow the new fiducial line. However, if the entire fiducial line is redrawn, what was previously being defined as 100% utilization or exact utilization at day 6 for a 15 day fiducial line may now be over utilization for a 20 day fiducial line. In this case, the asset utilization expert 50 may provide a new rate of coking as an optimization or constraint to an optimizer or to a process control routine to attempt to get the utilization index back to 100%. Similarly, if the furnace is to be shut down early such as at the end of 12 days, the furnace may now be under utilized based on a 12 day fiducial line and an optimizer or a process control routine may use a new coking rate in an attempt to get the utilization index back to 100%.

As will be noted, a business decision to run the furnace on a particular fiducial line in conjunction with the use of models for the furnace which measure or estimate the coking amount of the furnace at any particular time can be used to indicate whether a particular entity, such as the furnace, is being over utilized or under utilized during actual process runs. Furthermore, changes to the control of the process can be made to use the furnace more or less, based on the utilization index.

The utilization index for the furnace example given above can be calculated or expressed in any desired manner, such as one based on the difference between or a ratio of the actual coking value and the desired coking value, the new allowable coking rate, the difference between or a ratio of the desired coking rate as defined by the fiducial line and the new allowable coking rate, or any other measure of utilization. Of course, while one manner of determining a utilization index for a furnace has been described herein, there are many other manners of determining or defining utilization indexes for furnaces, as well as for other devices, units, loops, etc. within a process plant. In particular, utilization indexes for different entities can be measured in any desired manner and in different manners for different types of entities. In one example, the utilization index may be expressed as a percent, where 100% means that the entity is being used the correct or desired amount, a value over 100% means that the entity is being over utilized and a value under 100% means that the entity is being under utilized. Of course, other ways of measuring and expressing utilization could also be used within the context of different kinds of devices.

One important aspect of the system of FIG. 1 is the user interface routines 58 which provide a graphical user interface (GUI) that is integrated with the asset utilization expert 50 described herein to facilitate a user's interaction with the various asset utilization capabilities provided by the asset utilization expert 50. However, before discussing the GUI in greater detail, it should be recognized that the GUI may include one or more software routines that are implemented using any suitable programming languages and techniques. Further, the software routines making up the GUI may be stored and processed within a single processing station or unit, such as, for example, a workstation, a controller, etc. within the plant 10 or, alternatively, the software routines of the GUI may be stored and executed in a distributed manner using a plurality of processing units that are communicatively coupled to each other within the asset utilization system.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the asset utilization expert 50 described above may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the asset utilization expert 50.

Generally speaking, the GUI described herein provides intuitive graphical depictions or displays of process control areas, units, loops, devices, etc. Each of these graphical displays may include numerical status and performance indexes (some or all of which may be generated by the index generator routine 51 described above) that are associated with a particular view being displayed by the GUI. For example, a display depicting a process control area may provide a set of indexes reflecting the status and performance of that area (i.e., a particular portion of the process control system at a particular level of the equipment hierarchy). On the other hand, a display depicting a loop may provide a set of status and performance indexes associated with that particular loop. In any event, a user may use the indexes shown within any view, page or display to quickly assess whether a problem exists within any of the devices, loops, etc. depicted within that display.

Additionally, the GUI described herein may automatically, or may in response to a request by a user, provide maintenance information to the user. The maintenance information may be provided by any portion of the asset utilization expert 50. Similarly, the GUI may display alarm information, process control information, etc., which may also be provided by the asset utilization expert 50. Still further, the GUI may provide messages to the user in connection with a problem that has occurred or which may be about to occur within the plant 10. These messages may include graphical and/or textual information that describes the problem, suggests possible changes to the system which may be implemented to alleviate a current problem or which may be implemented to avoid a potential problem, describes courses of action that may be pursued to correct or to avoid a problem, etc.

Figure 8:
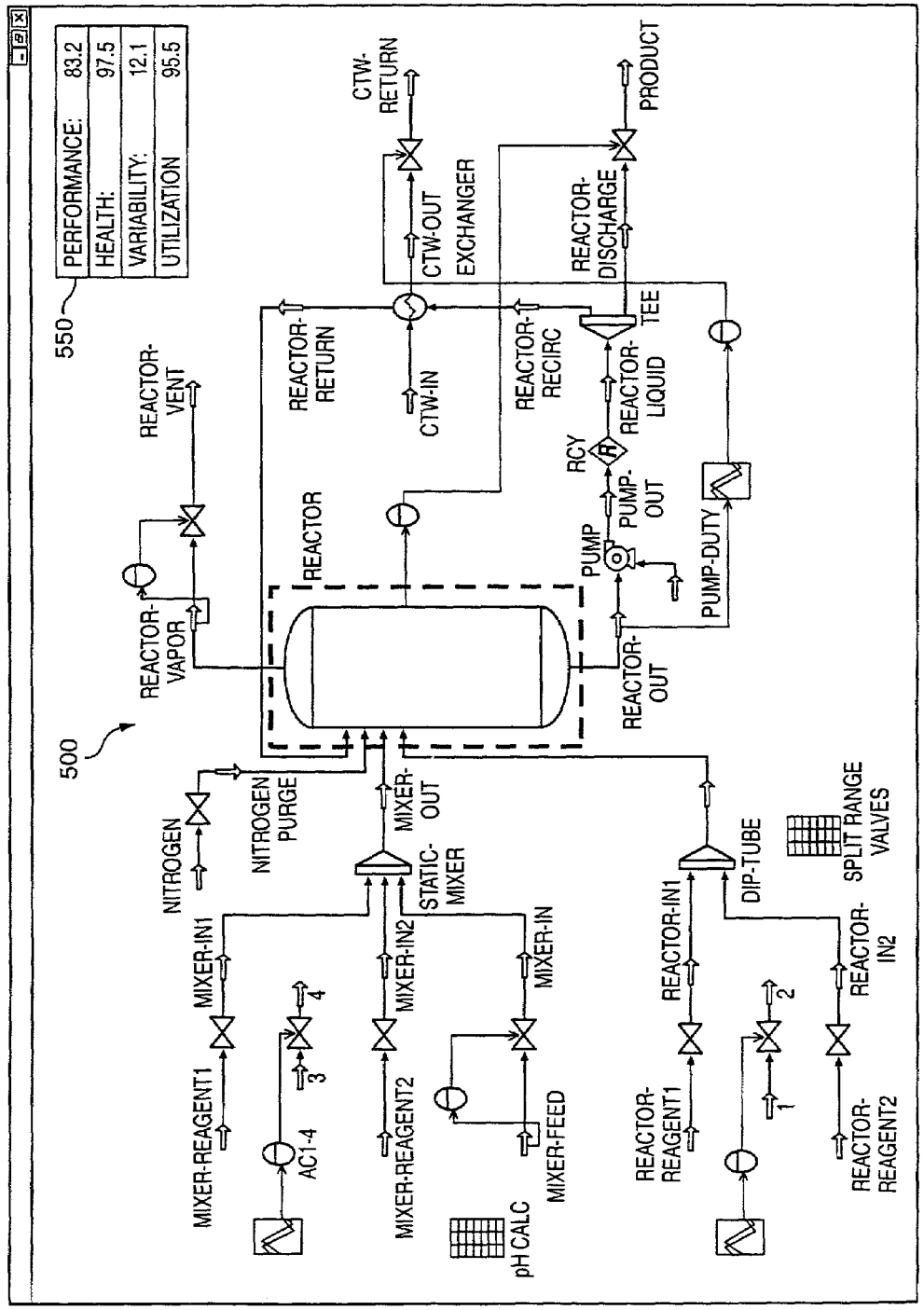
FIG. 8 is an exemplary depiction of a display representing a unit within a process control system that may be displayed by a graphical user interface.

FIG. 8 is an exemplary depiction of a display representing a unit 500 within a process control system that may be displayed by the GUI. As illustrated in FIG. 8, the unit 500 includes a plurality of devices such as, for example, valves, pumps, temperature transmitters, etc., all of which may be depicted graphically as shown. Additionally, the display may further include lines arrows, and any other indicia to represent logical and physical interconnections between the various devices. Of course, such graphical representations of process control systems (or portions of process control systems) are well known in the art and, thus, the manner of implementing these graphical representations or displays will not be described in further detail herein.

Importantly, the GUI display shown in FIG. 8 also includes a plurality of index names and values 550. In particular, the index names and values 550 include a performance index, a health index, a variability index and a utilization index, all of which have been discussed briefly above in connection with the asset utilization expert 50 and the index generation routine 51. The index names and values 550 may be displayed in a tabular format as shown or in any other desired format. The index names and values 550 are representative of the performance and status of the entire unit 500 and, thus, the index values shown are preferably, but not necessarily, composed of the index values associated with each of the sub-units and/or devices that make up the unit 500.

Before discussing the GUI and the manner in which asset information, process control information, maintenance information, diagnostic information or any other type of information is displayed to a user thereby, a brief discussion of the manner in which the performance and status indexes are generated is provided below. Also, it should be recognized that while a performance index, a health index, a variability index and a utilization index are described in detail herein in connection with the various displays of the GUI, additional and/or different indexes may be generated by the asset utilization expert 50 and displayed via the GUI without departing from the scope of the invention.

In general, each of the indexes generated by the index generator routine 51 and displayed via the GUI may be calculated for individual devices, for logical and/or physical groupings of devices, for logical processes (e.g., control loops), for logical groupings of devices such as units and areas, etc. In other words, the indexes may, in principle, be calculated at each level of the equipment and logical hierarchy of a process control system or, more generally, an asset utilization system, which may include one or more process control systems. However, the meaning of a particular index may depend on the context (i.e., whether the index corresponds to a logical or a physical grouping of devices and/or parameters) in which the index is generated and displayed and may depend on the level of the hierarchy at which it is displayed. For example, at the lowest level of the equipment hierarchy, indexes correspond to physical devices such as valves, temperature sensors, actuators, etc. Thus, each device may have a unique set of indexes that may be generated within the device or for the device based on information stored within the device at the time the device is manufactured. Accordingly, each device may generate and provide its indexes to higher levels of the hierarchy and to the asset utilization expert 50 as needed.

Similarly, units or loops, each of which is composed of one or more devices or function blocks may each have a unique set of indexes. However, the index values for each unit or loop may be generated by mathematically combining the index values for the individual devices or function blocks used within the unit or loop. Thus, if a unit or loop is composed of a pressure transmitter, a valve and a pump (or function blocks associated with the operation of these devices), the index values for the unit or loop may be based on various mathematical combinations of the index values generated for or by each of those devices or function blocks making up the unit or the loop. Likewise, because sub-unit and unit levels of the hierarchy are composed of one or more loops which, in turn, are composed of devices, the index values for each sub-unit and unit may be generated by mathematically combining loop or device index values. Still further, area indexes may be determined as combinations of the units, loops, devices, etc. within the area.

As discussed in greater detail below, the mathematical combination of device index values to form index values for loop, sub-unit, unit and area levels of the hierarchy may use weighted summations or averages, or any other suitable mathematical combination. Of course, the calculation of one or more of the performance, health, variability and utilization indexes may not be appropriate, required or useful for every level of the logical and equipment hierarchies. FIG. 9 is an exemplary table that illustrates one manner in which the performance index (PI), the health index (HI), the variability index (VI) and the utilization index (UI) may or may not be generated for the device, loop, sub unit and unit levels of the system hierarchy. As shown in FIG. 9, the PI may be generated for the unit and sub unit levels. At the unit and sub unit levels, the PI may be calculated by comparing a model (such as one of the models 56) of the unit or sub unit to the actual performance of the unit or sub unit or in any other desired manner. In particular, the PI in this context (i.e., at the unit and sub unit levels of the hierarchy) may be, for example, an efficiency with respect to a theoretical maximum or, alternatively, with respect to an empirically derived maximum efficiency based on actual system performance. The table shown in FIG. 9 also indicates that the PI need not be calculated for individual devices or loops. However, in some applications it may be desirable to calculate a PI for loops and devices. For example, in the case of calculating a PI for a device, the device manufacturer may store performance information within the device so that during operation the device may calculate a PI based on a comparison of an actual performance characteristic (such as, for example, an operating efficiency) to stored performance information, which may include a theoretical maximum device efficiency. Of course, the index generation routine 51 may also perform this function. In the case of calculating a PI for a loop, the system may, for example, compare the maximum or average loop error (i.e., the steady state error signal) to some predetermined minimum error value which, ideally, may be zero. In this manner, a small loop error may correspond to a PI value that is indicative of good performance.

FIG. 9 also illustrates that the VI may be calculated at the loop and device levels of the hierarchy. At the device level, the VI may be calculated by comparing the changes or deviations in a device output to an expected or desired amount of change or variation. An excessively high or an excessively low VI value may be indicative of a device failure or malfunction or possibly an imminent failure or malfunction. Likewise, at the loop level, excessively frequent or large magnitude changes in the output of a loop may be indicative of a problem. In any case, the VI for loops and devices may be based on a comparison of actual parameter variability to expected parameter variability, which may be determined theoretically or empirically. Although FIG. 9 shows that the VI may not be calculated for the unit and sub unit levels, in some applications, it may nevertheless be desirable to generate a VI for these levels.

Further, FIG. 9 shows that the HI is calculated for the device, loop, sub unit and unit levels. The HI for a device may be based on historical usage of the device. In particular, the device manufacturer may store information relating to the life cycle of the device within the device and, based on the usage of the device and the environmental impacts imparted to the device during its operation (e.g., temperature variations, shocks, etc.), the device may determine to what extent the device has moved along its life cycle curve (i.e., aged). The manufacturer may program a device to provide an HI value which is indicative of the current status of the life cycle of the device. For example, a stroke type valve may have an expected useful operating life cycle of 250,000 full stroke cycles and the manufacturer of the stroke valve device, which is typically a smart field device, has stored in its memory the expected number of lifetime operating strokes along with the current number strokes that the valve has completed. Thus, in the case where an HI value may range from between zero and ten (where zero represents poor health and ten represents perfect health), the HI value generated by the valve may range from zero to ten as the number of strokes rises from zero to 250,000. Of course, the precise relationship between the HI values and the life cycle characteristic (e.g., strokes) may not be linear. To the contrary, many life cycle characteristics follow an exponential characteristic, whereby failure and degradation in device performance/operation progresses more rapidly as time passes, as strokes are completed, etc. Of course, there are many other manners of defining or computing an HI for a device, based on the current detected state of the device and how well it is operating. For example, if the device has two detected minor problems, its HI may decrease.

The HI for a loop, on the other hand, is preferably, but not necessarily, a mathematical combination (such as, for example, a weighted summation or average) of the HI values for the individual devices or functions blocks that make up the loop. Likewise, the HI values for the sub unit and unit levels may also be a mathematical combination of the underlying HI values for loops and sub units. Thus, ultimately, the HI values hierarchy for levels above the device level are based on one or more HI values for devices that have been formed into composite values.

As is also shown in FIG. 9, the UI may be calculated for the loop, sub unit and unit levels, but may not necessarily be calculated for the device level. Generally speaking, the UI represents the degree to which a particular asset (e.g., a loop, a sub unit or a unit) is being exploited in comparison to its capacity or desired utilization. For example, the UI value may be based on the amount of time for which a unit, sub unit or loop is being used to perform control or produce outputs. Additionally or alternatively, the UI value may be based on the amount of material which is being processed by the loop, sub unit and/or unit in comparison to the maximum amount that may be processed by that loop, sub unit, unit, etc.

Figure 10:
FIG. 10 is an exemplary chart depicting one manner in which a performance index for a unit may be calculated.

FIG. 10 is an exemplary chart depicting one manner in which the PI for the unit 500 shown in FIG. 8 may be calculated. As shown in FIG. 10, each of a plurality of loops 575 that make up the unit 500 has its own PI and weighting coefficient, which may be user selected or defined based on the relative importance of that particular loop to the overall operation of the unit 500. The indexes and weights for the loops 575 may then be mathematically combined using a weighted average to arrive at a PI value of 83.2 for unit 500.

In a similar manner, the HI for the unit 500 may be calculated as a weighted average of the HI values for all of the devices (and/or loops) that make up the unit 500. A table such as that shown in FIG. 11 may be used to represent the values to be included in the weighted average. As is also shown in FIG. 11, a textual description may be associated with particular devices and index values. These textual descriptions may provide diagnostic information, maintenance information, etc. based on the HI value and the particular device associated with that HI value.

FIG. 12 is an exemplary table that illustrates one manner in which the VI may be calculated for a unit, such as the unit 500 shown in FIG. 8. As with the HI, the VI calculated for the unit 500 of FIG. 8 is based on a weighted average of the VI values for the individual devices, loops and/or sub units that make up the unit 500. Of course, the GUI may provide a user with the ability to see the weighted average data such as that illustrated in FIGS. 10-12 and may enable the user to change the weights.

Figure 13:
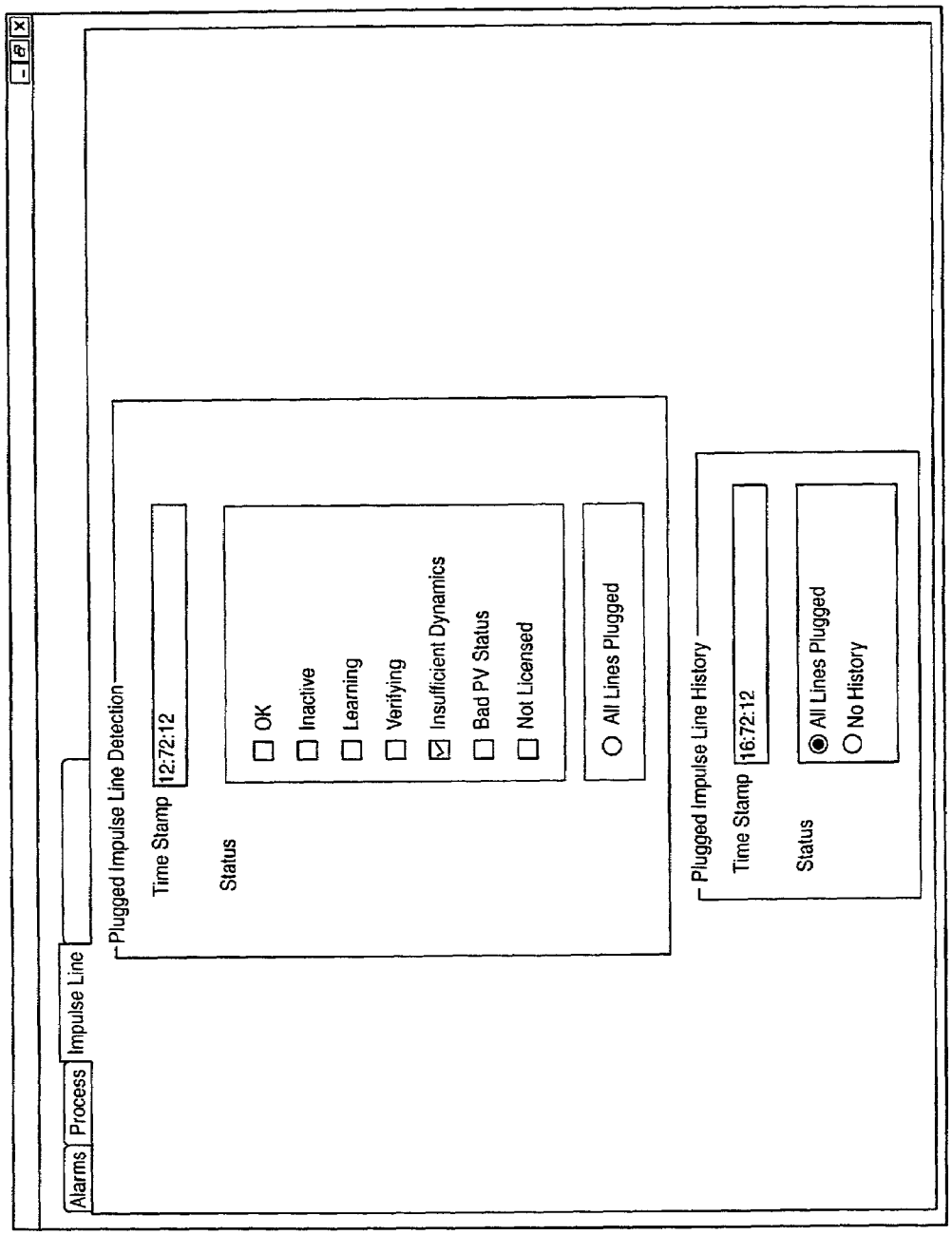
FIG. 13 is an exemplary display that may be provided by a graphical user interface in response to an abnormal variability index.
Figure 14:
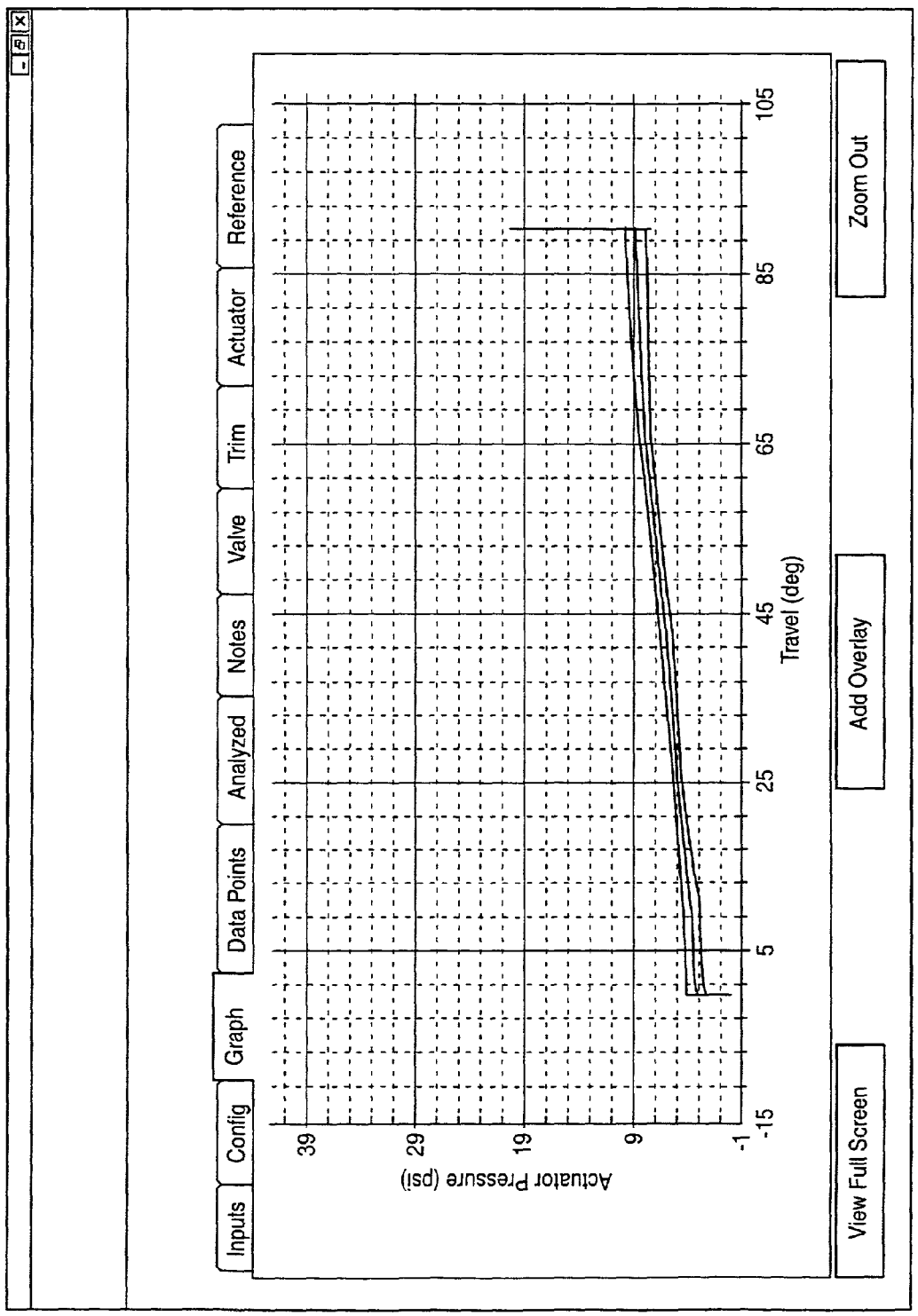
FIG. 14 is an exemplary display of the data used to generate a variability index.

FIG. 13 is an exemplary display that may be provided by the GUI in response to an excessive VI value associated with a device and/or loop. As shown in FIG. 13, the display may provide one or more possible explanations for an excessively high or an excessively low VI value associated with a particular device. In particular, the display may automatically, or may at the request of the user indicate that impulse lines associated with the device have become plugged, that the process is changing, that cavitations are present in an upstream pump, etc. This information may be made available to the GUI by the asset utilization expert 50 based on data analysis tools that detected these conditions. Similarly, as shown in FIG. 14, the VI for a valve may be explored further via the GUI by enabling the user to request the display of a graphical representation of the data used to generate the VI for that valve. Additionally, the GUI may display textual messages, either within a graphical display such as that shown in FIG. 14 or within any other display of the GUI, that indicate one or more possible causes for an excessively high (or possibly an excessively low) VI value. Such causes again may be provide by the asset utilization expert 50 based on the data available to it from all of the data sources and data analysis tools. For example, in the case of a valve demonstrating an excessive VI value, the GUI may indicate via textual messages that the valve is sticking, that cavitation may be occurring within the valve, etc.

Figure 15:
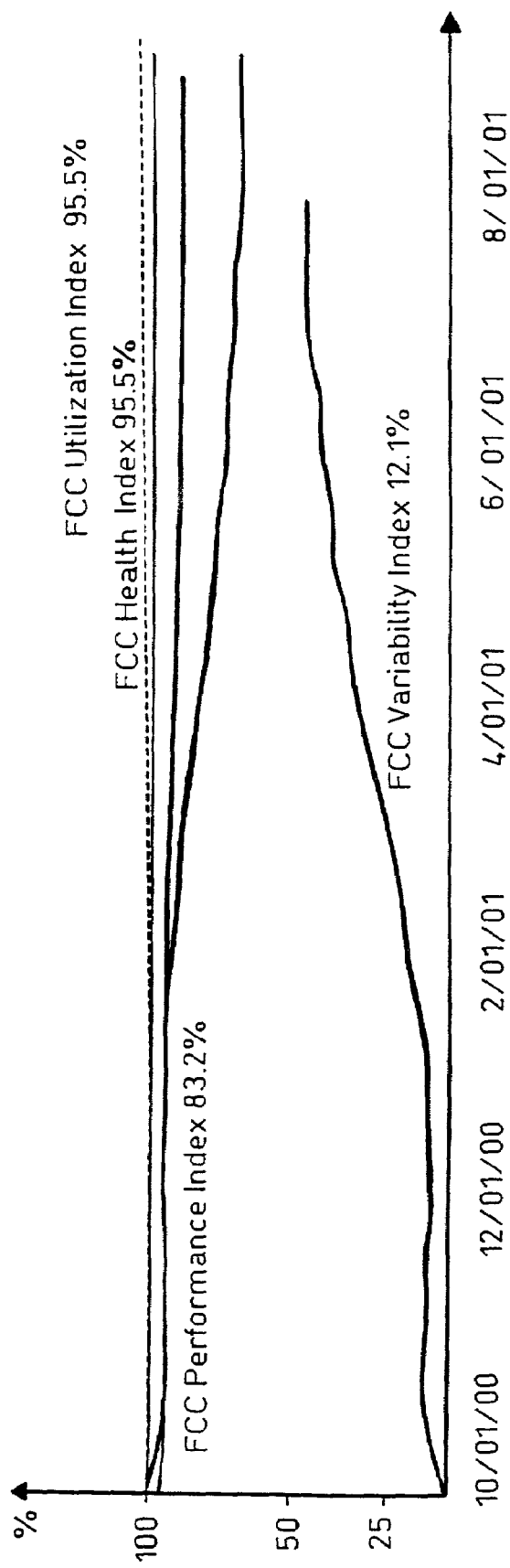
FIG. 15 is an exemplary graphical depiction of a display that may be provided by a graphical user interface.

FIG. 15 is an exemplary graphical depiction of a display that may be provided by the GUI to enable a user to monitor the performance of a unit, sub unit, loop, device, etc. within the plant 10. As shown in FIG. 15, the values of the various indexes may be plotted as a function of time, thereby enabling a user to more intuitively analyze any trends or any other time-based changes that may be indicative of a problem. Further, such a graphical depiction may also reveal important correlations or relationships between changes in the various indexes. For example, a user may be able to more easily identify a relationship between a decreasing or poor HI value and an increasing or excessively high VI value.

Still further, the GUI may also provide textual messages within the graphical display shown in FIG. 15 or in some other display or page that indicate to the user current or potential problems, which may be related to the displayed index values or changes thereof. These textual messages may identify possible solutions to the problems which have been identified. Although the graphical information depicted within FIG. 15 has been scaled so that the indexes are expressed as percentages and the time axis is labeled in units of months, any other units and display resolution may be used instead. For example, in the case where indexes may be or could be changing rapidly, the GUI may enable the user to display index values on an hourly basis, minute by minute, every few seconds, or more frequently (i.e., at a higher time resolution) if desired.

Figure 16:
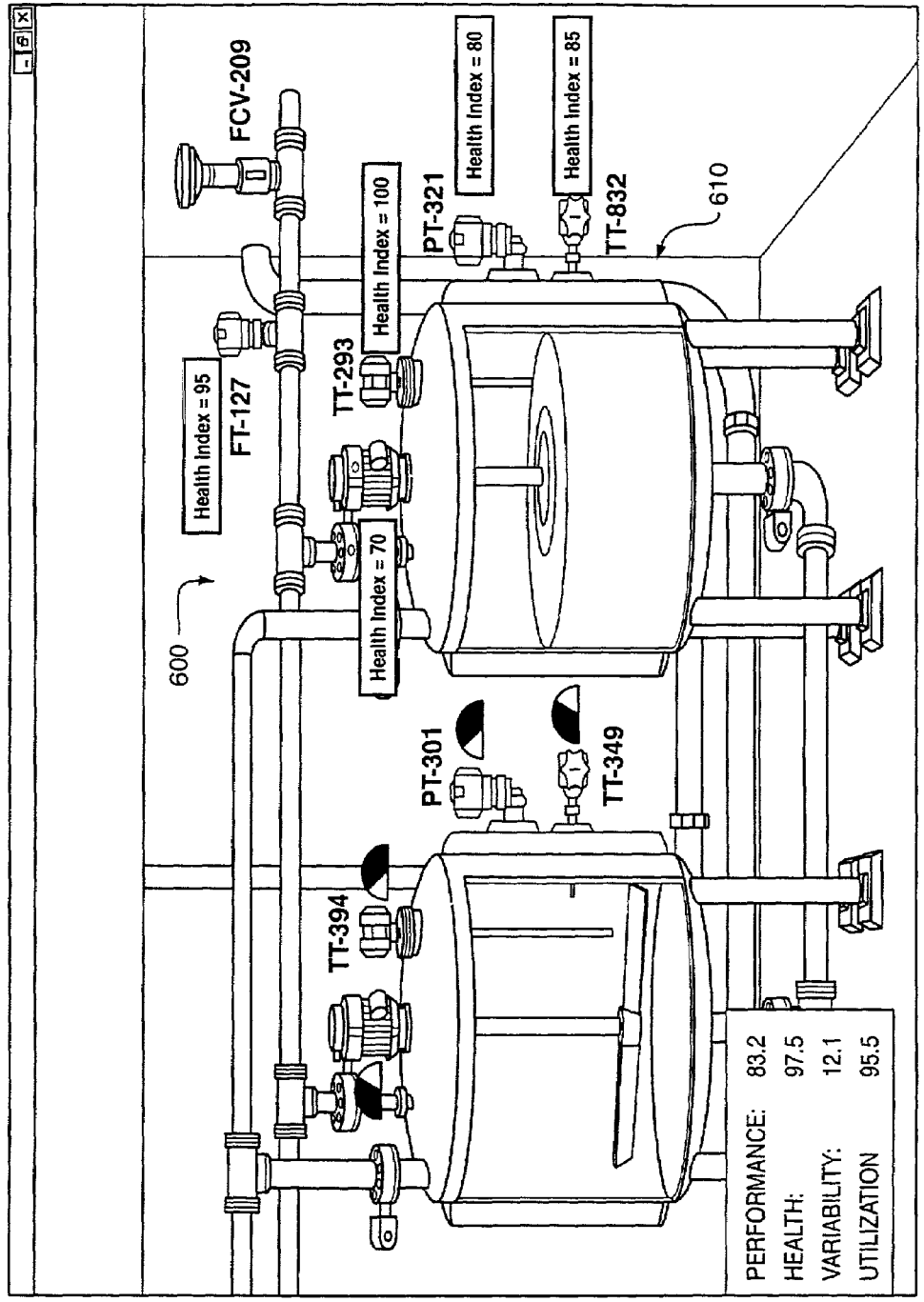
FIG. 16 is an exemplary graphical display that may be provided by a graphical user interface.

FIG. 16 is an exemplary graphical display that may be provided by the GUI to enable a user to quickly analyze the operational status and performance of a process area within the plant 10. As shown in FIG. 16, the GUI may graphically depict the physical equipment (and the interconnections therebetween) within a process area 600. Of course, it should be recognized that although a process area is depicted within the GUI display shown in FIG. 16, any other portion of the plant 10 such as, for example, a unit, sub unit, loop, device, etc. may be shown instead to achieve the same or similar results. In any event, the process area 600 is depicted as having a pair of tanks, a plurality of temperature transmitters, pressure transmitters, flow transmitters, etc. and pipes, all of which may be interconnected as shown in FIG. 16. Further, each of the physical devices may be displayed along with an associated alphanumeric identifier (e.g., TT-394) that uniquely identifies that device within the plant 10 and may also be displayed along with a graphic meter or gauge (i.e., the partially shaded semi-circular features) that enables a user to quickly determine the status of the sensing parameter associated with that device. For example, the GUI may display a graphic meter or gauge associated with a temperature transmitter and may shade more or less of the meter based on the temperature currently being sensed by the temperature transmitter. Importantly, one or more of the VI, HI, UI and PI values may be displayed for one or more of the devices shown within the area 600. By way of example only, the HI values for several of the devices that are connected to a tank 610 within the area 600 are displayed. However, more or fewer HI values could be displayed if desired. Additionally, different index values or groups of index values may be displayed for any of the devices that appear within the area 600 as desired. As can be appreciated from the display shown in FIG. 16, a user can quickly ascertain whether an area is performing properly and will continue to perform properly. Further, a user can also quickly identify those devices, units, sub units, etc. that may need attention and/or which may be causing a particular problem.

It will also be understood that a user may view successively lower and lower entities within a plant and be provided information about the indexes associated with each of these different entities or views. Thus, for example, a user may look at a view of the plant and see a particular set of indexes for the plant. The user may then focus on one area, such as by clicking on one of the areas within the plant view, and see the indexes associated with that area. Similarly, by clicking on units within the displayed area, the indexes for different units may be viewed. Likewise indexes for loops, sub units, devices etc. may then be viewed by focusing in on these different entities from a view of an entity in which these entities are located. In this manner, a user can quickly find the cause of a lower than (or higher than) expected index at any point or level of the plant.

Figure 17:
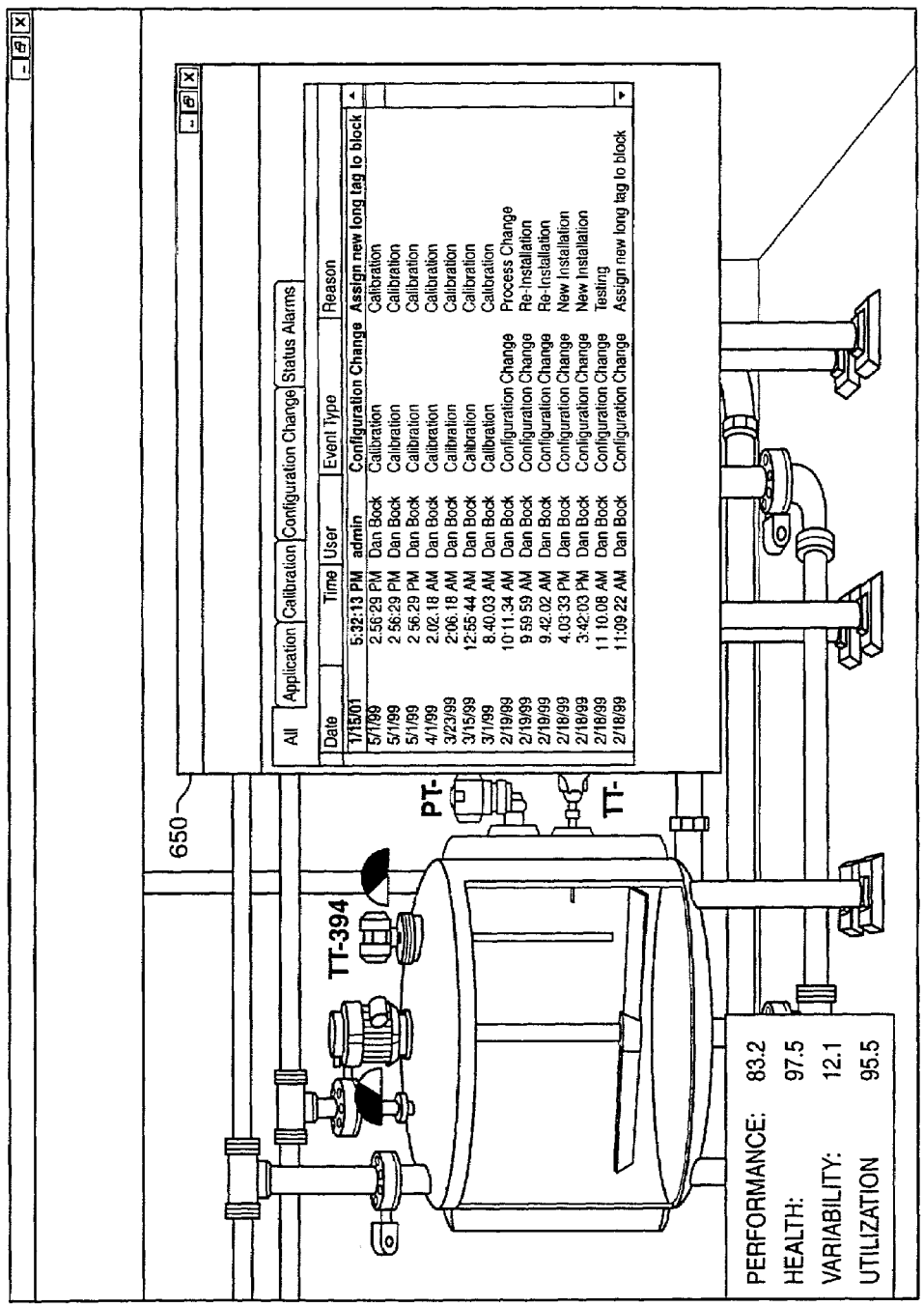
FIG. 17 is an exemplary depiction of a display that may be provided by a graphical user interface to enable a user to view audit trail information.

FIG. 17 is an exemplary depiction of a display that may be provided by the GUI to enable a user to view audit trail information in connection with any device used within the area 600. By way of example, a user may use a mouse to click on a given device or its alphanumeric identifier or, alternatively, may enter the identifier via a keyboard, to request a pop-up audit trail window 650 for that device. In this manner, a user can use the audit trail information to determine whether an improper or unacceptable index value may be related to a failure to calibrate the device properly or in a timely manner, whether a device has been configured properly or at all, etc.

Figure 18:
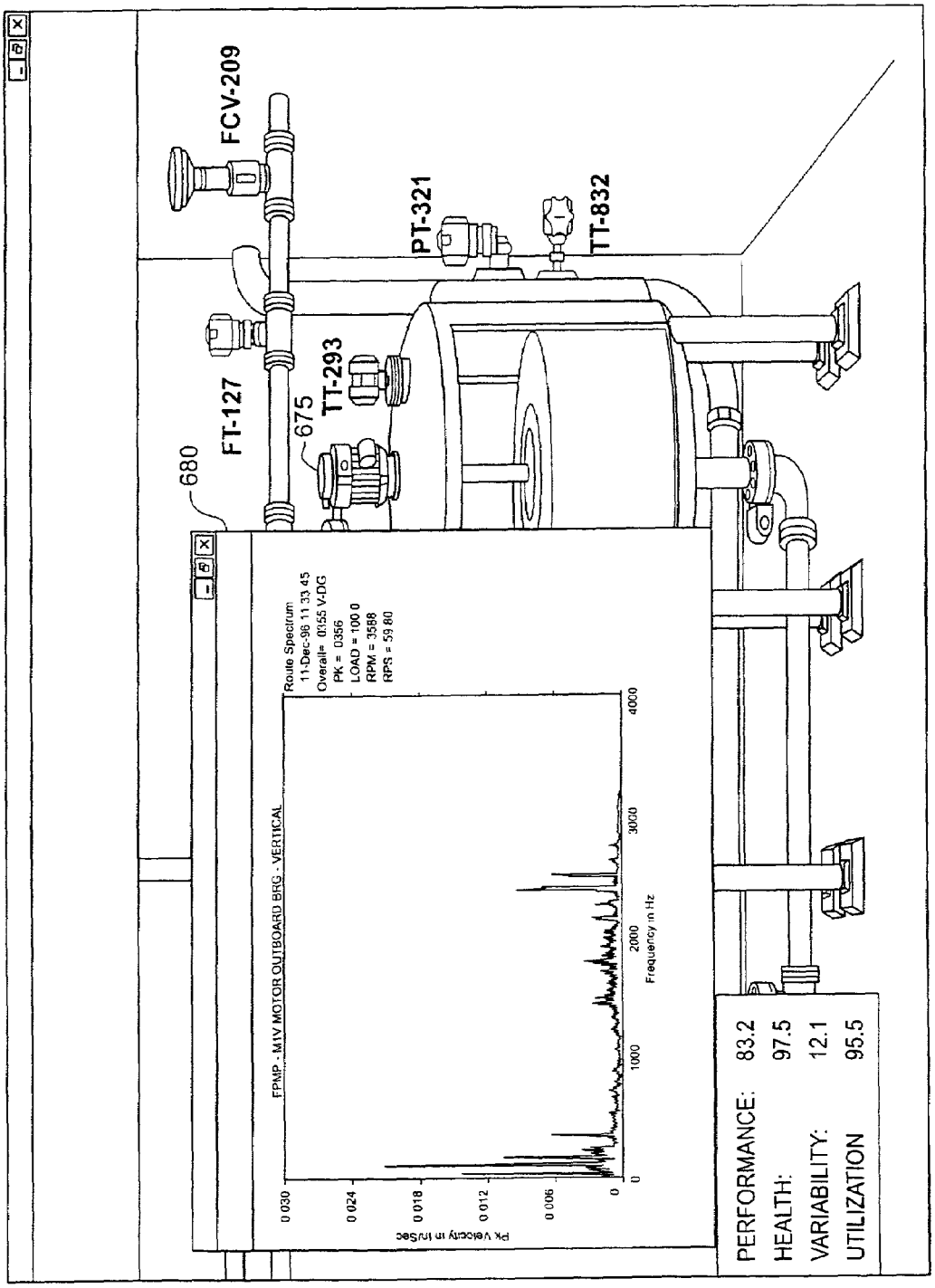
FIG. 18 is an exemplary depiction of a display that may be provided by a graphical user interface to enable a user to perform a more detailed analysis of data used to generate one or more indexes for a device.
Figure 19:
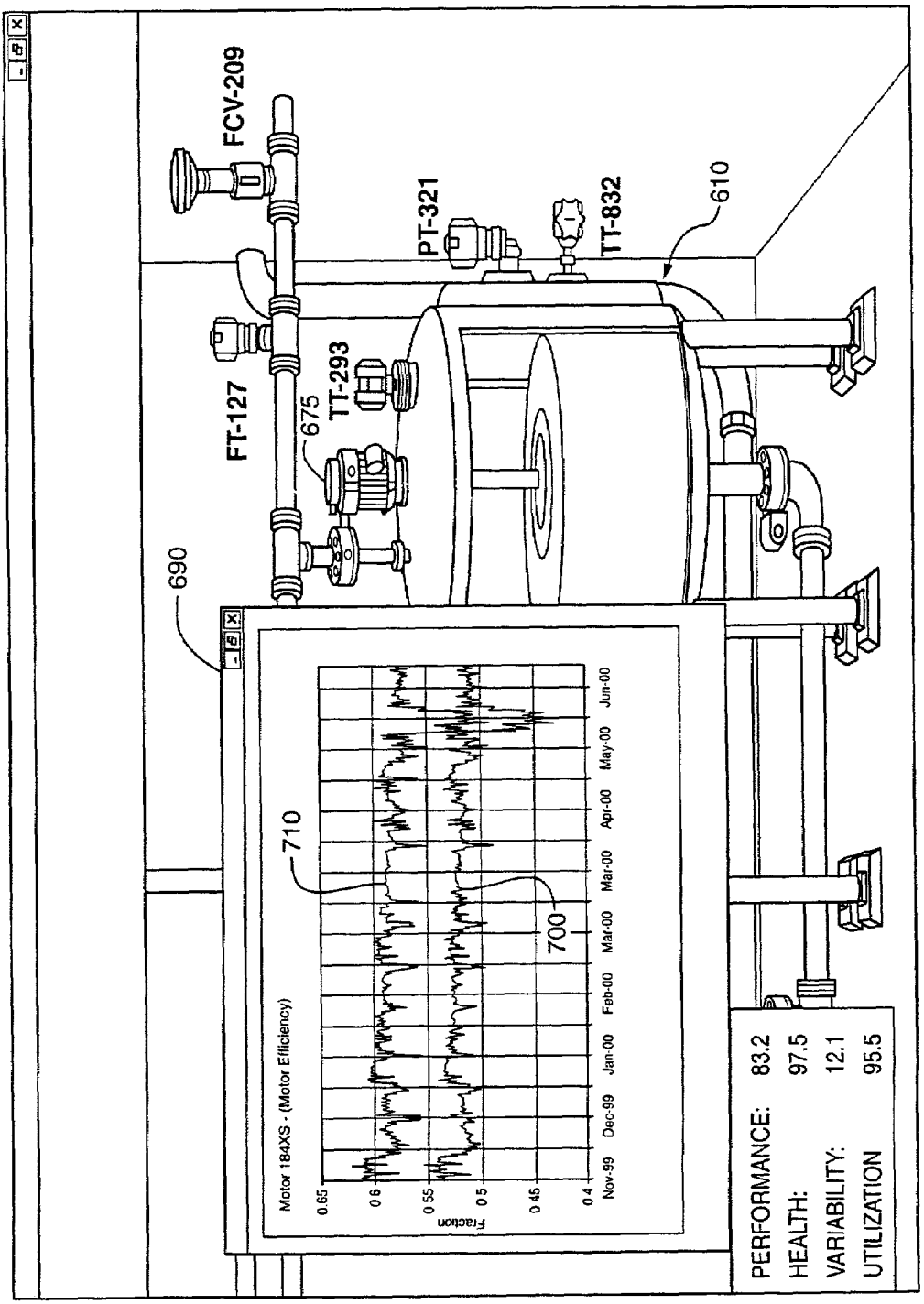
FIG. 19 is an exemplary depiction of a display that may be provided by a graphical user interface to enable a user to graphically view or monitor a performance characteristic of a device.

FIG. 18 is an exemplary depiction of a display that may be provided by the GUI to enable a user to perform a more detailed analysis of the data which may be used in generating one or more of the indexes for a particular device within the area 600 or to perform condition monitoring. By way of example only, a vibration analysis for a motor 675 may be displayed in a pop-up window 680. A user may request such a pop-up window in response to an abnormally high or an abnormally low index value for the unit affected by the motor 675 and/or may request the window if an index value associated with the motor is indicative of a possible problem. Furthermore, if desired, the GUI may automatically provide such pop-up windows containing a detailed data analysis for those devices, units, etc. that have one or more abnormal index values. Similarly, FIG. 19 is an exemplary depiction of a display that may be provided by the GUI to enable a user to graphically view or monitor a performance characteristic of a device within the area 600. By way of example, a pop-up window 690 including a graph of the efficiency of the motor 675 is provided in response to a user request or, alternatively, in response to an automatic request by the asset utilization expert 50. Such a pop-up window may be requested or needed if one or more the index values associated with the portion of the process being carried out by the tank 610 is abnormal. In particular, in this example, the user may recognize that the motor 675 has a poor PI value and/or that the area 600 has a poor PI value. As a result, the user may request more detailed information, such as that contained within the pop-up window 690 to determine whether a problem exists with the motor 675. Also, in this example, the pop-up window may contain a graph of the efficiency of the motor 675 over time where actual efficiency data 700 is graphed against theoretical or empirically derived maximum efficiency data 710. As discussed above, these two sets of efficiency data may also be used to calculate a PI value over time for the motor 675 by, for example, using the ratio of actual efficiency and theoretical maximum efficiency as the PI value.

Figure 20:
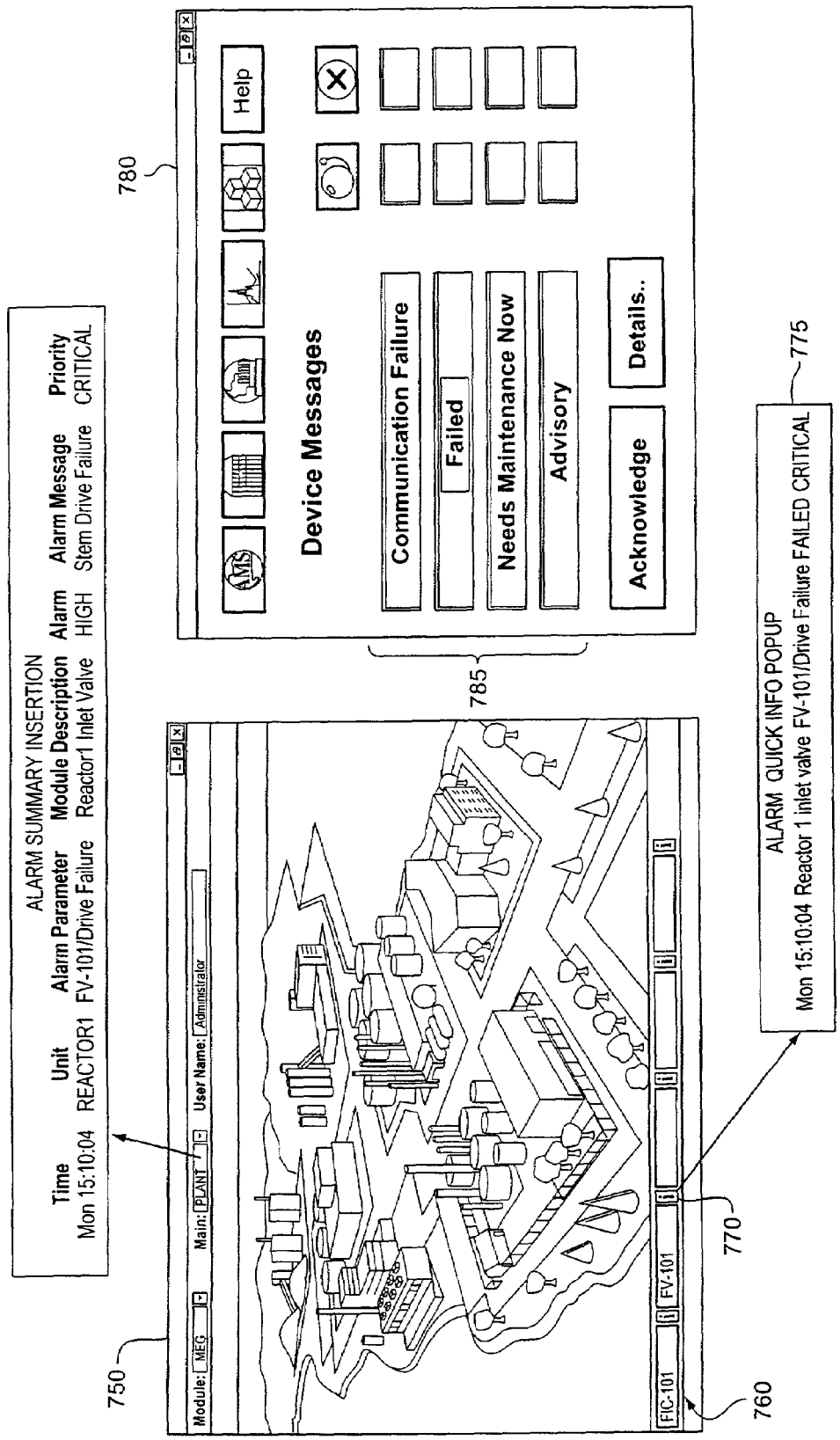
FIG. 20 is yet another exemplary depiction of a display that may be provided by a graphical user interface to enable a user to quickly investigate information within a plant.
Figure 21:
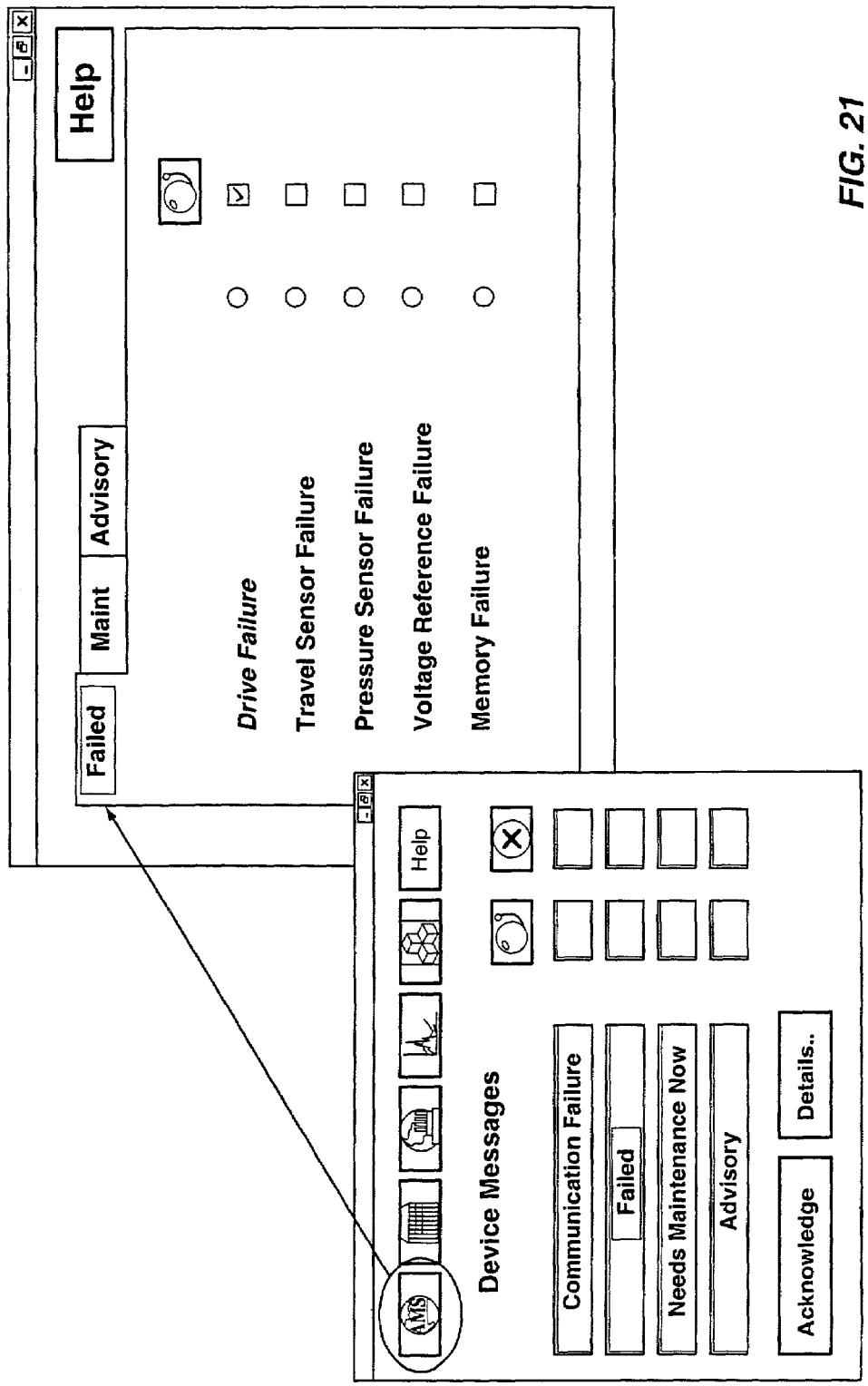
FIGS. 21-23 are exemplary pop-up windows that may be displayed by a graphical user interface to provide device status information.
Figure 22:
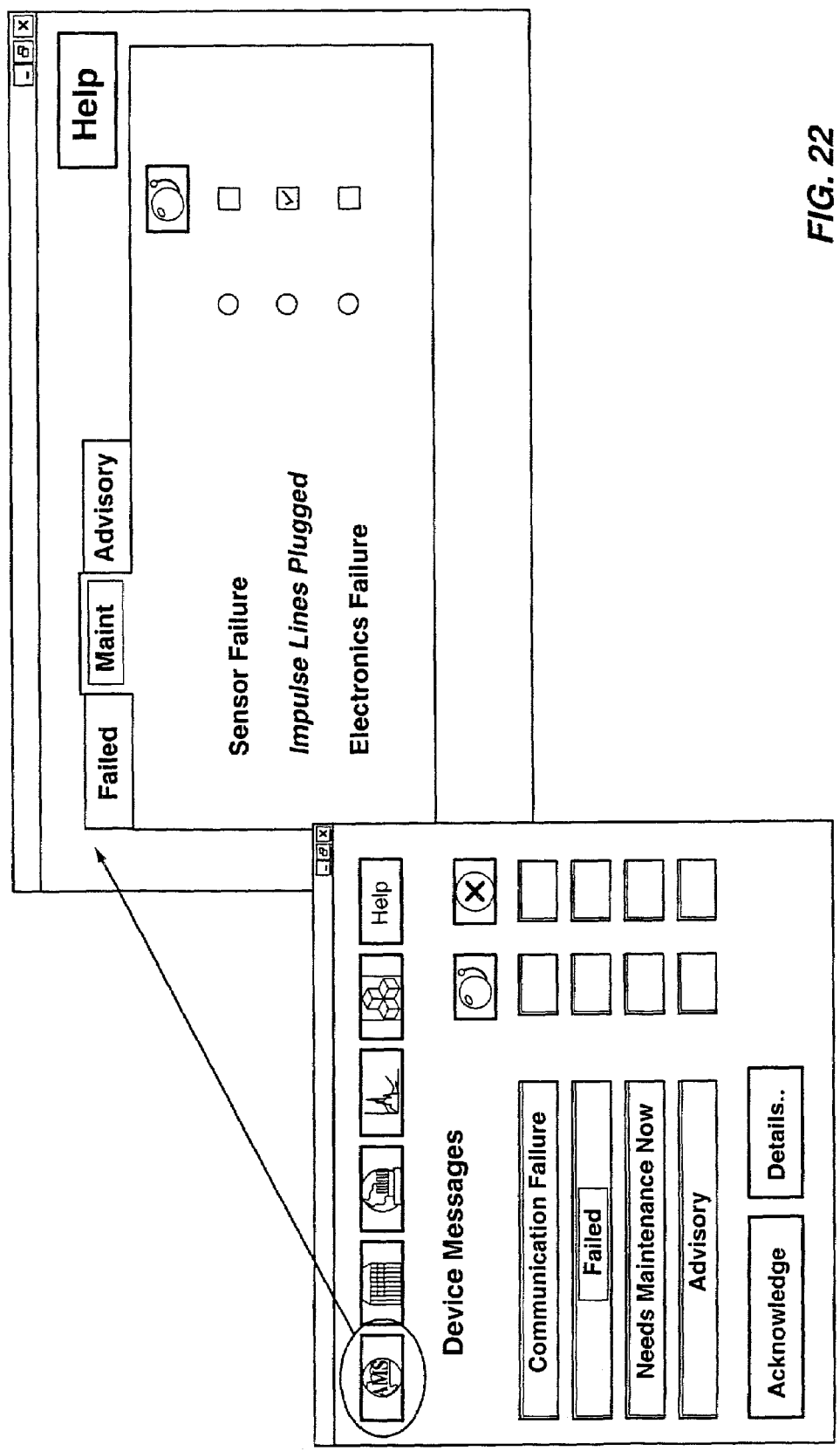
Figure 23:
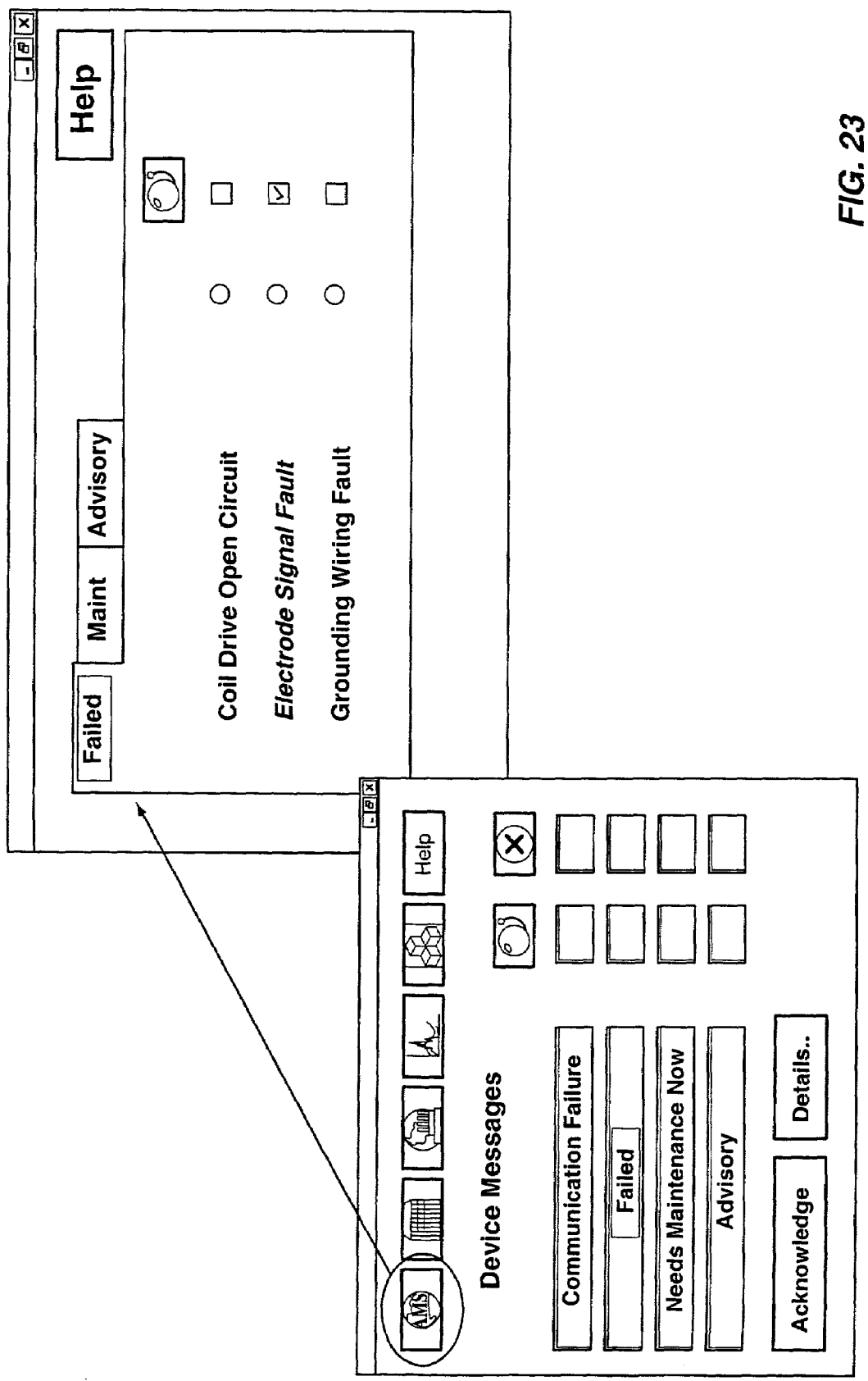

FIG. 20 is yet another exemplary depiction of a display that may be provided by the GUI to enable a user to quickly investigate alarm information, conditions, etc. within the plant 10. A high level graphical view 750 of the plant 10 may include an alarm banner 760 having one or more pending alarms. Each of the alarms within the alarm banner may be represented using an alphanumeric indicator that is uniquely associated with the device which generated the alarm or event. Additionally, each of the alarms within the banner 760 may also include an information button 770, which may be selected by a user to generate a pop-up window 775 containing more detailed information relating to that particular alarm. Further, the user may also select the alphanumeric designator for the device causing a particular alarm to investigate the possible reasons for the alarm. When the alphanumeric designator is selected, a pop-up window 780 may be provided by the GUI. The pop-up window 780 may provide one or more response categories 785, which may facilitate the user's understanding of how a particular alarm should be addressed and within what time frame the alarm should be addressed. By way of example, the pop-up window 780 may indicate that a particular device is no longer communicating, that the device has failed, that the device needs maintenance immediately, or that the device requires maintenance or some other attention soon. Of course more, fewer and/or different response categories may be used instead. The alarm display generated by the GUI at this point may be the integrated display disclosed in U.S. patent application Ser. No. 09/707,580 (filed Nov. 7, 2000) which is hereby expressly incorporated by reference herein. Generally, this alarm display may show process alarms and alerts as well as other types of alarms like maintenance alarms and alerts. Furthermore, information about the alarm, such a specific information provided in the field 775 of the alarm banner may be sent to the GUI or to the asset utilization expert 50 along with the alarm.

Figure 24:
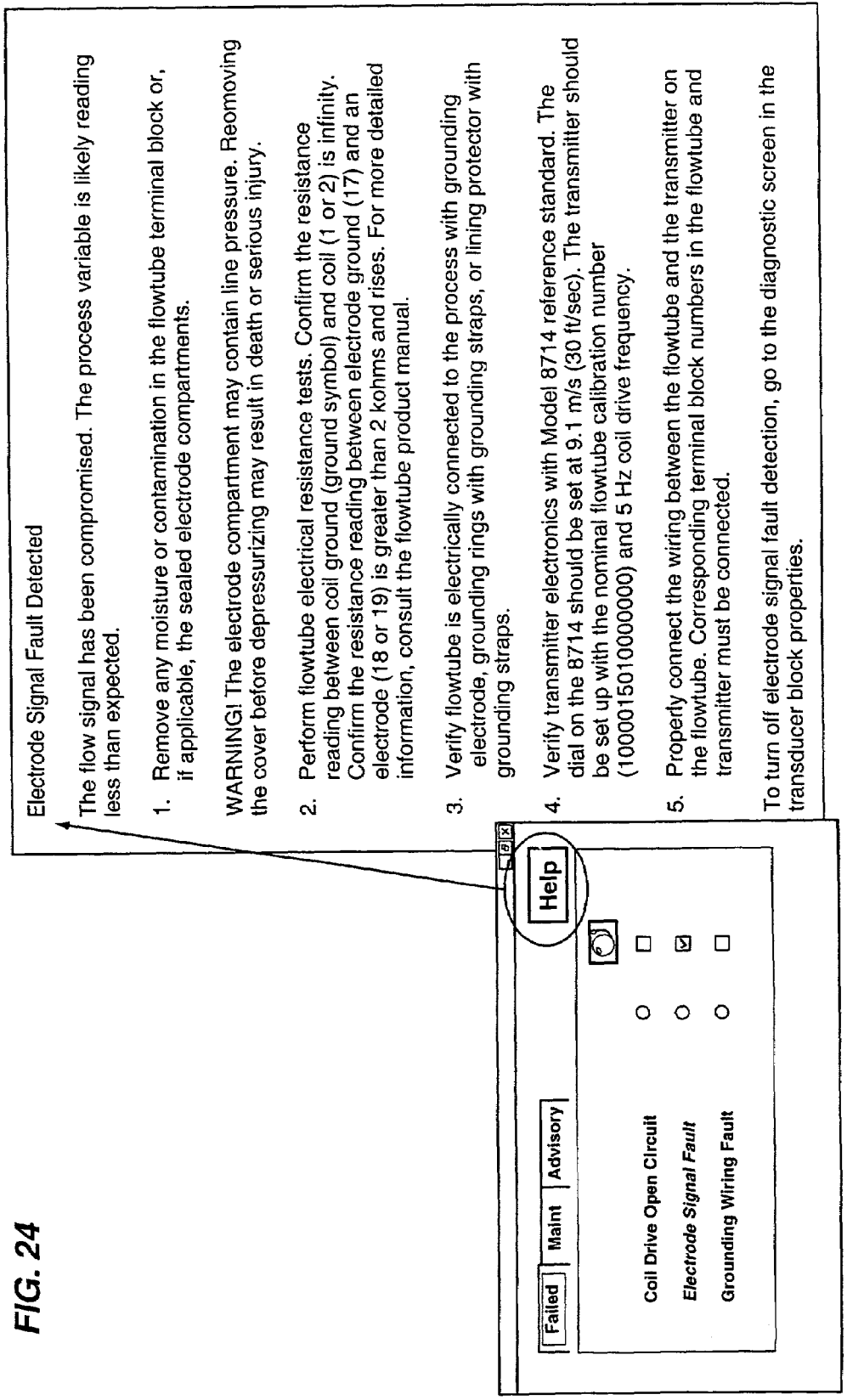
FIG. 24 is an exemplary display that may be provided by a graphical user interface to give detailed help information to a user.

FIGS. 21-24 are exemplary depictions of displays that may be provided by the GUI in response to a user's further investigation of an alarm, alert or any other event associated with, for example, a device. Generally speaking, a user may request device status information from a pop-up window such as the pop-up window 780 shown in FIG. 20. This detailed status information may provide one or more possible diagnoses of problems that may be responsible for the alarm condition (i.e., failed communication, failed device, needs maintenance now, advisory, etc.). Furthermore, as shown in FIG. 24, a user may request detailed help from any status window. This detailed help may provide step by step instructions to guide the user or some other person in rectifying the problem diagnosed by the system. This information may be made available to the GUI from the asset utilization expert 50 and/or from devices themselves, from the process control diagnostic expert 65, from other analysis tools, etc.

Figure 25:
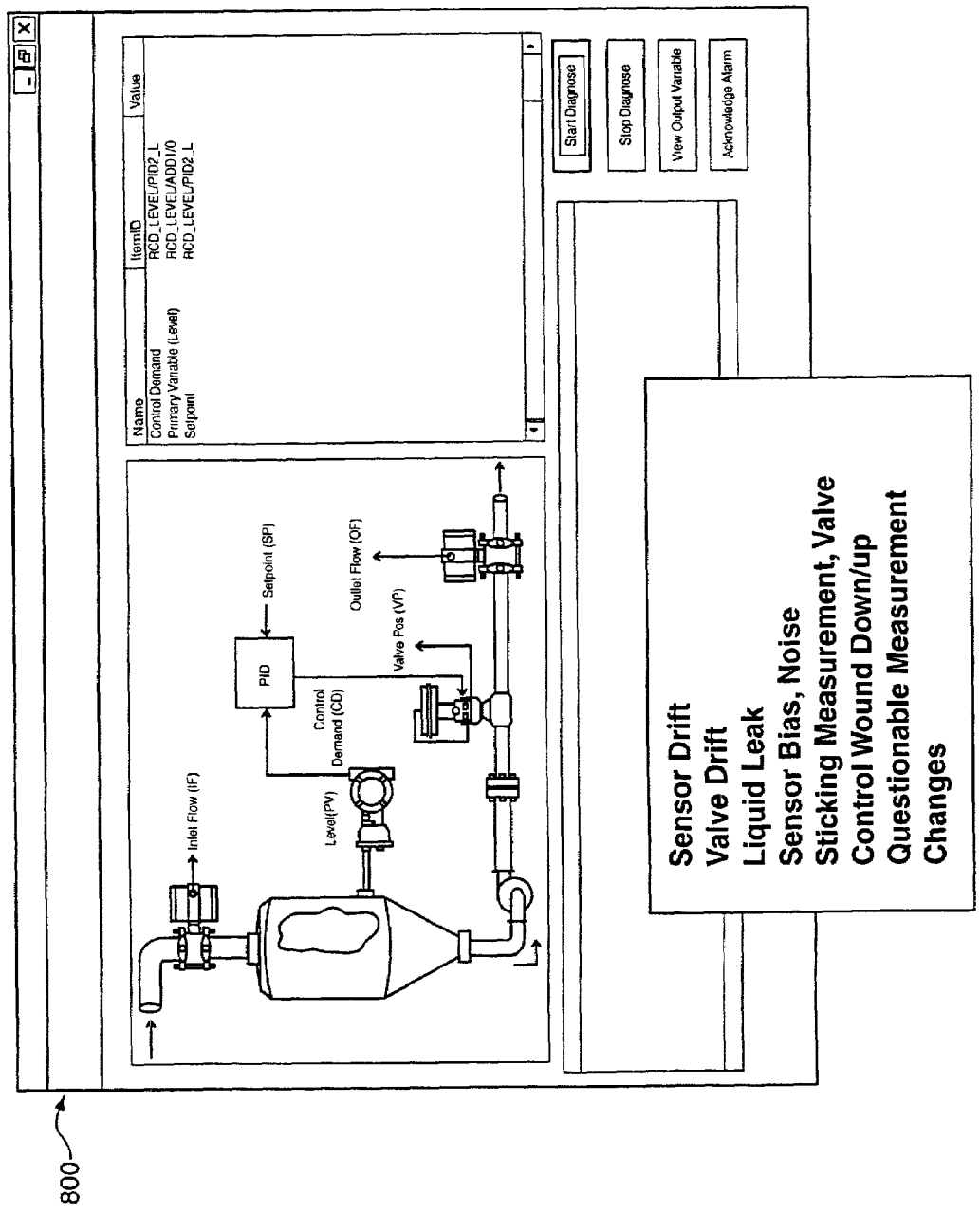
FIG. 25 is an exemplary depiction of a display that may be provided by a graphical user interface to enable a user to diagnose loop-related problems.

FIG. 25 is an exemplary depiction of a display that may be provided by the GUI to enable a user to diagnose loop-related problems. A display such as that shown in FIG. 25 may be provided by the GUI in response to a user's further investigation of an abnormal index value. For example, a user may recognize and/or the system may automatically recognize, that a PI value for particular loop is abnormally low and, in response, may provide a pop-up window 800. A user may then focus the diagnostic investigation on the devices displayed within the window 800 by clicking on or selecting one or more of the devices to thereby generate additional pop-up windows such as those described above that provide more detailed device status and performance information. Additionally, the asset utilization expert 50 may provide various possible diagnostic solutions that are displayed as text by the GUI within the window 800. Also, the asset utilization expert 50 may provide predictive diagnostic information via the display 800 that may be used to avoid a potential problem and/or to work around a potential or current problem.

Figure 26:
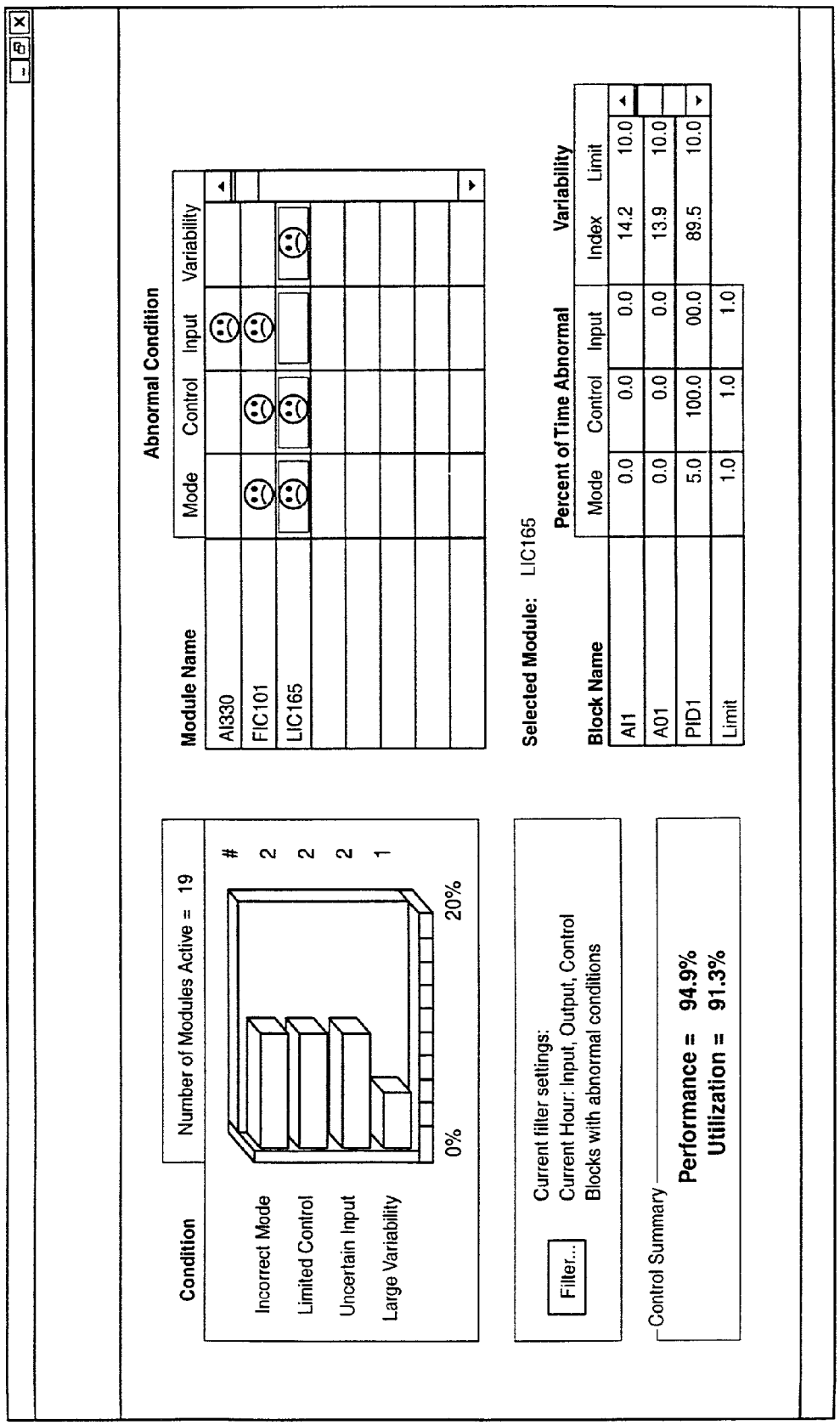
FIG. 26 is yet another exemplary depiction of a display that may be provided by a graphical user interface that enables a user to analyze the performance and/or status of one or more process control loops.

FIG. 26 is yet another exemplary depiction of a display that may be provided by the GUI enables user to analyze the performance and/or status of one or more process control loops. Various parameters and characteristics of one or more loops may be monitored. For example, the operating mode of a loop, whether or not the control of the loop is limited, to what extent a loop input is uncertain, the variation of the loop, etc. may all be monitored simultaneously. Additionally, a control summary that provides a performance indication and a utilization indication may be provided as well. However, for the display shown in FIG. 26, the performance indication and the utilization indication may be, but are not necessarily, the same as the PI and UI values for the loop being monitored. The display of FIG. 26 may be generated by a diagnostic control routine such as that disclosed in the U.S. patent application Ser. Nos. 09/256,585 and 09/499,445 identified previously.

Figure 27:
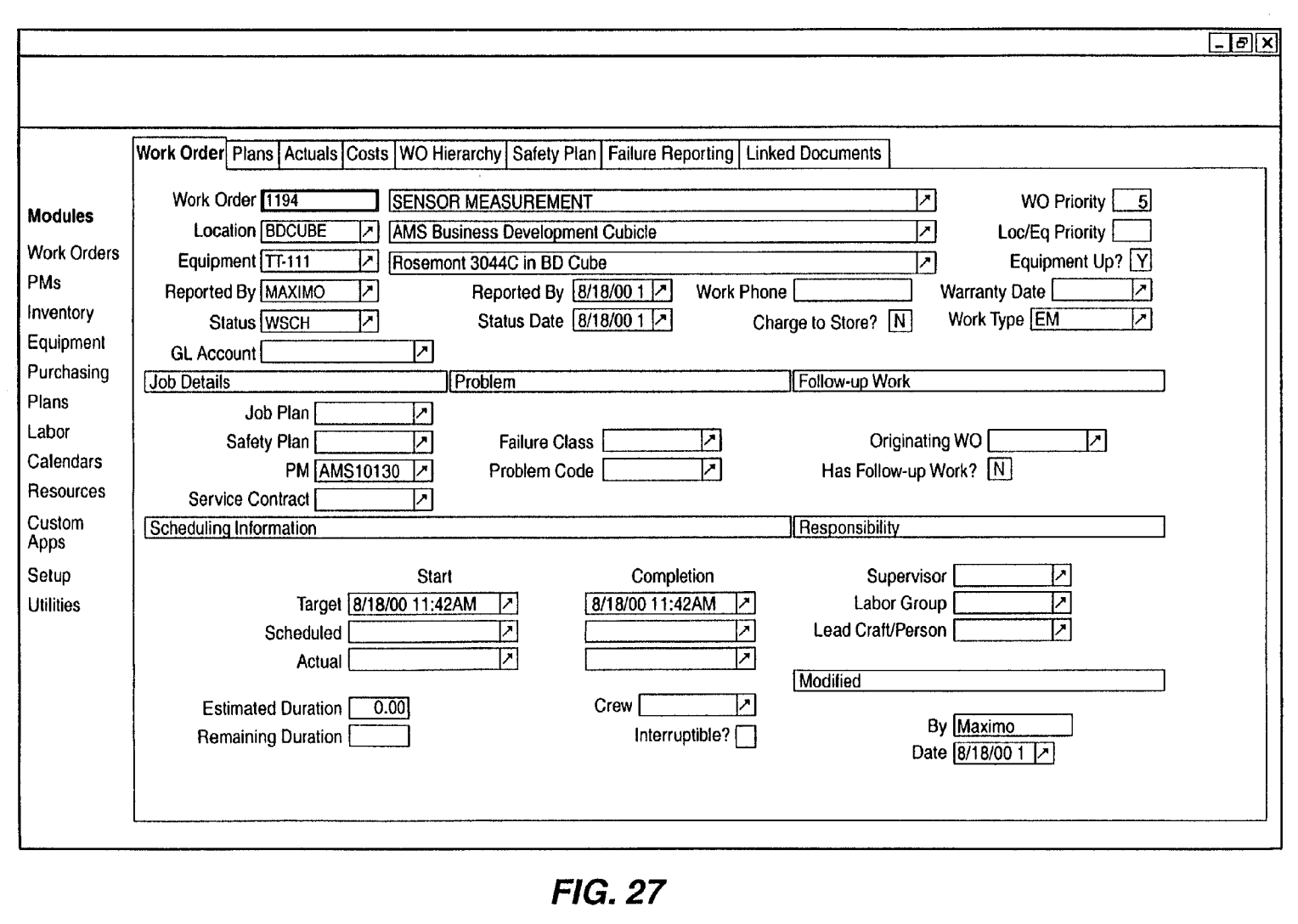

FIG. 27 is still another exemplary depiction of a display that may be provided by the GUI which enables a user to track work orders which may have been automatically generated by the work order generation routine 54. The asset utilization expert 50 may provide data to the work order generator routine 54 which causes that routine to automatically generate work orders in response to a problem or potential problem discovered or recognized by the asset utilization expert 50 and/or a user working with the asset utilization expert 50 via the GUI. For example, the asset utilization expert 50 may receive diagnostic information, maintenance requests, etc. and, in response may cause the maintenance system to generate a work order that requests a maintenance person to attend to one or more problems in connection with the diagnostic information. Of course, the specifics of the work order generated will depend on the type of problem or situation detected and the standard forms used to correct the problem, such as ordering parts, supplies, etc.

Still further, the work order generation routine 54 could include a business to business communication function that, based on detected actual or predicted problems within the plant 10, will automatically communicate with a supplier or other business to order parts, supplies, etc. with or without operator or maintenance person intervention. More particularly, the routine 54 can receive notifications of current problems or predicted future problems with devices or other assets based on data provided by or predictions made by the asset utilization expert 50 or any of the data analysis tools, such as the rotating equipment analysis tools. The routine 54 then automatically contacts a supplier via, for example an internet, telephone or other communication connection and orders the parts, equipment or supplies to be delivered to the plant 10 before the device needs to be replaced. In this manner, the work order generation routine 54 limits the down time or helps to assure that there is little or no down time caused by the need to wait for parts, equipment or supplies to fix the problem when it actually occurs. This fact, then makes the plant 10 more efficient.

Figure 28:
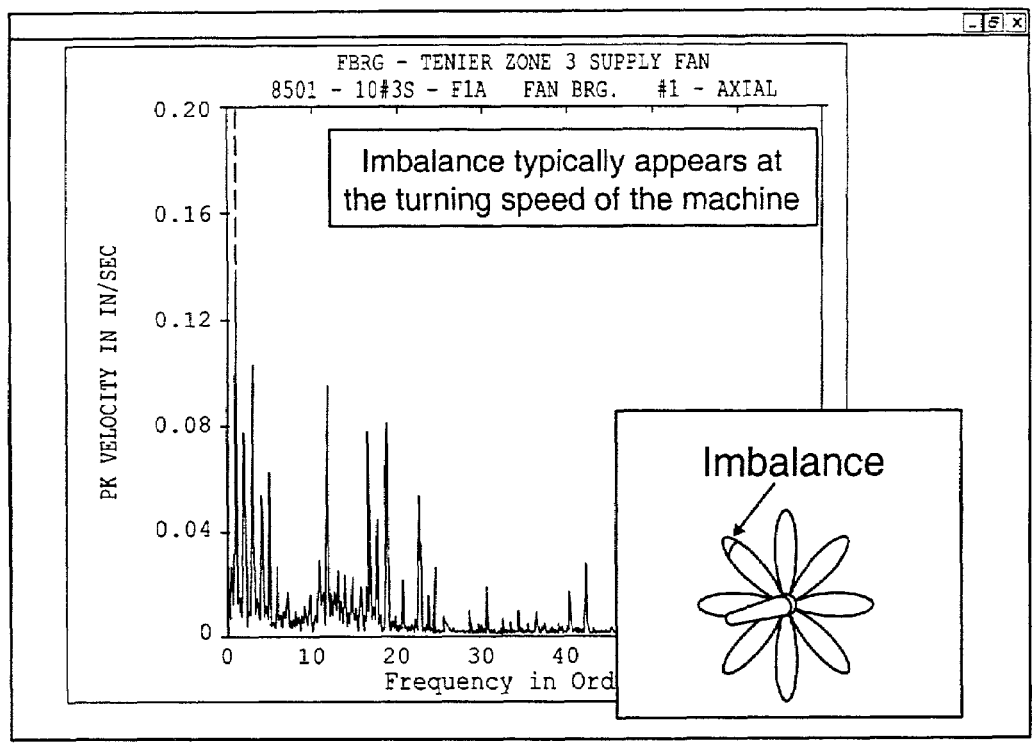
FIGS. 28-31 illustrate displays showing spectral plots of vibration of an element within a rotary device.
Figure 29:
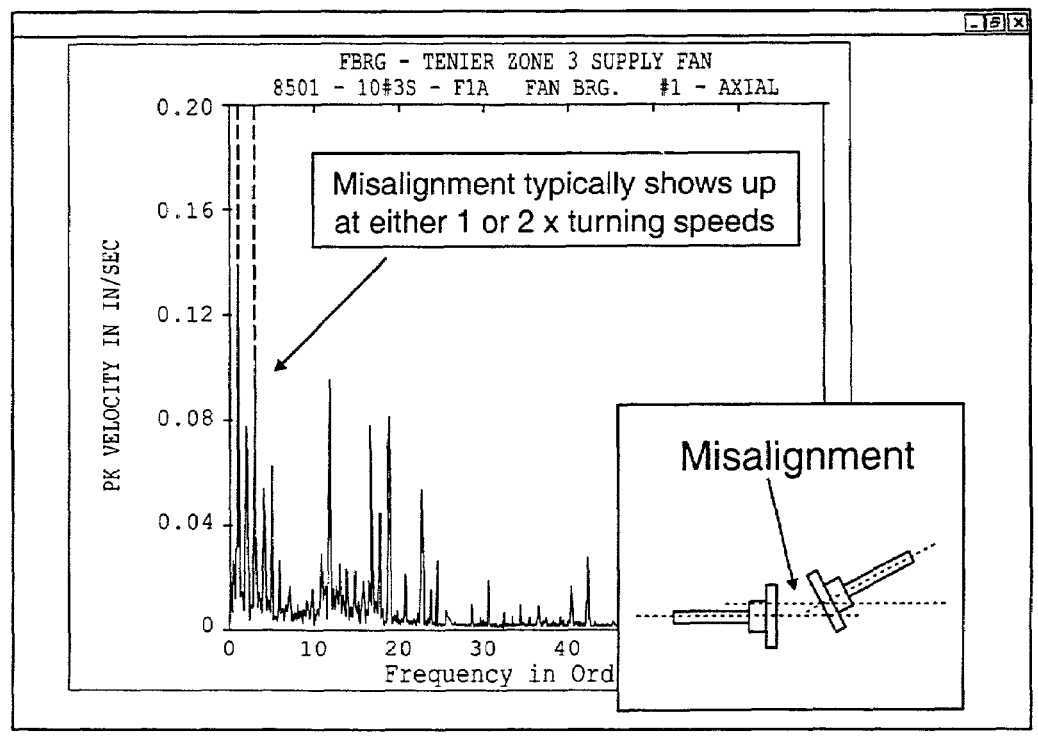
Figure 30:
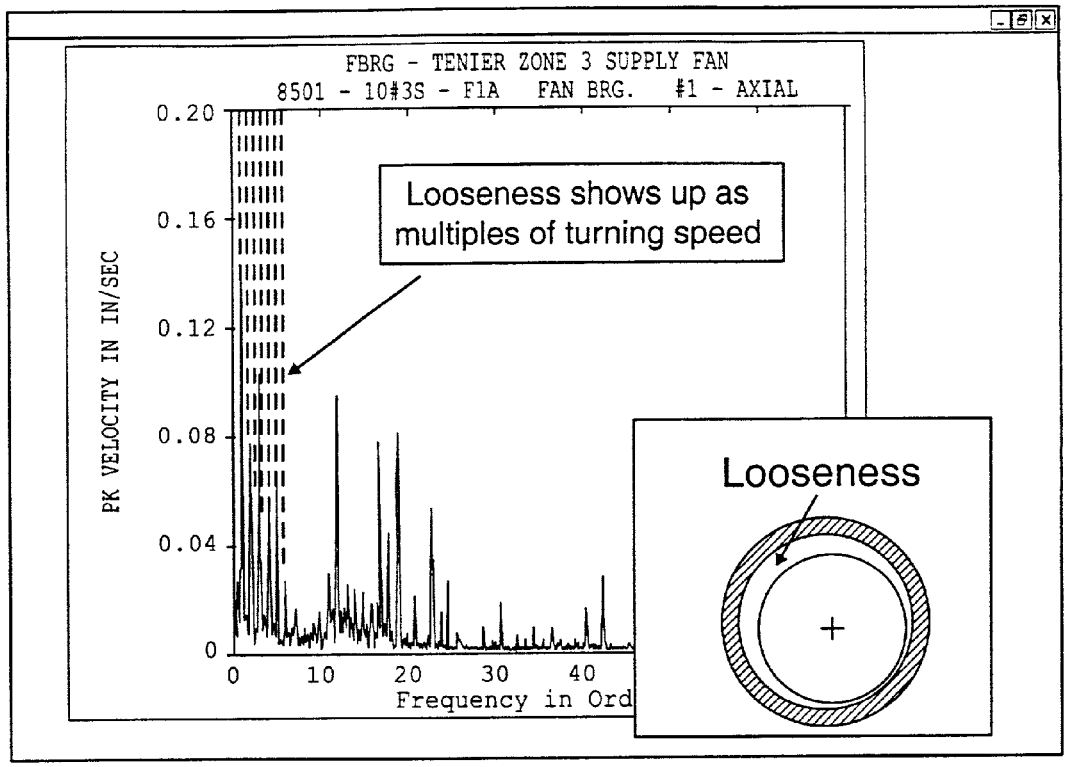
Figure 31:
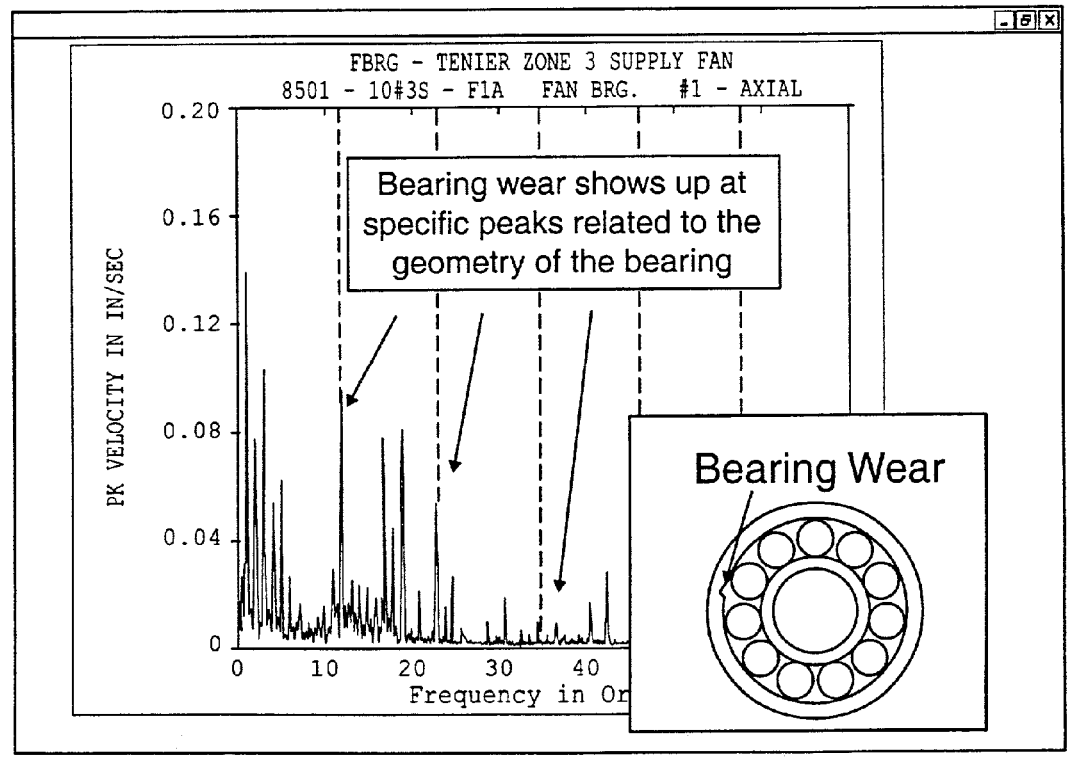

Referring now to FIGS. 28-31, the GUI can provide other screens to a user to indicate current or future problems, such as predicted problems, which can be detected by the asset utilization expert 50 or any of the data analysis tools within the plant 10. In particular, FIGS. 28-31 illustrate displays showing spectral plots of vibration of an element, such as a shaft, within a rotary device performed by the vibration analysis programs 23 of FIG. 1 and conditions or problems detected by the analysis tool based on these plots. For example, FIG. 28 illustrates a detected imbalance condition, FIG. 29 illustrates a detected misalignment condition, FIG. 30 illustrates a detected looseness condition and FIG. 31 illustrates a detected worn bearing condition. Of course other conditions for rotary or other devices based on the results of data analysis tools can also be displayed. Still further, the results of these tools can be used to cause the work order generation routine 54 to automatically order replacement parts.

Figure 32:
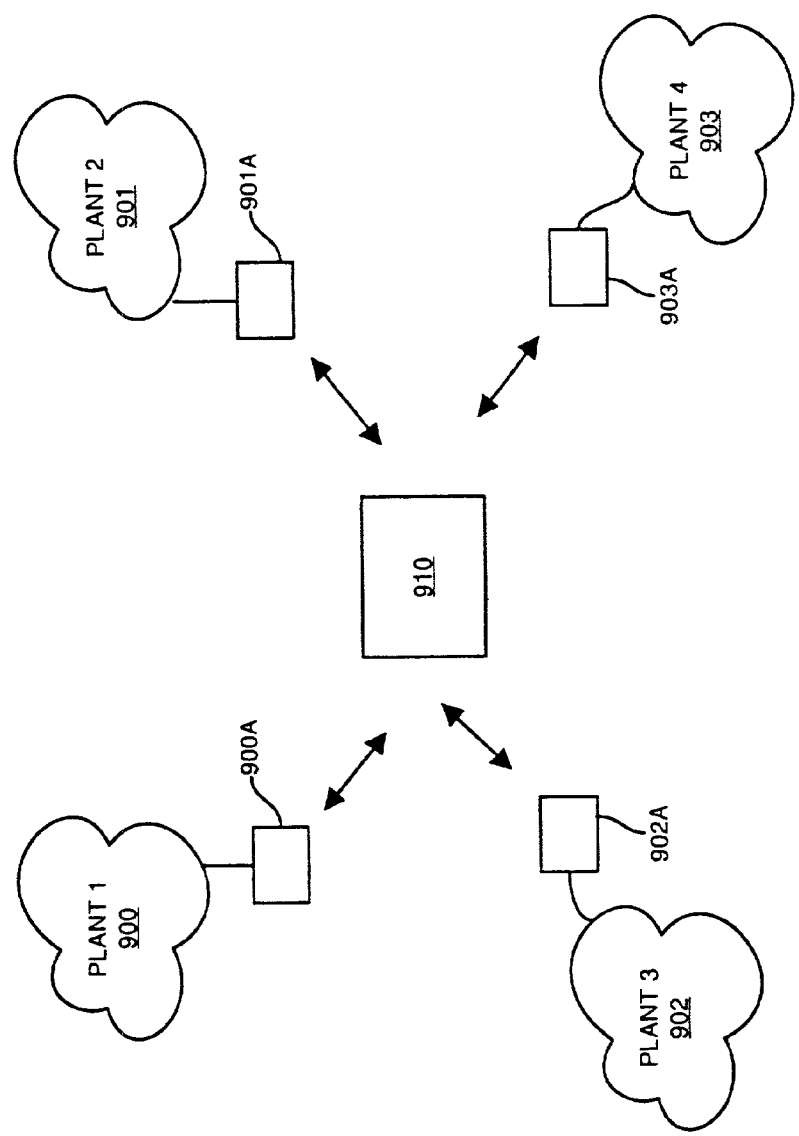
FIG. 32 is a block diagram of a remote monitoring facility connected to multiple process plants via a communication network.

Referring now to FIG. 32, a method of remotely providing access to models, optimizers and other data analysis tools such as performance monitoring tools for one or more process plants will be described. As illustrated in FIG. 32, one or more process plants 900, 901, 902 and 903 operate independently. Each of the plants 900-903 periodically collects data pertaining to the plant and then sends that data to a data processing facility or remote monitoring facility 910. To accomplish this function, each of the plants 900-903 has a user interface or server 900A-903A and these servers are connected via any desired communication network, such as the internet or the worldwide web, to the remote monitoring facility 910.

Figure 33:
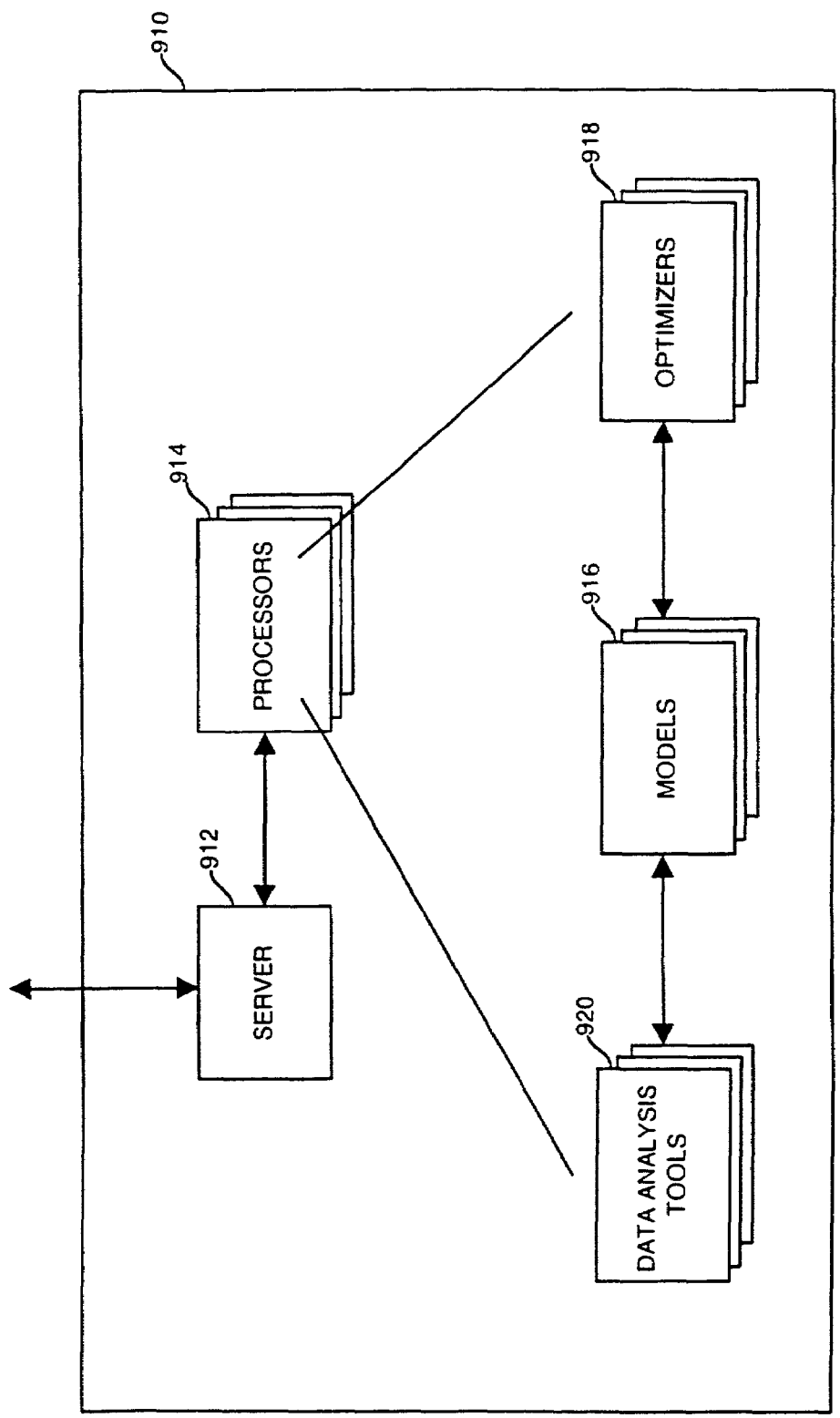
FIG. 33 is a more detailed block diagram of the remote monitoring facility of FIG. 32.

As illustrated in FIG. 33, the remote monitoring facility 910 includes a web server 912 through which the processes 900-903 communicate with the remote monitoring facility 910. The remote monitoring facility 910 also includes one or more processors 914 having associated databases which store and execute a number of process monitoring applications or tools. In particular, each processor 914 may have access to and execute models 916, such as component models described herein, which have been created to model one or more of the plants 900-903 or entities within those plants. The models 916 may include different component models for each of the different plants 900-903 and these models 916 may be altered or changed by persons in the plants 900-903 via communications with the facility 910 to, for example, reflect changes within the plants 900-903. The processors 914 may also store and execute real time optimizers or any other kinds of optimizers 918 which can be implemented as described herein with respect to FIGS. 1 and 2 using data from the processes 900-903. Still further, processors 914 may have access to and execute other data monitoring tools 920, including, for example, any of the applications or tools within any of the computer systems of FIG. 1. such as any of the process control tools, process monitoring tools, equipment or device monitoring tools, index generation tools, work order generation tools, business or other tools or applications described herein. In one example, the process monitoring tool described in U.S. patent application Ser. Nos. 09/256,585 and 09/499,445 may be used to monitor process parameters.

During operation, any of the processes 900-903, may at convenient times collect input and output data associated with the process and provide such data to the remote monitoring facility 910 via one of the servers 900A-903A and the world wide web, internet or other communication network connected to the server 912. Upon receipt of the data from a plant, an appropriate one of the processors 914 accesses that data and executes the appropriate process monitoring and condition monitoring tools for that plant to detect problems within the plant based on the collected data, to provide condition, plant or process monitoring for the plant, or to perform optimization for the plant. Of course, the data collected at the plant and sent to the remote monitoring facility 910 is data previously determined to be necessary to run the desired models 916, optimizers 918 or other data analysis tools 920 and is collected and sent to the facility 910 at a periodic or non-periodic rate that is appropriate for the tools or models being executed. Thus, for optimizers, data may need to be collected and sent at a different rate than for models or for performance, process or asset monitoring tools. Of course, as part of an optimization or performance, condition or process monitoring exercise, any appropriate models or other tools may be executed and the execution of these models or other tools generally follows the principles discussed above with respect to these same tools in the plant 10 of FIG, 1.

In any event, after executing the models, data analysis or optimizer tools, the processor 914 places the results back on the server 912 where these results can be picked up by the appropriate one of the plants 900-903 at any desired time. Alternatively or additionally, these results may be sent directly to the appropriate one of the plants 900-903 by the server 912. The data resulting from the analysis can be any desired performance modeling data, plots or charts including, for example, those described above with respect to the user interface routines or GUI routine 58. The results could also be suggestions by, for example, an optimizer for making changes to the plants, indexes for the plants, or any other results capable of being provided by these types of tools.

In one embodiment, the a real time optimizer, such as that described above, may be executed on a real time basis, assuming that the plants 900-903 provide sufficient data in a timely periodically manner so as to enables the proper execution of this optimizer. If desired, the servers 900A-903A may automatically collect and send the appropriate data to enable proper operation of the optimizer. In one embodiment, the plaints may include the asset utilization expert 50 described herein or any other expert data collection tools for use in assuring that the proper data is sent to the remote monitoring facility 910 in a timely or periodic manner.

In this manner, the remote monitoring facility 910 can execute the software for asset, performance, condition and process monitoring as well as executing one or more optimizers for different plants. This, in turn, means that the plants 900-903 do not need to include the processing power or applications for these purposes, which may be less expensive for the plants. Of course, the plants may pay on a per usage basis or on some other predetermined fee schedule for use of the remote monitoring facility 910. If desired, the remote monitoring facility 910 may contract to get a portion of the profits and/or losses of the plant based on the use of the tools at the facility 910 and the implementation of the results of those tools.

If desired, each of the plants 900-903 may update the models 916 stored within the remote monitoring facility 910 applicable to those plants by sending new or updated models to the server 912 using any desired communication format such as XML, HTML, etc. Still further, the remote monitoring facility 910 may include generic templates for different process plants, areas, units, devices, loops, etc. which may be downloaded to each of the plants 900-903 via the server 912 and these templates may be altered at the plants 900-903 to reflect the actual operation of those plants. The updated models may then be sent back to the remote monitoring facility 910 as models to be implemented in asset, condition or process monitoring or in the optimizers for the plant. In this manner, changes to the plants 900-903 may be adequately or accurately reflected within the remote monitoring facility 910.

While the asset utilization expert 50 and other process elements have been described as preferably being implemented in software, they may be implemented in hardware, firmware, etc., and may be implemented by any other processor associated with the process control system 10. Thus, the elements described herein may be implemented in a standard multi-purpose CPU or on specifically designed hardware or firmware such as an application-specific integrated circuit (ASIC) or other hardwired device as desired. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium). Also, while the expert 50 is described as possibly being a rule-based expert, other types of expert engines could be used as well, including those which use other known data mining techniques.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of collecting and using data within a process plant, comprising:
   collecting data including subsidiary device data from a plurality of data sources within the process plant, wherein the plurality of data sources includes a service application that is implemented remotely by an outside service provider to the process plant, the remotely implemented service application configured to remotely access the subsidiary device data;
   storing the collected subsidiary device data in a database;
   making the stored subsidiary device data accessible to one or more process control applications or maintenance applications within the process plant; and
   making the stored subsidiary device data accessible to the service application.

2. The method of claim 1, wherein the step of collecting data includes collecting data from a process control data source.

3. The method of claim 1, wherein the step of collecting data includes collecting data from a field device maintenance source.

4. The method of claim 1, wherein the step of collecting data includes collecting data from a process model.

5. The method of claim 1, wherein the step of collecting data includes collecting data from a business application.

6. The method of claim 1, wherein the step of collecting data includes collecting data from a service application that is an optimization application.

7. The method of claim 1, wherein the step of collecting data includes collecting data from a service application that is a corrosion monitoring application.

8. The method of claim 1, wherein the step of collecting data includes collecting data from a service application that is a process performance monitoring application.

9. The method of claim 1, wherein the step of collecting data includes collecting data from a service application that is a condition monitoring application.

10. The method of claim 1, wherein the step of collecting data includes collecting data from a service application that is a reliability monitoring application.

11. The method of claim 1, wherein the step of collecting data includes collecting data from a service application that is an electrical equipment monitoring application.

12. The method of claim 1, wherein the step of collecting data includes collecting data from a service application that is device performance monitoring application.

13. The method of claim 1, wherein the step of collecting data includes collecting data from a data source that is intermittently communicatively connected to the process plant.

14. The method of claim 13, wherein the service application data source is intermittently communicatively connected to the process plant.

15. The method of claim 1, wherein the step of storing includes storing the collected data in a single database.

16. The method of claim 1, wherein the step of collecting data includes expressing the data in a descriptive language.

17. The method of claim 16, wherein the descriptive language is XML.

18. A method of performing operations for a process plant having a controller, a plurality of devices and a first computer that implements a first application that is a process control application or a maintenance application used by plant personnel, the method comprising:
  collecting first data from the first application as used in the process plant;
  storing the first data in a memory;
  collecting second subsidiary device data from a second application implemented remotely from the process plant by an outside service provider associated with the process plant;
  providing the second subsidiary device data to the memory;
  storing the second subsidiary device data in the memory;
  making the second subsidiary device data available from the memory to the first application; and
  making the first data available from the memory to the remotely implemented second application configured to remotely access the first data.

19. The method of claim 18, wherein the step of collecting first data includes collecting data from a process controller data source.

20. The method of claim 18, wherein the step of collecting first data includes collecting data from a process model data source.

21. The method of claim 18, wherein the step of collecting first data includes collecting data from a business application.

22. The method of claim 18, wherein the step of collecting second data includes collecting data from a second application that is an optimization application.

23. The method of claim 18, wherein the step of collecting second data includes collecting data from a second application that is a corrosion monitoring application.

24. The method of claim 18, wherein the step of collecting second data includes collecting data from a second application that is a performance monitoring application.

25. The method of claim 18, wherein the step of collecting second data includes collecting data from a second application that is device performance monitoring application located within a device.

26. The method of claim 18, wherein the step of collecting second data includes collecting data from a second application that is intermittently communicatively connected to the memory.

27. The method of claim 18, wherein the steps of storing the first and the second data in the memory includes storing the first and second data in a common memory at a single location.

28. The method of claim 18, wherein the step of collecting second data includes expressing the data in a descriptive language.

29. The method of claim 28, wherein the descriptive language is XML.

30. A data communication system within a process plant, comprising:
  a first communication network associated with the process plant that uses a first communication protocol;
  a first application adapted to communicate via the first communication network;
  a second communication network associated with the process plant that uses a second communication protocol;
  a second application adapted to communicate via the second communication network and implemented remotely from the process plant by an outside service provider to the process plant;
  a database communicatively coupled to the first communication network and to the second communication network, said database adapted to receive first data from the first application and second subsidiary device data from the remotely implemented second application configured to remotely access the first data, to store the first data and the second subsidiary device data and to provide the first data to the second application via the second communication network and to provide the second subsidiary device data to the first application via the first communication network.

31. The data communication system of claim 30, wherein the first application or the second application is adapted to be intermittently connected to the first or the second communication network.

32. The data communication system of claim 30, wherein the first application is a process control application and the second application is a process performance application.

33. The data communication system of claim 30, wherein the first application is a device maintenance application and the second application is an optimization application.

34. The data communication system of claim 30, wherein the first application is a process control application and the second application is an optimization application.

35. The data communication system of claim 30, wherein the first application is a process control application and the second application is a business application.

36. The data communication system of claim 30, wherein the first application is a process performance monitoring application and the second application is a device maintenance application.

37. The data communication system of claim 30, wherein the first application is a process control application and the second application is a power equipment monitoring application.

38. The data communication system of claim 30, wherein the first application is a process control application and the second application is a rotational equipment analysis application.

39. The data communication system of claim 30, wherein the first application is a process control application and the second application is a device diagnostic application.

40. The data communication system of claim 30, wherein communications between the database and the first and second applications express the first and second data, respectively, in a descriptive language.

41. The data communication system of claim 40, wherein the descriptive language is XML.

42. A data communication system within a process plant, comprising:
 a database adapted to store a plurality of different types of data; and
 a plurality of applications communicatively coupled to the database via different communication networks, the plurality of applications including two or more of a process control application, a process performance monitoring application, a process device monitoring application and a business application;
 wherein at least one of the plurality of applications is a service application implemented remotely from the process plant by an outside service provider to the process plant, wherein each of the plurality of applications are adapted to send data including subsidiary device data to the database to be stored, and wherein the database is adapted to provide to the remotely implemented service application configured to remotely access the subsidiary device data, the subsidiary device data from the database that was sent to the database via another one of the applications.

43. The data communication system of claim 42, wherein two or more of the plurality of applications are adapted to access data from the database sent to the database via different ones of the applications.

44. The data communication system of claim 42, further including the plurality of communication networks coupled to the database and wherein the each of the plurality of applications communicates with the database via a different one of the plurality of communication networks.

45. The data communication system of claim 42, wherein one of the plurality of applications is an optimization application.

46. The data communication system of claim 42, wherein one of the plurality of applications is a process performance monitoring application.

47. The data communication system of claim 42, wherein one of the plurality of applications is a device performance monitoring application.

48. The data communication system of claim 42, wherein one of the plurality of applications is a power equipment monitoring application.

49. The data communication system of claim 42, wherein one of the plurality of applications is a rotational equipment analysis application.

50. The data communication system of claim 42, wherein one of the plurality of applications is a corrosion monitoring application.

51. The data communication system of claim 42, wherein one of the plurality of applications is a reliability monitoring application.

52. The data communication system of claim 42, wherein one of the plurality of applications is intermittently communicatively connected to database.

53. The data communication system of claim 42, wherein each of the plurality of applications is adapted to send data to the database via a descriptive language.

54. The data communication system of claim 53, wherein the descriptive language is XML.

* * * * *

UNITED STATES PATENT AND TRADEMARK OFFICE
CERTIFICATE OF CORRECTION

PATENT NO. : 7,346,404 B2 Page 1 of 1
APPLICATION NO. : 10/087308
DATED : March 18, 2008
INVENTOR(S) : Evren Eryurek et al.

It is certified that error appears in the above-identified patent and that said Letters Patent is hereby corrected as shown below:

On Page 4:

At field (56), Other Publications, 2$^{nd}$ reference, "Moitoring" should be -- Monitoring --.

In the Drawings:

At Sheet 22, figure 24, line 6, "Reomoving" should be -- Removing --.

In the Claims:

At Column 39, line 18, "is device" should be -- is a device --.

Signed and Sealed this

Eighteenth Day of November, 2008

JON W. DUDAS
*Director of the United States Patent and Trademark Office*